United States Patent
Lemmers et al.

(10) Patent No.: US 12,527,774 B2
(45) Date of Patent: Jan. 20, 2026

(54) ESTROGEN-RELATED RECEPTOR ALPHA MODULATORS

(71) Applicant: LEAD PHARMA HOLDING B.V., Oss (NL)

(72) Inventors: Jaap Gerardus Henricus Lemmers, Oss (NL); Eugen Deretey, Oss (NL); Johannes Petrus Gerardus Klomp, Oss (NL); Joseph Maria Gerardus Barbara Cals, Oss (NL); Arthur Oubrie, Oss (NL)

(73) Assignee: LEAD PHARMA HOLDING B.V., Oss (NL)

( * ) Notice: Subject to any disclaimer, the term of this patent is extended or adjusted under 35 U.S.C. 154(b) by 1006 days.

(21) Appl. No.: 17/624,297

(22) PCT Filed: Jul. 1, 2020

(86) PCT No.: PCT/EP2020/068574
§ 371 (c)(1),
(2) Date: Dec. 31, 2021

(87) PCT Pub. No.: WO2021/001453
PCT Pub. Date: Jan. 7, 2021

(65) Prior Publication Data
US 2022/0387401 A1    Dec. 8, 2022
US 2025/0268872 A2    Aug. 28, 2025

(30) Foreign Application Priority Data

Jul. 4, 2019  (EP) .................................. 19184515

(51) Int. Cl.
| | | |
|---|---|---|
| *A61K 31/437* | (2006.01) | |
| *A61K 31/4365* | (2006.01) | |
| *A61K 31/444* | (2006.01) | |
| *A61K 31/4709* | (2006.01) | |
| *A61K 31/4725* | (2006.01) | |
| *A61K 31/506* | (2006.01) | |
| *A61P 3/10* | (2006.01) | |
| *A61P 35/00* | (2006.01) | |
| *A61P 35/02* | (2006.01) | |
| *C07D 471/04* | (2006.01) | |
| *C07D 495/04* | (2006.01) | |
| *C07D 513/04* | (2006.01) | |

(52) U.S. Cl.
CPC ........ *A61K 31/437* (2013.01); *A61K 31/4365* (2013.01); *A61K 31/444* (2013.01); *A61K 31/4709* (2013.01); *A61K 31/4725* (2013.01); *A61K 31/506* (2013.01); *A61P 3/10* (2018.01); *A61P 35/00* (2018.01); *A61P 35/02* (2018.01); *C07D 471/04* (2013.01); *C07D 495/04* (2013.01); *C07D 513/04* (2013.01)

(58) Field of Classification Search
None
See application file for complete search history.

(56) References Cited

FOREIGN PATENT DOCUMENTS

| CN | 104119285 A | 10/2014 |
|---|---|---|
| WO | 2008109727 A1 | 9/2008 |
| WO | 2008109727 A8 | 9/2008 |

OTHER PUBLICATIONS

Dudinov et. al. ((2008), Three-component condensation of 2,4-diaminothiazoles with aldehydes and Meldrum's acid. The synthesis of 7-aryl and 7-alkyl-6,7-dihydro-4H-thiazolo[4,5-b]pyridin-5-ones, Russian Chemical Bulletin, 57, 1740-1743 (Year: 2008).*
Patani et.al. ((1996) Bioisosterism A rational approach in drug design, Chem. Rev., 96, 3147-3176 (Year: 1996).*
Hearing Notice for corresponding Indian application No. 202147061052; dated Jul. 24 2024 (3 pages).
Dudinov, Arkady A., et al. "Three-component condensation of 2, 4-diaminothiazoles with aldehydes and Meldrum's acid: synthesis of 7-aryl (alkyl)-substituted 6, 7-dihydro-4H-thiazolo [4, 5-b] pyridin-5-ones." Mendeleev Communications 19.2 (2009): 87-88.
Official Action for corresponding Panamanian application No. 93795-01; dated Jul. 21, 2022 (9 pages) Machine Translation.
International Search Report and Written Opinion for corresponding International application No. PCT/EP2020/068574; dated Jul. 22, 2020 (15 pages).
STN International Search Results dated Dec. 17, 2021 (2 pages).
Ariazi, Eric A., et al. "Estrogen-related receptor a and estrogen-related receptor γ associate with unfavorable and favorable biomarkers, respectively, in human breast cancer." Cancer Research 62.22 (2002): 6510-6518.

(Continued)

*Primary Examiner* — Juliet C Switzer
*Assistant Examiner* — Dawanna Shar-Day White
(74) *Attorney, Agent, or Firm* — Mendelsohn Dunleavy PC; Kevin J. Dunleavy

(57) ABSTRACT

The present invention is directed to compounds according to Formula I and the pharmaceutically acceptable salts thereof. The compounds can be used as modulators of Estrogen-related Receptor alpha (ERRα) and have utility in the treatment of ERRα-mediated diseases or conditions.

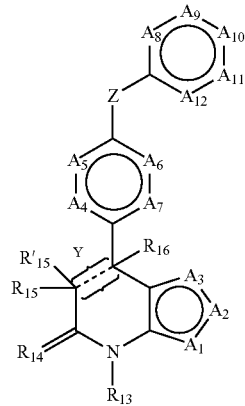

(Formula I)

10 Claims, No Drawings

(56) References Cited

OTHER PUBLICATIONS

Bookout, Angie L., et al. "Anatomical profiling of nuclear receptor expression reveals a hierarchical transcriptional network." Cell 126.4 (2006): 789-799.
Chang, Ching-yi, et al. "The metabolic regulator ERRγ, a downstream target of HER2/IGF-1R, as a therapeutic target in breast cancer." Cancer Cell 20.4 (2011): 500-510.
Djokovic, Dusan, et al. "Combination of Dll4/Notch and Ephrin-B2/EphB4 targeted therapy is highly effective in disrupting tumor angiogenesis." BMC Cancer 10.641 (2010): 1-12.
Dudinov, A. A., et al. "Three-component condensation of 2,4-diaminothiazoles with aldehydes and Meldrum's acid. The synthesis of 7-aryl-and 7-alkyl-6, 7-dihydro-4H-thiazolo [4, 5-b] pyridin-5-ones." Russian Chemical Bulletin 57.8 (2008): 1740-1743.
Fujimoto, Jiro, et al. "Clinical implication of estrogen-related receptor (ERR) expression in ovarian cancers." The Journal of Steroid Biochemistry and Molecular Biology 104.3-5 (2007): 301-304.
Guo, Qingqing, et al. "Discovery, biological evaluation, structure-activity relationships and mechanism of action of pyrazolo [3, 4-b] pyridin-6-one derivatives as a new class of anticancer agents." Organic & Biomolecular Chemistry 17.25 (2019): 6201-6214.
Huss, Janice M., et al. "Estrogen-related receptor a directs peroxisome proliferator-activated receptor a signaling in the transcriptional control of energy metabolism in cardiac and skeletal muscle." Molecular and Cellular Biology 24.20 (2004): 9079-9091.
Lebleu, Valerie S., et al. "PGC-1α mediates mitochondrial biogenesis and oxidative phosphorylation in cancer cells to promote metastasis." Nature Cell Biology 16.10 (2014): 992-1003.
Mootha, Vamsi K., et al. "Errα and Gabpa/b specify PGC-1α-dependent oxidative phosphorylation gene expression that is altered in diabetic muscle." Proceedings of the National Academy of Sciences 101.17 (2004): 6570-6575.
Peng, Lijie, et al. "Identification of pyrido [1, 2-α] pyrimidine-4-ones as new molecules improving the transcriptional functions of estrogen-related receptor α." Journal of Medicinal Chemistry 54.21 (2011): 7729-7733.
Puigserver, Pere, et al. "A cold-inducible coactivator of nuclear receptors linked to adaptive thermogenesis." Cell 92.6 (1998): 829-839.
Tremblay, Annie M., et al. "The NR3B subgroup: an ovERRview." Nuclear Receptor Signaling 5.e009 (2007): 1-11.
Xu, Guangwei, et al. "A highly potent and selective inhibitor Roxyl-WL targeting IDO1 promotes immune response against melanoma." Journal of Enzyme Inhibition and Medicinal Chemistry 33.1 (2018): 1089-1094.
Yoon, J. Cliff, et al. "Control of hepatic gluconeogenesis through the transcriptional coactivator PGC-1." Nature 413.6852 (2001): 131-138.
First Office Action for corresponding Chinese application No. 202080062286; dated Mar. 6, 2024 (13 pages).
Frimurer, Thomas M., et al. "Model-based discovery of synthetic agonists for the Zn2+-sensing G-protein-coupled receptor 39 (GPR39) reveals novel biological functions." Journal of Medicinal Chemistry 60.3 (2017): 886-898.

\* cited by examiner

ESTROGEN-RELATED RECEPTOR ALPHA MODULATORS

BACKGROUND TO THE INVENTION

Estrogen-related receptor alpha (ERRα) is a 45.5 kilodalton (kDa), 423 amino acid residue protein which belongs to the nuclear receptor (NR) superfamily. This nuclear receptor family comprises 48 genes, coding for DNA-binding transcription factors that are involved in the regulation of diverse function including inter alia homeostasis, reproduction, development and metabolism. The ERR family—the NR3B subgroup—consists of ERRα, ERR-β, and ERR-γ: to date, no endogenous ligands have been identified for any of the ERR isoforms and therefore they are considered orphan receptors.

In Bookout et al. *Anatomical profiling of nuclear receptor expression reveals a hierarchical transcriptional network*, Cell. 126:789-99 (2006), organism-wide expression profiling of the three ERR isoforms determined that ERRα is widely distributed, with significant protein expression in most adult tissues. Knockout studies of the ERR family members have revealed that each receptor has tissue- and function-specific metabolic phenotypes that are important for adaptation to energy stress at the whole body level. Knockout studies have also indicated limited in vivo compensation among the ERR family members. The disclosure of inter alia Tremblay et al. The NR3B subgroup: an overview, Nuclear receptor signaling, 5:e009 (2007) may be noted in this context.

Genomic studies have indicated that ERRα regulates large numbers of genes. The following references are instructive in this regard: Puigserver et al. A cold-inducible coactivator of nuclear receptors linked to adaptive thermogenesis, Cell. 92(6):829-839 (1998); Yoon et al. *Control of hepatic gluconeogenesis through the transcriptional coactivator PGCH*, Nature 413(6852):131-138 (2001); Huss et al. *Estrogen-related receptor alpha directs peroxisome proliferator-activated receptor at signaling in the transcriptional control of energy metabolism in cardiac and skeletal muscle*, Mol. Cell Biol. 24(20):9079-9091 (2004); and, Mootha et al. *ERRα and Gabpa/b specify PGC-1alpha-dependent oxidative phosphorylation gene expression that is altered in diabetic muscle*, Proc. Natl. Acad. Sci. USA, 101(17):6570-6575 (2004).

These references support a physiological model of ERRα function in regulating energy metabolism and, in particular, in the transcriptional regulation of genes required for mitochondrial biogenesis, the tricarboxylic acid cycle, oxidative phosphorylation, fatty acid oxidation and lipid metabolism. In particular, ERRα induces the expression of Nuclear Respiratory Factor 1 (NRF1), GA-binding protein alpha (GABPα), and Peroxisome Proliferator-activated Receptor alpha (PPARα). The nuclear receptor coactivators Peroxisome Proliferator-activated Receptor gamma coactivator 1-alpha (PGC-1α), PGC-1β and Peroxisome Proliferator-activated Receptor gamma Coactivator-related protein 1 (PPRC-1α) are implicated in the regulation of these genes and in the autoregulation of the expression of ERRα. PGC-1α is expressed at low basal levels but is induced by fasting and other metabolic stresses. PGC-1β, a related coactivator, has similar functions, but its expression may not be regulated as acutely by variations in energy demand. Conversely, co-repressors that bind to ERRs, such as co-repressor nuclear Receptor Interacting Protein 140 (RIP140), compete with ERR co-activators to negatively regulate ERR-dependent gene expression.

The pleiotropic effect of ERRα activity on energy metabolism has interested the present inventors in the possibility that it should be a target for the discovery of new therapies for diseases in which metabolic disturbances or modifications play a central role, such as type-2 diabetes, progressive heart failure, osteoporosis and cancer. Of particular interest is ERRα as a novel target for tumor therapy, through effects on the regulation of tumor cell energy metabolism associated with energy stress within tumor microenvironments. And of specific interest, is ERRα as a novel target for therapeutic treatment of cancers with stem-like properties—Cancer Stem Cells (CSC), Tumor Initiating Cells (TIC) and Circulating Tumor Cells (CTC)—that rely on mitochondrial respiration for their energy requirements.

The initiation and development of cancer, in particular, is known to be associated with major metabolic alterations and mitochondria play a key role in tumorigenesis. A common abnormality observed in many cancer types—termed the Warburg effect—is a shift in glucose metabolism from oxidative phosphorylation to aerobic glycolysis and is characterized by a drastic increase in glucose consumption accompanied by an elevated rate of lactate excretion regardless of oxygen abundance: aerobic glycolysis meets the metabolic needs of highly proliferative cells, including providing sufficient energy and providing for the accumulation of precursors for anabolic reactions. LeBleu et al. *PGC-1alpha mediates mitochondrial biogenesis and oxidative phosphorylation in cancer cells to promote metastasis*. Nat. Cell Biol. 16(10):992-1 (2014) demonstrated that tumor cells display metabolic plasticity to engage either glycolysis or oxidative phosphorylation depending on the tumor environment and their proliferative or metastasizing phenotype during cancer progression. It is thus evident that the targeting of metastatic progenitors and resistant tumor cells should not only happen via the glycolytic route but also via the mitochondrial oxidative phosphorylation.

ERRα, together with PGC1α/β, controls the regulation of genes encoding enzymes in the tricarboxylic acid (TCA) cycle and oxidative phosphorylation. As discussed in Ariazi et al. *Estrogen-related receptor alpha and estrogen-related receptor gamma associate with unfavorable and favorable biomarkers, respectively, in human breast cancer*, Cancer Res.62(22):6510-8 (2002), ERRα is expressed in a range of cancerous cells—including breast and prostate cancerous cells—and is associated with more invasive disease and a higher risk of recurrences in both these cancer types.

Chang et al. The metabolic regulator ERRα, a downstream target of HER2/1GF-1R, *as a therapeutic target in breast cancer*, Cancer Cell 20, 500-510 (2011) and Fujimoto et al. *Clinical implication of estrogen-related receptor (ERR) expression in ovarian cancers*, J. Steroid Biochem. Mol. Biol. 104, 301-304 (2007) document that ERRα is expressed in most cancers and that increased activity of this receptor is associated with a negative outcome in both breast and ovarian cancers. In the first of these references, it is confirmed that the transcription factor is involved in mitochondrial biogenesis and also in the regulation of oxidative phosphorylation. This latter point is considered important as resistance to the inhibition of Kras pathway in pancreatic cancer, BRAF inhibitors in melanoma and oxaliplatin and 5-fluorouracil in colon cancer are also associated with a shift to oxidative metabolism.

The present inventors have therefore opined that inhibition of the activity of ERRα would enable a selective disruption of mitochondrial function in cancer, in particular in cancers of the aforementioned types. For this purpose, but equally for utility in the treatment of other ERRα mediated

SUMMARY OF THE INVENTION

In accordance with a first aspect of the present invention, there is provided a compound according to Formula I

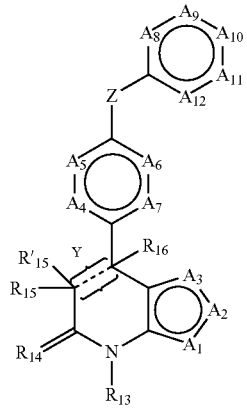

(Formula I)

or a pharmaceutically acceptable salt thereof, wherein:

Z is —OCH$_2$— or —CH$_2$O—;

Y is a single carbon-carbon bond or a double carbon-carbon bond, with the proviso that when Y is a double carbon-carbon bond, R'$_{15}$ and R$_{16}$ are not present;

one of the three positions A$_1$-A$_3$ is either S or NR$_4$, the remaining two positions A$_1$-A$_3$ are N or CR$_1$, CR$_2$, CR$_3$, respectively;

R$_4$ is H or methyl;

R$_1$-R$_3$ are independently H, methyl or halogen;

A$_4$-A$_7$ are N or CR$_4$, CR$_5$, CR$_6$ and CR$_7$, respectively, with the proviso that no more than two of the four positions A$_4$-A$_7$ can be simultaneously N;

A$_8$-A$_{12}$ are N or CR$_8$, CR$_9$, CR$_{10}$, CR$_{11}$ and CR$_{12}$, respectively, with the proviso that no more than two of the five positions A$_8$-A$_{12}$ can be simultaneously N;

R$_4$-R$_7$ are independently H, halogen, C(1-6)alkyl, amino, (di)C(1-3)alkylamino, C(1-3)alkoxy, C(1-3)alkoxyC(1-3)alkoxy, —C(O)OR$_{17}$, —C(O)NR$_{17}$R$_{17}$ or nitro, with all groups optionally substituted with one or more halogen or hydroxyl;

R$_8$-R$_{12}$ are independently H, halogen, C(1-3)alkoxy, C(1-6)alkyl, cyano, cyanoC(1-3)alkyl, amino, nitro, aminoC(1-3)alkyl, —C(O)OR$_{15}$, —CH$_2$C(O)OR$_{17}$, —C(O)NR$_{17}$R$_{17}$, —NHC(O)R$_{17}$, acetyl, hydroxyl, C(3-6)cycloalkyl, C(2-3)alkynyl, C(2-3)alkenyl, carboxyl C(1-3)alkyl, C(1-3)alkylsulfonyl, aminosulfonyl, (di)C(1-3)alkylamino, benzyl, SF$_5$ or CH(=O), with all groups optionally substituted with one or more halogen or hydroxyl;

or R$_9$ and either R$_8$ or R$_{10}$ are fused and form an aromatic or non-aromatic five to seven membered ring containing two to seven carbon atoms and zero to three heteroatoms; with all groups optionally substituted with one or more methyl, halogen or hydroxyl;

R$_{13}$ is H or methyl;

R$_{14}$ is NH, O or S;

R$_{15}$ and R'$_{15}$ are independently H, halogen, C(1-4)alkyl, cyano, carboxylic acid, —C(O)OR$_{17}$, —C(O)NR$_{17}$R$_{17}$;

R$_{16}$ is H; and,

R$_{17}$ is H, C(1-4)alkyl, aminoC(1-3)alkyl, C(1-5)heteroaryl or phenyl, with all groups optionally substituted with one or more halogen or hydroxyl.

In an embodiment, the invention relates to a compound according to Formula I in which A$_1$ is N, A$_2$ is NR$_4$ and A$_3$ is CR$_3$.

In another embodiment, the invention relates to a compound according to Formula I in which A$_1$ is N, A$_2$ is NH and A$_3$ is CH.

In another embodiment, the invention relates to a compound according to Formula I in which positions A$_4$, A$_5$, A$_6$ and A$_7$ are CR$_4$, CR$_5$, CR$_6$ and CR$_7$ respectively.

In another embodiment, the invention relates to a compound according to Formula I in which R$_5$ is C(1-3)alkoxy and R$_4$, R$_7$ and R$_7$ are H.

In another embodiment, the invention relates to a compound according to Formula I in which R$_5$ is methoxy and R$_4$, R$_6$ and R$_7$ are H.

In another embodiment, the invention relates to a compound according to Formula I in which positions A$_8$, A$_9$, A$_{10}$, A$_{11}$ and A$_{12}$ are CR$_8$, CR$_9$, CR$_{10}$, CR$_{11}$ and CR$_{12}$ respectively.

In another embodiment, the invention relates to a compound according to Formula I in which R$_8$-R$_{12}$ are independently H, C(1-6)alkyl, halogen, hydroxyl, NH$_2$, acetyl, C(1-3)alkoxy or SF$_5$.

In another embodiment, the invention relates to a compound according to Formula I in which R$_8$-R$_{12}$ are independently H, C(1-6)alkyl or halogen.

In another embodiment, the invention relates to a compound according to Formula I in which R$_8$ and R$_{10}$ are C(1-6)alkyl and R$_9$, R$_{11}$ and R$_{12}$ are H.

In another embodiment, the invention relates to a compound according to Formula I in which R$_8$ and R$_{10}$ are CF$_3$ and R$_9$, R$_{11}$ and R$_{12}$ are H.

In another embodiment, the invention relates to a compound according to Formula I in which wherein R$_{13}$ is H.

In another embodiment, the invention relates to a compound according to Formula I in which R$_{14}$ is O.

In another embodiment, the invention relates to a compound according to Formula I in which R$_{15}$ and R'$_{15}$ are H.

In another embodiment, the invention relates to a compound according to Formula I in which Z is —CH$_2$O— the CH$_2$ being connected to the aromatic ring containing A$_4$-A$_7$.

In another embodiment, the invention relates to a compound according to Formula I in which Y is a single carbon-carbon bond.

The above embodiments, where they relate to a preferred form of different substituents of Formula (I), are not intended to be mutually exclusive of one another. Rather, all combinations of these embodiments are envisaged within the scope of the present invention and, in certain circumstances, such combinations represent preferred structures for compounds of Formula 1. In that regard, particular mention may be made of compounds according to Formula I in which: R$_{14}$ is O; Z is —CH$_2$O—, the CH$_2$ thereof being connected to the aromatic ring containing A$_4$-A$_7$; and, Y is a single carbon-carbon bond. And further mention may be made of compounds according to Formula I in which: R$_8$ and R$_{10}$ are CF$_3$ and R$_9$, R$_{11}$ and R$_{12}$ are H; R$_{13}$ is H; R$_{14}$ is O; Z is —CH$_2$O—, the CH$_2$ being connected to the aromatic ring containing A$_4$-A$_7$; and, Y is a single carbon-carbon bond.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps. If used, the phrase "consisting of" is closed and excludes all additional elements. Further, the phrase "consisting essentially of" excludes additional material elements but allows the inclusion of non-material elements that do not substantially change the nature of the invention.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred", "preferably", "desirably" and "particularly" or synonyms thereof may be used frequently herein to refer to embodiments of the disclosure that may afford particular benefits, under certain circumstances. However, the recitation of one or more preferable, preferred, desirable or particular embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

As used herein "room temperature" is 23° C.±2° C.

Unless otherwise stated, the terms "halo" or "halogen" or "halide", as used herein by themselves or as part of another substituent, mean a fluorine, chlorine, bromine, or iodine atom. A preference for fluorine, chlorine or bromine is noted.

The term "heteroatom" as used herein represents nitrogen, oxygen or sulfur.

The usage of the term "radical" herein is consistent with the definition of said molecular entity in *IUPAC. Compendium of Chemical Terminology*, 2nd ed. (the "Gold Book"). Compiled by A. D. McNaught and A. Wilkinson, Blackwell Scientific Publications, Oxford (1997).

As used herein, "C(1-n)alkyl" group refers to a monovalent group that contains from 1 to n carbons atoms, that is a radical of an alkane and includes straight-chain and branched organic groups. As such, a "$C_1$-$C_{30}$ alkyl" group would refer to a monovalent group that contains from 1 to 30 carbons atoms, that is a radical of an alkane and includes straight-chain and branched organic groups. In the present invention, such alkyl groups may be unsubstituted or may be substituted with the groups mentioned herein below. The halogenated derivatives of hydrocarbon radicals might, in particular, be mentioned as examples of suitable substituted alkyl groups.

The term "C(1-6)alkyl" as used herein means a branched or unbranched alkyl group having 1-6 carbon atoms, for example methyl, ethyl, propyl, isopropyl, butyl, tert-butyl, n-pentyl and n-hexyl. All carbon atoms may optionally be substituted with one or more halogen or hydroxyl.

The term "C(1-4)alkyl" as used herein means an alkyl group having 1-4 carbon atoms, i.e. methyl, ethyl, propyl, isopropyl, butyl, isobutyl, sec-butyl or tert-butyl. All carbon atoms may optionally be substituted with one or more halogen or hydroxyl.

The term "C(1-3)alkyl" as used herein means an alkyl group having 1-3 carbon atoms, i.e. methyl, ethyl, propyl or isopropyl. All carbon atoms may optionally be substituted with one or more halogen or hydroxyl.

The term "C(1-2)alkyl" as used herein means an alkyl group having 1-2 carbon atoms, i.e. methyl or ethyl. All carbon atoms may optionally be substituted with one or more halogen or hydroxyl.

The term "C(3-6)cycloalkyl" as used herein means a saturated cyclic hydrocarbon having 3-6 carbon atoms, i.e. cyclopropyl, cyclobutyl, cyclopentyl or cyclohexyl. All carbon atoms may optionally be substituted with one or more halogen or methyl.

The term "C(2-3)alkynyl" as used herein means an alkynyl group having 2-3 carbon atoms, i.e. ethynyl, 1-propynyl or 2-propynyl. All carbon atoms may optionally be substituted with one or more hydroxyl.

The term "C(2-3)alkenyl" as used herein means an alkenyl group having 2-3 carbon atoms, i.e. ethene, 1-propene or 2-propene.

The term "C(1-3)alkoxy" means an alkoxy group having 1-3 carbon atoms, the alkyl moiety being branched or unbranched. All carbon atoms are optionally substituted with one or more F or hydroxyl.

The term "C(1-3)alkoxyC(1-3)alkyl" means a C(1-3)alkoxy attached to a C(1-3)alkyl, both with the same meaning as previously defined.

The term "C(1-3)alkoxyC(1-3)alkoxy" as used herein means a C(1-3)alkoxy attached to a C(1-3)alkoxy, the term C(1-3)alkoxy having the same meaning as previously defined.

The term "C(1-5)heteroaryl" as used herein means an aromatic group having 1-5 carbon atoms and 1-4 heteroatoms, which may be attached via a nitrogen atom if feasible, or a carbon atom. Examples include pyrrolyl, pyrazolyl, imidazolyl, isoxazolyl, furyl, thiophenyl, thiazolyl, isothiazolyl, triazolyl, tetrazolyl, oxazolyl, pyridinyl, pyrimidyl, pyrazinyl and triazinyl. All carbon atoms may optionally be substituted with one or more halogen or methyl.

The term "cyano" as used herein, represents a group of formula —CN.

The term "cyanoC(1-3)alkyl" means a cyano group attached to a C(1-3)alkyl group at any position, the terms "cyano" and "C(1-3)alkyl" having the same meaning as previously defined.

As used herein "nitro group" or "nitro" refers to —$NO_2$.

As used herein, the term "amino group" refers to a substituent of the formula —$NH_2$. It is intended that the term encompasses the protonated form thereof (—$NH_3$).

The term "aminoC(1-3)alkyl" means an amino group attached to a C(1-3)alkyl group at any position, said moiety "C(1-3)alkyl" having the same meaning as previously defined.

The term "(di)C(1-3)alkylamino" as used herein means an amino group, which is monosubstituted or disubstituted independently with C(1-3)alkyl group(s), having the same meaning as previously defined.

The term "C(1-3)alkylsulfonyl" denotes the group —$S(O)_2R$ in which R is a C(1-3)alkyl group, the term "C(1-3)alkyl" having the same meaning as previously defined.

The term "aminosulfonyl" denotes the group —$S(O)_2$—$NH_2$ wherein an amino group is attached to a sulfonyl moiety.

The term "carboxyl C(1-3)alkyl" denotes the group —C(O)OH attached to a C(1-3)alkyl. The term "C(1-3)alkyl" has the same meaning as previously defined.

The term "substituted" means that one or more hydrogens on the designated atom(s) is/are replaced by a selection from the indicated group, provided that: the designated atom's normal valency under the existing circumstances is not exceeded; and, the substitution results in a stable compound. Combinations of substituents are also permissible only if such combinations result in stable compounds. The terms "stable compound" or "stable structure" refers to a compound or structure that is sufficiently robust to survive both isolation to a useful degree of purity from a reaction mixture and formulation into an efficacious therapeutic agent.

The term "optionally substituted" means optional substitution with the specified groups, radicals or moieties.

As used herein "protecting group" refers to a moiety attached to a functional group to prevent an undesired reaction.

Preferably the protecting group may be easily removed after protection of the functional group is no longer required.

The compounds of Formula I may form salts, which are also within the scope of this invention. Reference to a compound of Formula I herein is understood to include reference to salts thereof, unless otherwise indicated.

The term "pharmaceutically acceptable salt" is used in accordance with its standard definition in the art to represent those salts which are, within the scope of medical judgment, suitable for use in contact with the tissues of humans and lower animals without, in particular, undue toxicity, irritation and/or allergic response: that use must be commensurate with a reasonable benefit to risk ratio. Pharmaceutically acceptable salts are well known in the art. They may either be obtained during the final isolation and purification of the compounds of the invention, or they may be obtained separately by reacting a free base function with: a suitable mineral acid, including but not limited to hydrochloric acid, phosphoric acid or sulfuric acid; or, an organic acid, including but not limited to ascorbic acid, citric acid, tartaric acid, lactic acid, maleic acid, malonic acid, fumaric acid, glycolic acid, succinic acid, propionic acid, acetic acid or methanesulfonic acid. An acid function of compounds of the invention can be reacted with a mineral base, like sodium hydroxide, potassium hydroxide or lithium hydroxide or with an organic base. For completeness, organic bases include the common hydrocarbyl and heterocyclic amine salts, such as diethylamino, morpholine and piperidine salts, for example.

The compounds of Formula I may contain asymmetric or chiral centers and therefore exist in different stereoisomeric forms. It is intended that all stereoisomeric forms of the compounds of Formula I as well as mixtures thereof, including racemic mixtures, form part of the present invention. In particular, stereoisomeric forms of the compounds of Formula I which, following the Cahn-Ingold-Prelog system of nomenclature, are in the S configuration on the chiral center next to the pyrazole ring definitively form part of the present invention.

As will be understood by the skilled artisan, enantiomers can be separated by: converting the enantiomeric mixture into a diastereomeric mixture by reaction with an appropriate optically active compound, for instance a chiral auxiliary such as a chiral alcohol or Mosher's acid chloride; separating the diastereomers; and, converting—by hydrolysis for example—the individual diastereomers to the corresponding pure enantiomers. Enantiomers can also be separated by use of chiral HPLC column.

It will be recognized further that various tautomers of compounds of Formula I may be possible: it is therefore intended that all tautomeric forms of compounds of Formula I form part of the invention. For completeness, as used herein, the term "tautomer" refers to the migration of protons between adjacent single and double bonds. The tautomerization process is reversible: tautomers will generally reach an equilibrium state wherein the double bond is resonantly shared between two bond lengths.

The present invention also relates to a pharmaceutical composition comprising compounds or pharmaceutically acceptable salts thereof having the general Formula I in admixture with pharmaceutically acceptable excipients and optionally other therapeutically active agents. The excipients must be "acceptable" in the sense of being compatible with the other ingredients of the composition and not deleterious to the recipients thereof.

The invention further includes a compound of Formula I in combination with one or more other drug(s).

Compositions include, but are not limited to, those suitable for oral, sublingual, subcutaneous, intravenous, intramuscular, nasal, local, or rectal administration, all in unit dosage forms for administration. For oral administration, the active ingredient may be presented as discrete units, such as tablets, capsules, powders, granulates, solutions, suspensions and the like.

For parenteral administration, the pharmaceutical composition of the invention may be presented in unit-dose or multi-dose containers, such as injection liquids in predetermined amounts, presented for example in sealed vials and ampoules. The pharmaceutical composition may also be stored in a freeze dried (lyophilized) condition requiring only the addition of sterile liquid carrier—such as water—prior to use.

Mixed with such pharmaceutically acceptable auxiliaries, the active agent may be compressed into solid dosage units, such as pills, tablets, or be processed into capsules or suppositories. By means of pharmaceutically acceptable liquids, the active agent can be applied as a fluid composition—in the form of a solution, suspension or emulsion for instance—which may be included in an injection preparation or in a spray, such as a nasal spray.

For making solid dosage units, the use of conventional additives such as fillers, colorants, polymeric binders and the like is contemplated. In general, any pharmaceutically acceptable additive which does not interfere with the function of the active compounds can be used. Suitable carriers with which the active agent of the invention can be administered as solid compositions include lactose, starch, cellulose derivatives and the like, or mixtures thereof, when used in suitable amounts. For parenteral administration, aqueous suspensions, isotonic saline solutions and sterile injectable solutions may be used, which suspensions or solutions may contain pharmaceutically acceptable dispersing agents and/or wetting agents, such as propylene glycol or butylene glycol.

The invention further includes a pharmaceutical composition, as herein before described, in combination with packaging material suitable for said composition, said packaging material including instructions for the use of the composition for the purposes as hereinbefore described.

The exact dose and regimen of administration of the active ingredient, or a pharmaceutical composition thereof, may vary with the particular compound, the route of administration, and the age and condition of the individual subject to whom the medicament is to be administered.

In general parenteral administration requires lower dosages than other methods of administration which are more dependent upon absorption. That aside, a dosage for humans preferably contains from 0.0001 to 100 mg per kg body weight. The desired dose may be presented as one dose or as multiple sub-doses administered at appropriate intervals throughout the day.

The compounds according to the invention or a pharmaceutically acceptable salt thereof can be used as medicament in therapy.

Another aspect of the invention resides in the use of compounds having the general Formula I or a pharmaceutically acceptable salt thereof for the therapeutic and/or prophylactic treatment of ERRα-mediated diseases or ERRα mediated conditions. In particular, the invention provides for the use of compounds having the general Formula I or a pharmaceutically acceptable salt thereof for the treatment of ERRα-mediated cancer.

The compounds having the general Formula I or a pharmaceutically acceptable salt thereof can be used in therapies to treat at least one condition selected from: lung cancer; melanoma; endometrial cancer; and, acute myeloid leukemia. Without intention to limit this aspect of the present invention, the compounds having the general Formula I or a pharmaceutically acceptable salt thereof may in particular be used in therapies to treat: superficial spreading melanoma; lentigo maligna; acral lentiginous melanoma; nodular melanoma; amelanotic melanoma; ocular melanoma; melanoma of the vulva; or, vaginal melanoma.

In another aspect, the compounds having the general Formula I or a pharmaceutically acceptable salt can be used in therapies to treat at least one condition selected from: breast cancer; bladder cancer; prostrate cancer; pancreatic cancer; colorectal cancer; and, ovarian cancer.

In another aspect, the compounds having the general Formula I or a pharmaceutically acceptable salt can be used to treat Type II Diabetes Mellitus.

Herein is also provided a method of treating at least one condition selected from: lung cancer; melanoma; endometrial cancer; and, acute myeloid leukemia, said method comprising administering to a patient in need thereof a therapeutically effective amount of a compound according to Formula I or a pharmaceutically acceptable salt thereof.

There is also provided a method of treating at least one condition selected from: superficial spreading melanoma; lentigo maligna; acral lentiginous melanoma; nodular melanoma; amelanotic melanoma; ocular melanoma; melanoma of the vulva; and, vaginal melanoma, said method comprising administering to a patient in need thereof a therapeutically effective amount of a compound according to Formula I or a pharmaceutically acceptable salt thereof.

There is also provided a method of treating at least one condition selected from: breast cancer; bladder cancer; prostrate cancer; pancreatic cancer; colorectal cancer; and, ovarian cancer, said method comprising administering to a patient in need thereof a therapeutically effective amount of a compound according to Formula I or a pharmaceutically acceptable salt thereof.

There is also provided a method of treating Type II Diabetes Mellitus, said method comprising administering to a patient in need thereof a therapeutically effective amount of a compound according to Formula I or a pharmaceutically acceptable salt thereof.

The phrase "therapeutically effective amount" as used herein, means the amount of the subject compound or composition that is effective in producing the desired therapeutic effect.

DETAILED DESCRIPTION OF THE INVENTION

As depicted in the Examples below, in certain exemplary embodiments compounds are prepared according to the following general procedures. It will be appreciated that, whilst the general methods depict the synthesis of certain compounds of the invention, the following general methods and other methods know to one skilled in the art, can be applied to all compounds and subclasses and species of each of these compounds, as described herein.

General Methods of Preparation

The compounds described herein, including compounds of general Formula I, Building Block I and Building Block II, are prepared by the reaction schemes depicted below. Furthermore, in the following schemes, where specific acids, bases, reagents, coupling agents, catalysts, solvents and the like are mentioned, it is understood that other suitable acid, bases, reagents, coupling agents, catalysts, solvents, etc. may be used and are included within the scope of the present invention. Modifications to the reaction conditions—for example, temperature, duration of the reaction or combinations thereof—are envisioned as part of the present invention.

The compounds obtained by using the general reaction sequences may be of insufficient purity. The compounds can be purified by using any of the methods for purification of organic compounds, for example, crystallization or silica gel or alumina column chromatography using different solvents in suitable ratios. All possible stereoisomers are envisioned within the scope of the invention.

Abbreviations for the materials employed in the Reaction Schemes and Examples are as follows:

AcOH: acetic acid; ACN: acetonitrile; AIBN: Azobisisobutyronitrile; $BH_3 \cdot THF$: Borane-tetrahydrofuran $Boc_2O$: Di-tert-butyl dicarbonate; DAST: (Diethylamino) sulfur trifluoride; DBU: 1,8-Diazabicyclo[5.4.0]undec-7-ene; DCM: dichloromethane; DDQ: 2,3-Dichloro-5,6-dicyano-1,4-benzoquinone; DIAD: Diisopropyl azodicarboxylate; DiBAl—H: Diisobutylaluminium hydride; DMAP: 4-dimethylaminopyridine; DMF: N,N-dimethylformamide; EDC: 1-Ethyl-3-(3-dimethylaminopropyl)carbodiimide; $Et_2O$: di-ethyl ether; EtOAc: ethyl acetate; HATU: 1-[Bis(dimethylamino)methylene]-1H-1,2,3-triazolo[4,5-b]pyridinium 3-oxid hexafluorophosphate; HOBt: Hydroxybenzotriazole; KOAc: potassium acetate; MeMgBr: methylmagnesium bromide; MeOH: Methanol; $Me_2S \cdot BH_3$: Borane dimethylsulfide; NBS: N-bromosuccinimide; NMO: 4-methylmorpholine N-oxide; $PdCl_2(PPh_3)_2$: Bis(triphenylphosphine)palladium(II) dichloride; Pd(dppf) $Cl_2$: [1,1'-bis(diphenylphosphino)ferrocene]dichloropalladium(II); $Pd(PPh_3)_4$: Tetrakis(triphenylphosphine)palladium(0); PhSCu(I): phenylsulfanylcopper; $PPh_3$: Tripenylphosphine; p-TsOH: paratoluenesulfonic acid; tBuOK: potassium tert-butoxide; tBuONO: tert-Butyl nitrite; TEA: triethylamine; TEMPO: 2,2,6,6-tetramethylpiperidinyloxyl; THF: tetrahydrofuran; TMS-Cl: trimethylsilyl chloride; TOSMIC: Tosylmethylisocyanide.

Chemical names are preferred IUPAC names, generated by using Marvin Sketch 17.24.1. If a chemical compound is referred to using both a chemical structure and a chemical name, and an ambiguity exists between the structure and the name, the structure predominates.

Scheme 1

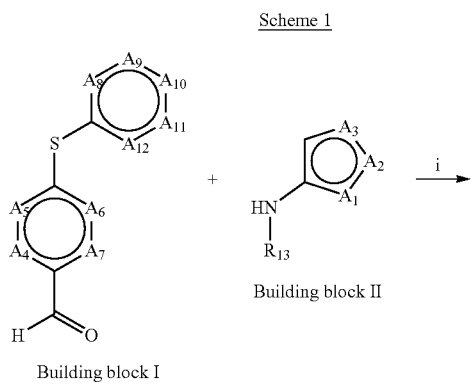

Building block I + Building block II →i

To obtain derivatives of Formula I wherein $R_{14}$ is sulphur, the derivatives of Formula I wherein $R_{14}$ is oxygen can be reacted with, for example, Lawesson's reagent.

To obtain derivatives of Formula I wherein $R_{14}$ is nitrogen, the derivatives of Formula I wherein $R_{14}$ is sulphur can be reacted with, for example, ammonia in MeOH.

If Building block I contains an amine or an aldehyde moiety in $R_4$-$R_{12}$, this moiety should be protected with a proper protecting group prior to the reaction with the building block II derivative and Meldrum's acid, and should be deprotected afterwards, using well known methods, to obtain the desired Formula I analog. Via this route, amines can be obtained which can be further derivatized, using well known methods, to provide secondary or tertiary amines or amides.

If one of $R_4$-$R_7$ in a Formula I analog is nitro, the nitro can be reduced using, for instance, iron and ammonium chloride in a water/THF/MeOH mixture, to obtain a Formula I analog containing an amine on $R_4$-$R_7$.

If one of $R_4$-$R_7$ in a Formula I analog is a methyl ester, this ester can be saponificated under basic conditions to obtain the corresponding carboxylic acid. When this acid is reacted with alcohols and amines, using methods known in the art, esters and amides can be formed.

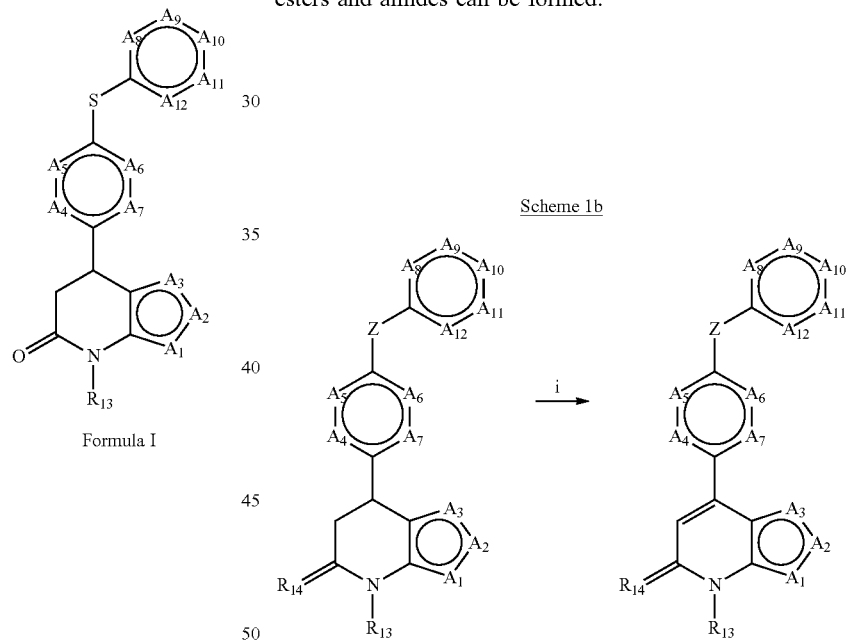

Formula I

Scheme 1b

Conditions: i) Meldrum's acid, MeOH

As depicted in Scheme 1, the derivatives of the invention having Formula I, wherein $R_{14}$ is oxygen, each of $R_{15}$, $R'_{15}$ and $R_{16}$ is H and Y is a single carbon-carbon bond, can be prepared by methods known in the art of organic chemistry. Compounds of the invention can be obtained by a reaction between a derivative of building block I, wherein Z, $A_4$, $A_5$, $A_6$, $A_7$, $A_8$, $A_9$, $A_{10}$, $A_{11}$ and $A_{12}$ have the meaning as previously described, a derivative of building block II, wherein $R_{13}$, $A_1$, $A_2$ and $A_3$ have the meaning as previously described, and Meldrum's acid.

Conditions: i) DDQ, 1,4-dioxane

Scheme 1b depicts a general route for the preparation of Formula I analogs wherein Y is a double carbon-carbon bond, $R_{15}$ is H and Z, $R_{13}$, $R_{14}$, $A_1$, $A_2$, $A_3$, $A_4$, $A_5$, $A_6$, $A_7$, $A_8$, $A_9$, $A_{10}$, $A_{11}$ and $A_{12}$ have the meaning as previously described.

Derivatives of Formula I, wherein Y is a single carbon-carbon bond, can be oxidized, using for example DDQ in an appropriate solvent, to obtain derivatives of Formula I, wherein Y is a double carbon-carbon bond.

Scheme 1c

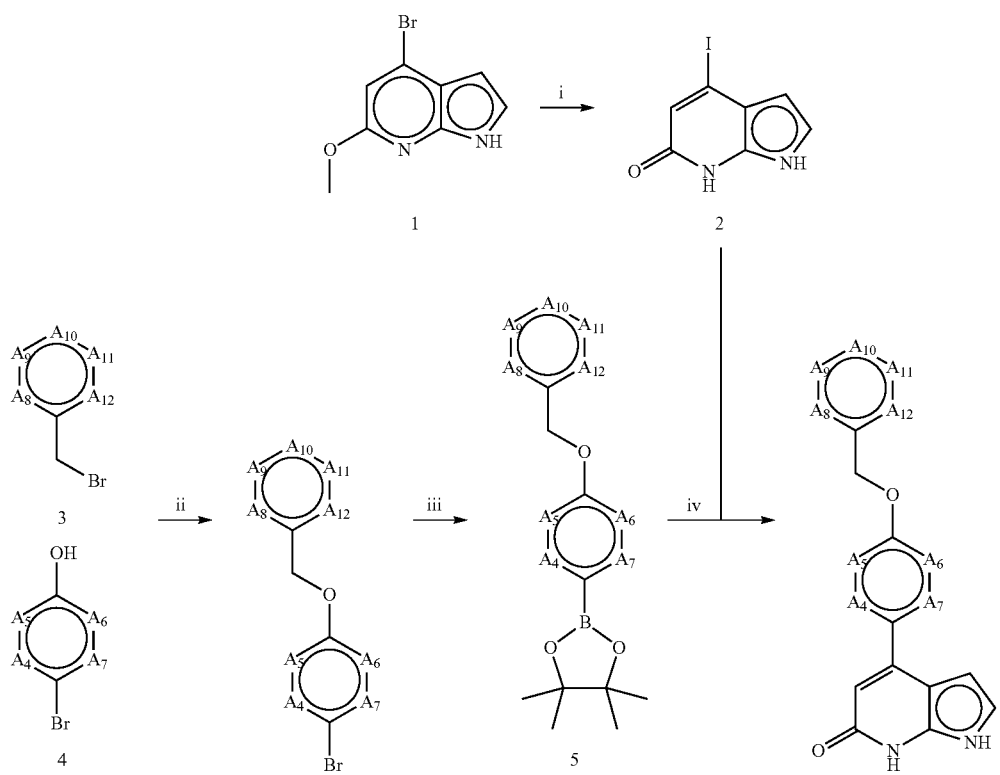

Conditions: i) TMS-Cl, KI, ACN;
ii) K$_2$CO$_3$, ACN;
iii) bis(pinacolato)diboron, Pd(DPPF)Cl$_2$·DCM, KOAc, 1,4-dioxane; and,
iv) Pd(PPh$_3$)$_4$, K$_2$CO$_3$, 1,4-dioxane/water.

Scheme 1c shows an alternative way to make Formula I analogs wherein Y is a double carbon-carbon bond, Z is —OCH$_2$, A$_1$ is NH, A$_2$ and A$_3$ are CH, R$_{13}$ and R$_{15}$ are H, and R$_{14}$=O. A$_4$, A$_5$, A$_6$, A$_7$, A$_8$, A$_9$, A$_{10}$, A$_{11}$ and A$_{12}$ have the meaning as previously described. Bromopyrrolopyridine 1 can be demethylated using for example TMS-Cl and KI in ACN. When these conditions are applied, the bromine is substituted for an iodine to give iodopyrrolopyridine 2.

Boronic ester building block 5 was obtained via coupling of benzylbromide 3 with phenol 4, using for instance K$_2$CO$_3$, followed by the introduction of the boronic ester using, for example, bis(pinacolato)diboron, Pd(dppf)Cl$_2$·DCM and KOAc in 1,4-dioxane. When building blocks 2 and 5 were coupled via a palladium catalyzed reaction, using for example Pd(PPh$_3$)$_4$ and K$_2$CO$_3$ in 1,4-dioxane/water, the corresponding Formula I analogs were obtained.

Scheme 1d

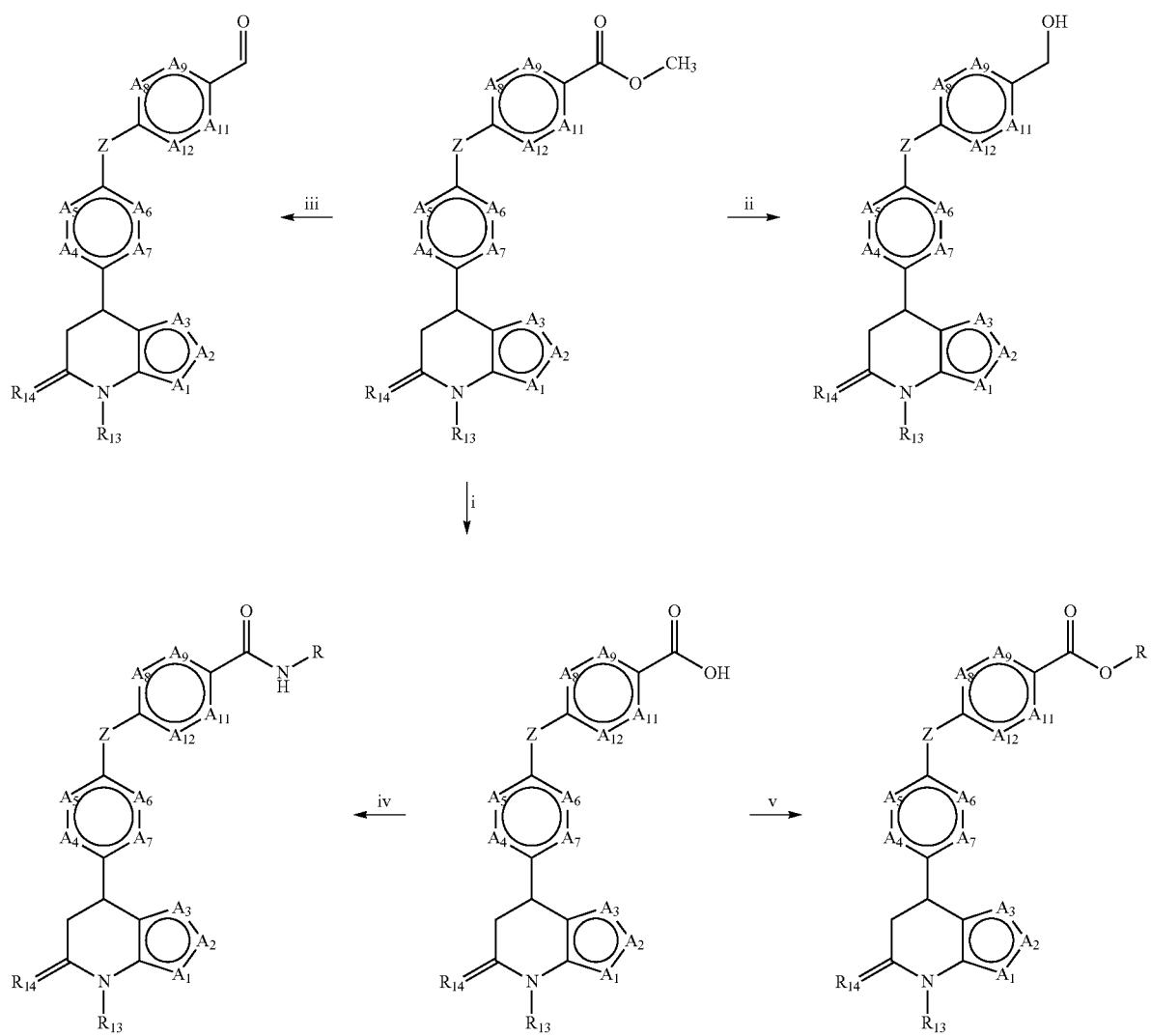

Conditions: i) LiOH, THF/water;
ii) LiOH, THF/water followed by Me₂S·BH₃, THF;
iii) DiBAl—H, THF;
iv) RNH₂, EDC, DMAP, DCM; and,
v) ROH, EDC, DMAP, DMF Scheme 1d depicts several options to functionalize Formula I analogs wherein $A_{10}$ is $CR_{10}$ in which $R_{10}$ is $CO_2Me$, Y is a single carbon-carbon bond and each of $R_{15}$, $R'_{15}$ and $R_{16}$ is H. Z, $R_{13}$, $R_{14}$, $A_1$, $A_2$, $A_3$, $A_4$, $A_5$, $A_6$, $A_7$, $A_8$, $A_9$, $A_{11}$ and $A_{12}$ have the meaning as previously described. When Formula I contains an ester moiety in $R_{10}$, this can be saponificated using, for instance, LiOH in THF/water, to obtain the carboxylic acid analog of Formula I. The carboxylic acid analogs can be converted to the corresponding amides and esters for example by reaction with amines or alcohols using well known methods. In another occurrence the ester moiety can be reduced to obtain either the —CH₂OH or the —CHO analog. In scheme 1d this is exemplified for $R_{10}$, these conversions can also be applied for an ester moiety in any of the positions $R_4$ to $R_{12}$.

Scheme 1e

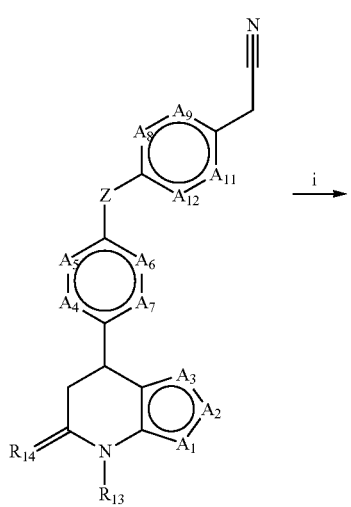

17
-continued

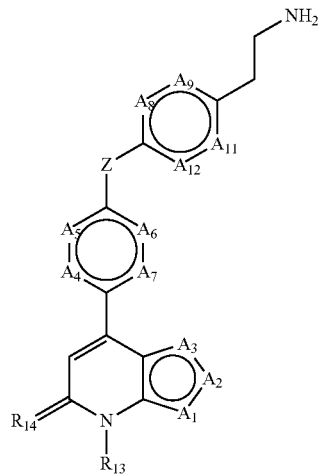

Conditions: i) Ammonia in MeOH, Raney-Nickel, MeOH.

Scheme 1e depicts a general route for the preparation of Formula I analogs wherein Y is a single carbon-carbon bond and each of $R_{15}$, $R'_{15}$ and $R_{16}$ is H. Z, $R_{13}$, $R_{14}$, $A_1$, $A_2$, $A_3$, $A_4$, $A_5$, $A_6$, $A_7$, $A_8$, $A_9$, $A_{11}$ and $A_{12}$ have the meaning as previously described. When Formula I contains a nitrile moiety in $R_{10}$, this can be reduced using, for instance, ammonia in MeOH and Raney-Nickel as catalyst, to obtain the saturated alkyl analog of Formula I. In scheme 1e this is exemplified for $R_{10}$ but these conversions can also be applied for a nitrile moiety in any of the positions $R_4$ to $R_{12}$.

Scheme 1f

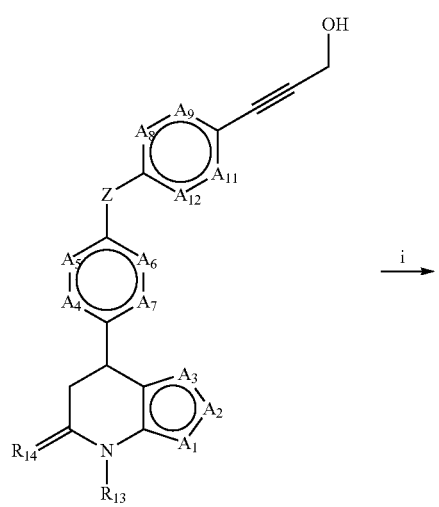

18
-continued

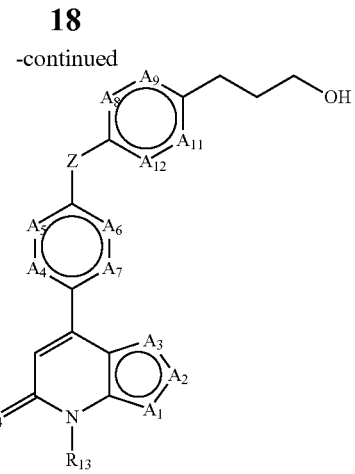

Conditions: I) Hydrogen Gas, Pd/C, MeOH.

Scheme 1f depicts a general route for the preparation of Formula I analogs wherein Y is a single carbon-carbon bond and each of $R_{15}$, $R'_{15}$ and $R_{16}$ is H. Z, $R_{13}$, $R_{14}$, $A_1$, $A_2$, $A_3$, $A_4$, $A_5$, $A_6$, $A_7$, $A_8$, $A_9$, $A_{11}$ and $A_{12}$ have the meaning as previously described. When Formula I contains a triple bond in $R_{10}$, this can be reduced, using for instance hydrogen gas with Pd/C in MeOH, to obtain the saturated alkyl analog of Formula I. Whilst in scheme 1f this is exemplified for $R_{10}$, these conversions can also be applied for a triple bond moiety in any of the positions $R_4$ to $R_{12}$.

Scheme 1g

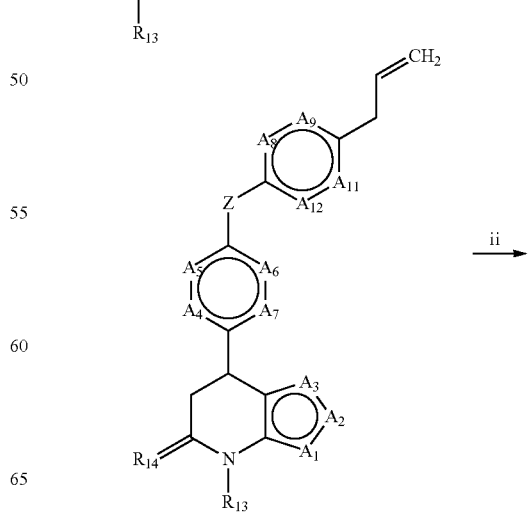

-continued

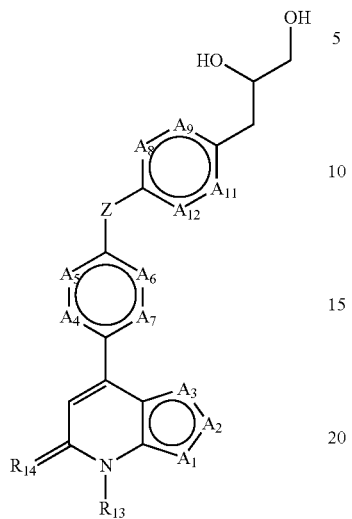

Conditions: i) allyltri-n-butyltin, Pd(PPh$_3$)$_2$Cl, PPh$_3$, DMF; and,
ii) OsO$_4$, NMO, acetone/water Scheme 1g depicts a general route for functionalizing Formula I analogs wherein Y is a single carbon-carbon bond, A$_{10}$ is C—Br, each of R$_{15}$, R'$_{15}$ and R$_{16}$ is H and Z, R$_{13}$, R$_{14}$, A$_1$, A$_2$, A$_3$ A$_4$, A$_5$, A$_6$, A$_7$, A$_8$, A$_9$, A$_{11}$ and A$_{12}$ have the meaning as previously described. The bromine containing analog can be reacted with allyltri-n-butyltin under Stille conditions. The obtained allyl containing analog of Formula I can be further reacted via an Upjohn dihydroxylation to obtain the di-hydroxyl containing analog of Formula I. Whilst in scheme 1g this is exemplified for R$_{10}$, these conversions can also be applied for a bromine moiety in any of the positions R$_4$ to R$_{12}$.

Scheme 1h

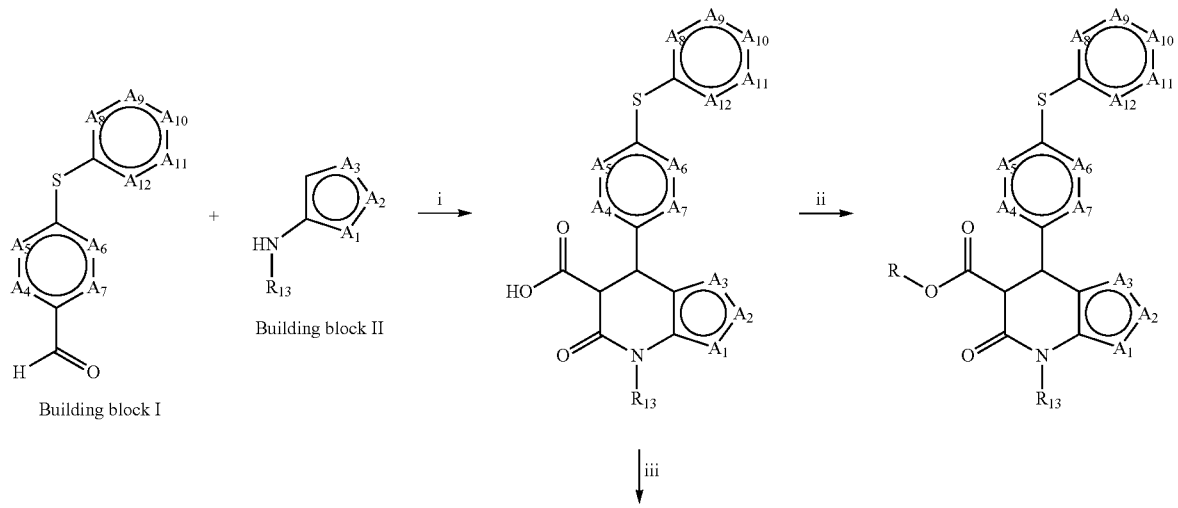

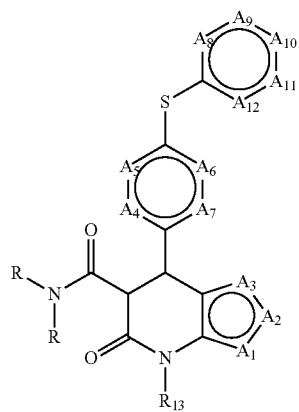

Conditions: i) Meldrum's acid, MeOH;
ii) ROH, DIAD, PPh₃, THF; and,
iii) R₂NH, EDC, DMAP, DCM.

Scheme 1h depicts a general route for the preparation of Formula I analogs wherein Y is a single carbon-carbon bond, $R_{14}$ is oxygen, $R_{15}$ is COOH and each of $R'_{15}$ and $R_{16}$ is H. Compounds of the invention can be obtained by a reaction between a derivative of building block I, wherein Z, $A_4$, $A_5$, $A_6$, $A_7$, $A_8$, $A_9$, $A_{10}$, $A_{11}$ and $A_{12}$ have the meaning as previously described, a derivative of building block II, wherein $R_{13}$, $A_1$, $A_2$, $A_3$ have the meaning as previously described, and Meldrum's acid at room temperature.

When $R_{15}$ is COOH, this carboxylic acid moiety can be functionalized towards an ester, using for example an alcohol, DIAD and PPh₃ in THF. Or it can be functionalized towards an amide, using for example a primary or secondary amine, EDC and DMAP in DCM.

Scheme 1i

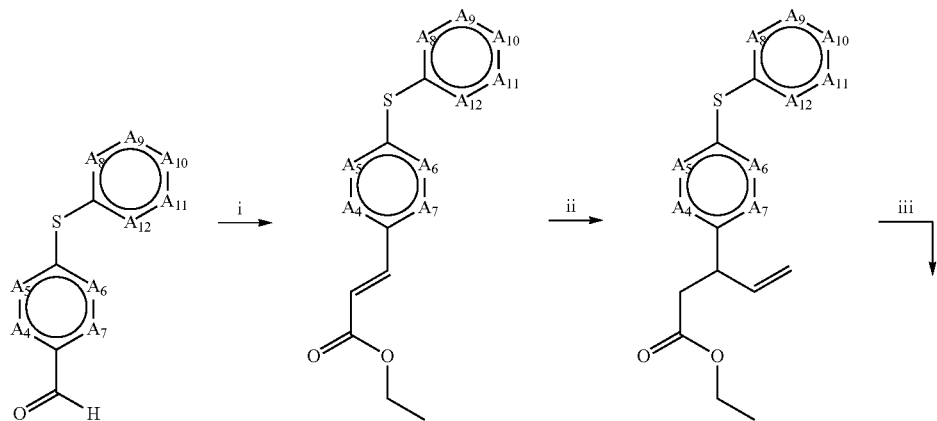

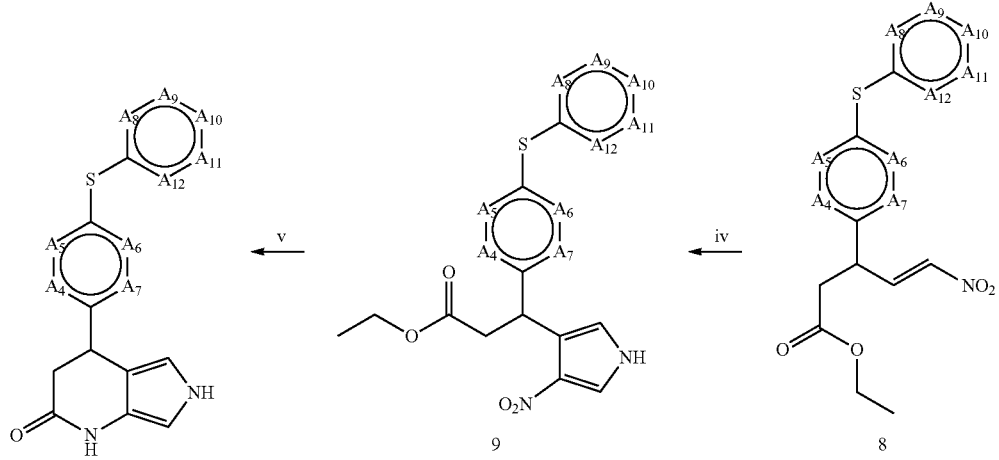

Conditions: i) CH₃CH₂OCOCH₂P(Ph)₃Br, tBuOK, Et₂O;
ii) CH₂CHMgBr, PhSCu(I), THF;
iii) TEMPO, tBuONO, 1,4-dioxane;
iv) TOSMIC, tBuOK, THF; and,
v) Zn, AcOH.

Scheme 1i illustrates a general route for the formation of Formula I analogs wherein $A_1$ and $A_3$ are CH, $A_2$ is NH, Y is a single carbon-carbon bond, $R_{14}$ is oxygen, $R_{13}$ is H, each of $R_{15}$, $R'_{15}$ and $R_{16}$ is H and Z, $A_4$, $A_5$, $A_6$, $A_7$, $A_8$, $A_9$, $A_{10}$, $A_{11}$ and $A_{12}$ have the meaning as previously described.

Intermediate 7 can be obtained via a Wittig reaction of Building block I, using for example CH₃CH₂OCOCH₂P(Ph)₃Br and tBuOK in Et₂O, followed by a reaction with, for instance, vinylmagnesium bromide and PhSCu(I) in THF. The subsequent introduction of the nitro group in the E-confirmation can be achieved by using, for example, TEMPO and tBuONO in 1,4-dioxane. Pyrrole intermediate 9 was obtained via a [3+2]cycloaddition of intermediate 8, using for instance TOSMIC and tBuOK in THF. The reduction of the nitro, followed by the ring closure to obtain the Formula I analog, was performed in a single step by using, for example, zinc dust in AcOH.

Scheme 2

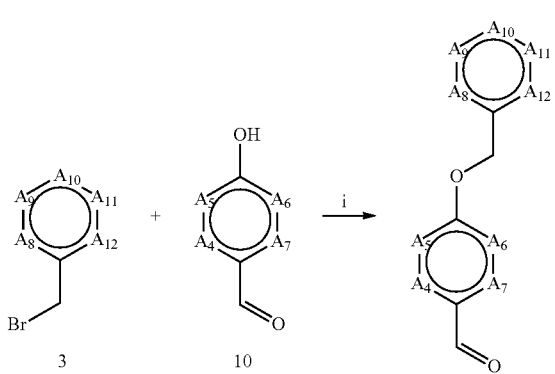

Conditions: i) K₂CO₃, ACN

Scheme 2 depicts a general method for preparing benzaldehyde Building Block I derivatives, wherein Z is —OCH₂— and $A_4$, $A_5$, $A_6$, $A_7$, $A_8$, $A_9$, $A_{10}$, $A_{11}$ and $A_{12}$ have the meaning as previously described.

Alkylation of parahydroxybenzaldehyde 10 with benzylhalide 3 under basic conditions using, for example, K₂CO₃, gives the corresponding benzaldehyde derivatives of building block I. The desired benzylhalide 3 can also be obtained from the corresponding toluene or benzyl alcohol via bromination reactions which are well known in the art.

Building Block I derivatives containing one bromide in $R_8$-$R_{12}$ can be further derivatized, after acetal protection of the aldehyde, using palladium catalyzed couplings. After the coupling, the aldehyde is deprotected again to obtain the Building Block I analog. When an ester moiety is obtained after the palladium catalyzed coupling, this ester moiety can be reduced, prior to the deprotection of the aldehyde, to obtain a hydroxylated alkyl moiety in $R_8$-$R_{12}$. Then the aldehyde is deprotected to obtain the desired Building Block I analog. In another embodiment, when an ester moiety is obtained after a palladium catalyzed reaction, this ester can be reacted with a Grignard reagent to obtain a tertiary alcohol.

The Building Block I analog which contains a hydroxyl in $R_{10}$, can be obtained from the corresponding bromine analog of Building Block I, by first protecting the aldehyde with an acetal. Then the bromine is converted to a boronic ester via a palladium catalyzed coupling, followed by a reaction with hydrogen peroxide to introduce the hydroxyl moiety. After deprotection of the aldehyde the Building block I analog is obtained.

A bromine in $R_8$-$R_{12}$ of Building block I can also be substituted with ethylene glycol, by using for example copper (II) bromide and potassium carbonate.

In another embodiment, when $R_4$-$R_7$ in Building block I is a fluorine, this fluorine can be substituted under basic conditions—such as K₂CO₃ in DMF at 110° C.—using an appropriate amine to obtain the corresponding alkylamine analog of Building block I.

Scheme 2b

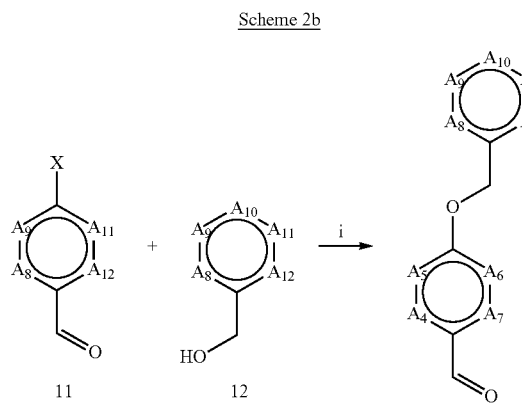

Scheme 3b

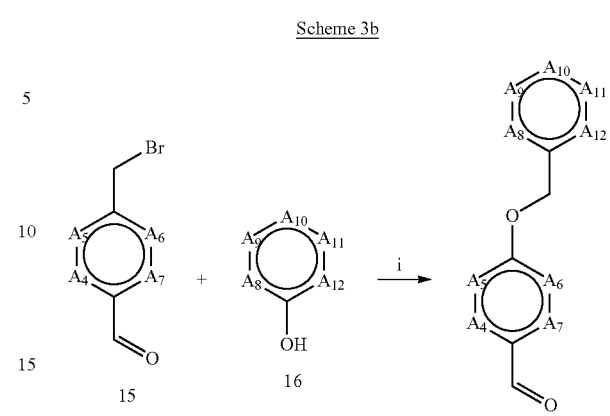

Conditions: (X=F; when $A_5=A_6=N$ then X=Cl)

i) NaH, DMF

Scheme 2b depicts an alternative method for preparing benzaldehyde Building Block I derivatives, wherein Z is —OCH$_2$— and $A_4, A_5, A_6, A_7, A_8, A_9, A_{10}, A_{11}$ and $A_{12}$ have the meaning as previously described.

Benzaldehyde 11 can be reacted with benzyl alcohol 12 under basic conditions by using, for instance, sodium hydride in DMF, to obtain Building block I analogs.

Benzyl alcohol 12 can be obtained via reduction of the corresponding benzaldehyde by using, for instance, BH$_3$·THF complex.

Conditions: i) K$_2$CO$_3$, DMF

Scheme 3b depicts a general method for preparing benzaldehyde building block I derivatives, wherein Z is —CH$_2$O— and $A_4, A_5, A_6, A_7, A_8, A_9, A_{10}, A_{11}$ and $A_{12}$ have the meaning as previously described.

Alkylation of phenol 16 with benzaldehyde 15 under basic conditions using, for example, K$_2$CO$_3$, gives the corresponding benzaldehyde derivatives of building block I.

When the obtained building block I contains a bromine on $R_{10}$, this position can be functionalized using a palladium catalyzed reaction, for example with Pd(PPh$_3$)$_4$, CuI, DBU and propargyl alcohol.

Scheme 3

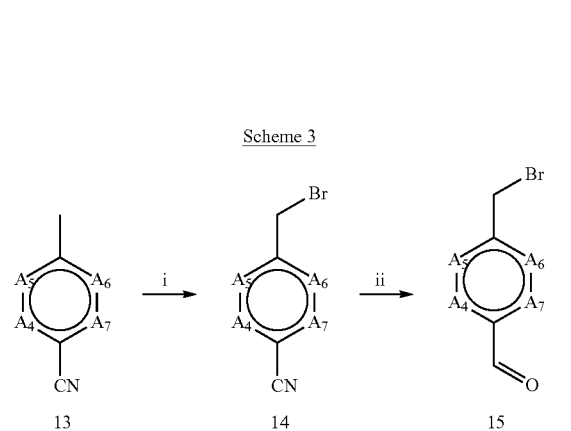

Scheme 3c

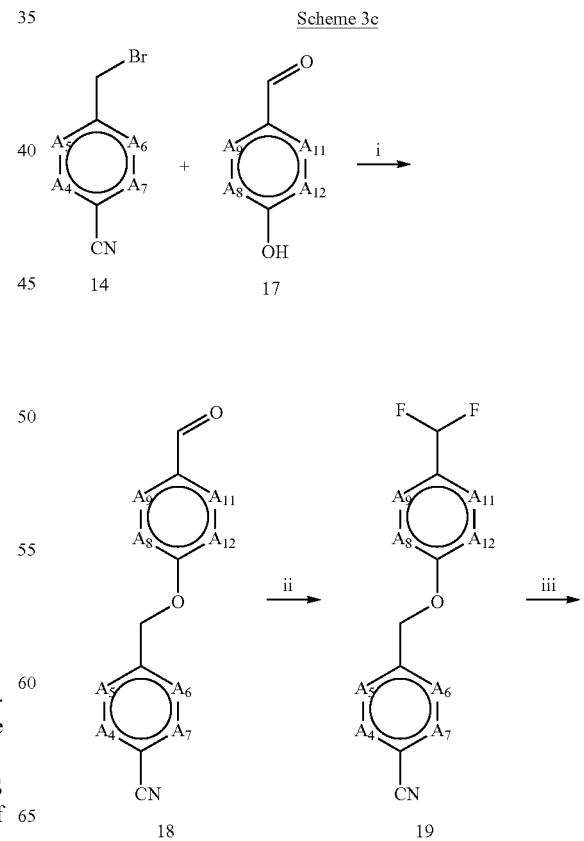

Conditions: i) NBS, AIBN, ACN; and, ii) DiBAl—H, toluene

Scheme 3 depicts a general method for preparing benzaldehyde 15 derivatives, wherein $A_4, A_5, A_6$, and $A_7$ have the meaning as previously described.

Bromination of benzonitrile 13 using, for example NBS and AIBN in ACN, gives benzonitrile 14. After reduction of the nitrile using, for example DiBAl—H in toluene, benzaldehyde 15 derivatives can be prepared.

-continued

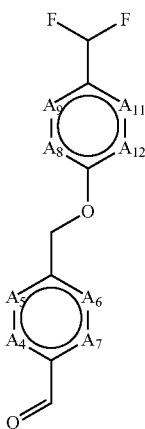

Conditions: i) K$_2$CO$_3$, ACN;
ii) DAST, DCM; and,
iii) DiBAl—H, toluene.

Scheme 3c depicts a general method for preparing benzaldehyde building block I derivatives, wherein A$_{10}$ is CF$_2$, Z is —CH$_2$O— and A$_4$, A$_5$, A$_6$, A$_7$, A$_8$, A$_9$, A$_{11}$ and A$_{12}$ have the meaning as previously described. Alkylation of phenol 17 with benzonitrile 14 under basic conditions using, for example K$_2$CO$_3$, gives the corresponding aldehyde 18. The aldehyde can be converted to a CF$_2$ group using a fluorinating agent, for example DAST. Via reduction of the nitrile—using, for example, DiBAl—H in toluene—benzaldehyde building block I derivatives can be prepared. In scheme 3c this is exemplified for R$_{10}$, these conversions can also be applied for an aldehyde moiety in any of the positions R$_4$ to R$_{12}$.

The following examples are illustrative of the present invention and are not intended to limit the scope of the invention in any way.

EXAMPLES

All building blocks used are commercially available, known or prepared according to methods known to those skilled in the art.

Examples 1-220

1: 4-(3-methoxy-4-{[2-(trifluoromethyl)phenyl]methoxy}phenyl)-2H,4H,5H,6H,7H-pyrazolo[3,4-b]pyridin-6-one

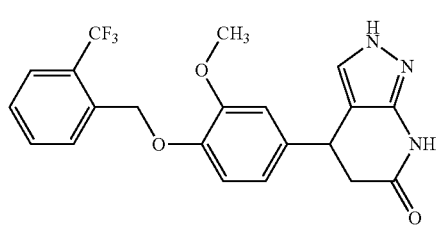 [SMILES: COc1cc(C2CC(=O)Nc3n[nH]cc32)ccc1OCc1ccccc1Cl]

i) To a solution of 2-(trifluoromethyl)benzylbromide (0.93 g) in ACN (60 mL) was added K$_2$CO$_3$ (2.53 g) and vanillin (1.46 g). The reaction mixture was heated to 70° C. and stirred overnight. After cooling to room temperature, the reaction mixture was concentrated under reduced pressure and the resulting crude product was partitioned between water and DCM. The water layer was extracted twice more with DCM and the combined organic layers were washed with brine, dried over MgSO$_4$, filtered and concentrated under reduced pressure to afford 1.76 g of 3-methoxy-4-{[2-(trifluoromethyl)phenyl]methoxy}benzaldehyde. The product was used in the next step without further purification.

ii) The product obtained in the previous step (377 mg), Meldrum's acid (175 mg) and 3-aminopyrazole (101 mg) were dissolved in MeOH. The reaction mixture was heated to 65° C. and stirred overnight. After cooling to room temperature, the product precipitated. The solids were filtered off and washed with MeOH to obtain 4-(3-methoxy-4-{[2-(trifluoromethyl)phenyl]methoxy}phenyl)-2H,4H,5H,6H,7H-pyrazolo[3,4-b]pyridin-6-one (289 mg) as an off white solid. MS(ES$^+$) m/z 418.2 (M+H)$^+$.

Following a procedure analogous to that described for Example 1, using appropriate starting materials, the following compounds have been prepared.

2: 4-{4-[(2-chlorophenyl)methoxy]-3-methoxyphenyl}-2H,4H,5H,6H,7H-pyrazolo[3,4-b]pyridin-6-one

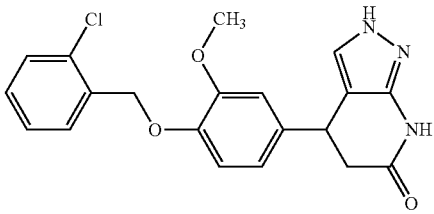

MS(ES$^+$) m/z 384.2 (M+H)$^+$.

3: 4-{4-[(4-chlorophenyl)methoxy]-3-methoxyphenyl}-2H,4H,5H,6H, 7H-pyrazolo[3,4-b]pyridin-6-one

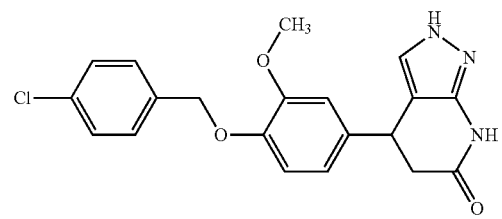 [SMILES: COc1cc(C2CC(=O)Nc3n[nH]cc32)ccc1OCc1ccc(Cl)cc1]

MS(ES$^+$) m/z 384.2 (M+H)$^+$.

4: 4-{4-[(2-bromophenyl)methoxy]-3-methoxyphenyl}-2H,4H,5H,6H, 7H-pyrazolo[3,4-b]pyridin-6-one

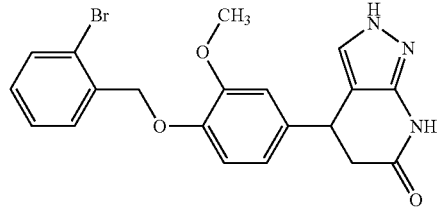

MS(ES⁺) m/z 350.2 (M+H)⁺.

5: 4-[4-(benzyloxy)-3-methoxyphenyl]-2H,4H,5H,6H,7H-pyrazolo[3,4-b]pyridin-6-one

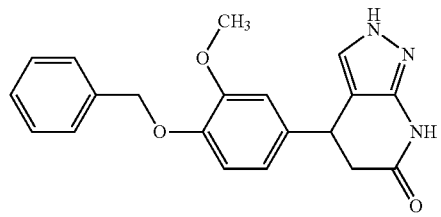 [SMILES: COc1cc(C2CC(=O)Nc3n[nH]cc32)ccc1OCc1ccccc1]

MS(ES⁺) m/z 428.2 (M+H)⁺.

6: 2-(2-methoxy-4-{6-oxo-2H,4H,5H,6H, 7H-pyrazolo[3,4-b]pyridin-4-yl}phenoxymethyl)benzonitrile

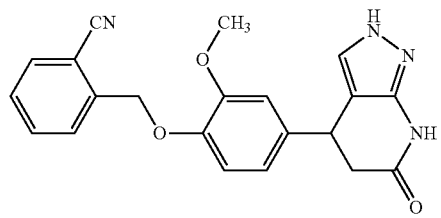

MS(ES⁺) m/z 375.2 (M+H)⁺.

7: 4-(3-methoxy-4-{[4-(trifluoromethyl)phenyl]methoxy}phenyl)-2H,4H,5H,6H,7H-pyrazolo[3,4-b]pyridin-6-one

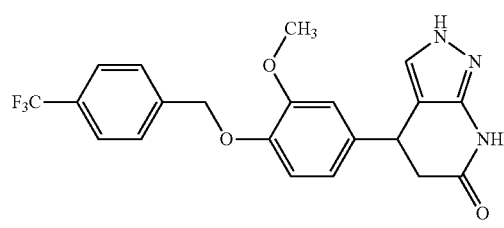 [SMILES: COc1cc(C2CC(=O)Nc3n[nH]cc32)ccc1OCc1ccc(C(F)(F)F)cc1]

MS(ES⁺) m/z 418.2 (M+H)⁺.

8: 4-(4-{[2,4-bis(trifluoromethyl)phenyl]methoxy}-3-methoxyphenyl)-2H,4H,5H,6H, 7H-pyrazolo[3,4-b]pyridin-6-one

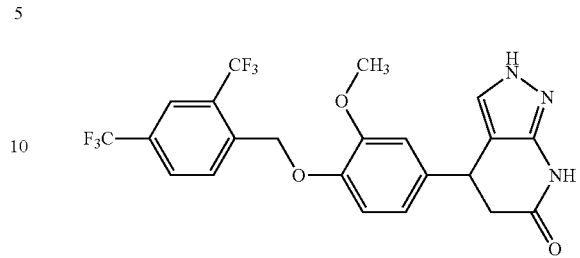

MS(ES⁺) m/z 486.2 (M+H)⁺.

9: 4-(4-{[4-fluoro-2-(trifluoromethyl)phenyl]methoxy}-3-methoxyphenyl)-2H,4H,5H,6H, 7H-pyrazolo[3,4-b]pyridin-6-one

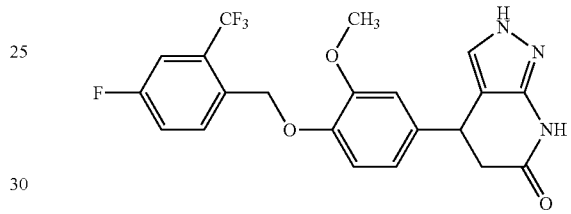

MS(ES⁺) m/z 436.2 (M+H)⁺.

10: 4-(3-methoxy-4-{[3-(trifluoromethyl)phenyl]methoxy}phenyl)-2H,4H,5H,6H,7H-pyrazolo[3,4-b]pyridin-6-one

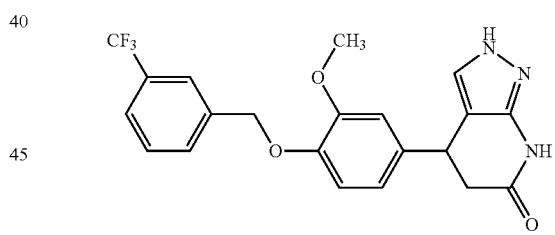

MS(ES⁺) m/z 418.2 (M+H)⁺.

11: 4-{4-[(3-bromophenyl)methoxy]-3-methoxyphenyl}-2H,4H,5H,6H, 7H-pyrazolo[3,4-b]pyridin-6-one

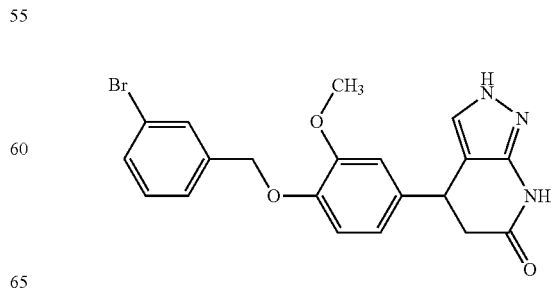

MS(ES⁺) m/z 428.2 (M+H)⁺.

12: 4-{4-[(3-chlorophenyl)methoxy]-3-methoxyphenyl}-2H,4H,5H,6H,7H-pyrazolo[3,4-b]pyridin-6-one

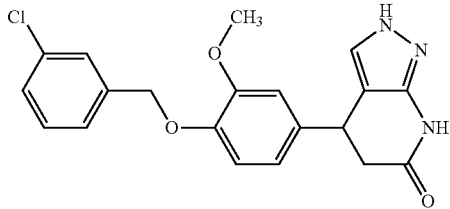 [SMILES: COc1cc(C2CC(=O)Nc3n[nH]cc32)ccc1OCc1cccc(Cl)c1]

MS(ES⁺) m/z 384.2 (M+H)⁺.

13: 4-{4-[(2,1,3-benzoxadiazol-4-yl)methoxy]-3-methoxyphenyl}-2H,4H,5H, 6H, 7H-pyrazolo[3,4-b]pyridin-6-one

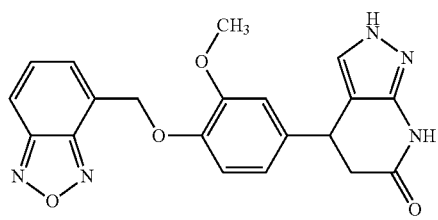 [SMILES: COc1cc(C2CC(=O)Nc3n[nH]cc32)ccc1OCc1cccc2nonc12]

MS(ES⁺) m/z 392.1 (M+H)+

14: 4-(4-{[2,5-bis(trifluoromethyl)phenyl]methoxy}-3-methoxyphenyl)-2H,4H,5H,6H, 7H-pyrazolo[3,4-b]pyridin-6-one

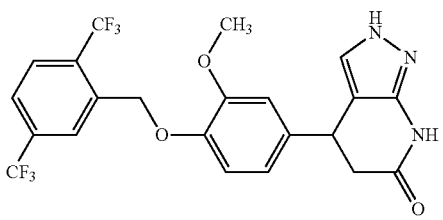 [SMILES: COc1cc(C2CC(=O)Nc3n[nH]cc32)ccc1OCc1cc(C(F)(F)F)ccc1C(F)(F)F]

MS(ES⁺) m/z 486.2 (M+H)⁺.

15: 4-(4-{[4-chloro-2-(trifluoromethyl)phenyl]methoxy}-3-methoxyphenyl)-2H,4H,5H,6H, 7H-pyrazolo[3,4-b]pyridin-6-one

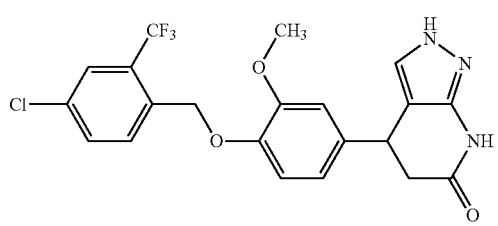 [SMILES: COc1cc(C2CC(=O)Nc3n[nH]cc32)ccc1OCc1ccc(Cl)cc1C(F)(F)F]

MS(ES⁺) m/z 452.2 (M+H)⁺.

16: 4-{4-[(2-fluorophenyl)methoxy]-3-methoxyphenyl}-2H,4H,5H,6H, 7H-pyrazolo[3,4-b]pyridin-6-one

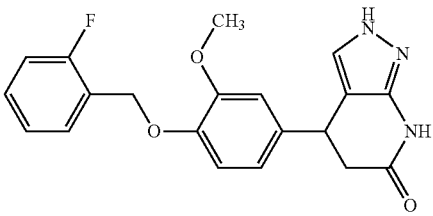 [SMILES: COc1cc(C2CC(=O)Nc3n[nH]cc32)ccc1OCc1ccccc1F]

MS(ES⁺) m/z 368.2 (M+H)⁺.

17: 4-(4-{[2-(difluoromethoxy)phenyl]methoxy}-3-methoxyphenyl)-2H,4H,5H,6H,7H-pyrazolo[3,4-b]pyridin-6-one

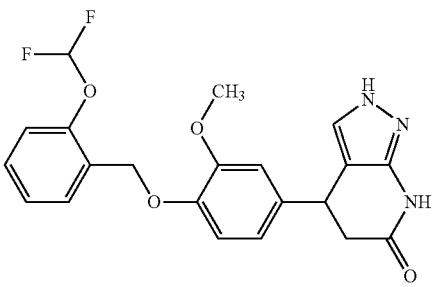 [SMILES: COc1cc(C2CC(=O)Nc3n[nH]cc32)ccc1OCc1ccccc1OC(F)F]

MS(ES⁺) m/z 416.2 (M+H)⁺.

18: 4-{3-methoxy-4-[(2-nitrophenyl)methoxy]phenyl}-2H,4H,5H,6H, 7H-pyrazolo[3,4-b]pyridin-6-one

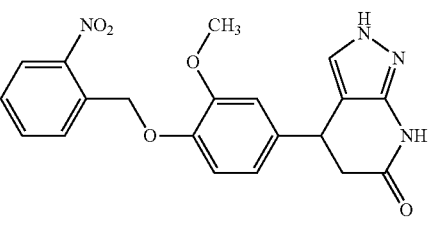

MS(ES⁺) m/z 395.2 (M+H)⁺.

19: 4-(3-methoxy-4-{[4-methoxy-2-(trifluoromethyl)phenyl]methoxy}phenyl)-2H,4H,5H,6H,7H-pyrazolo[3,4-b]pyridin-6-one

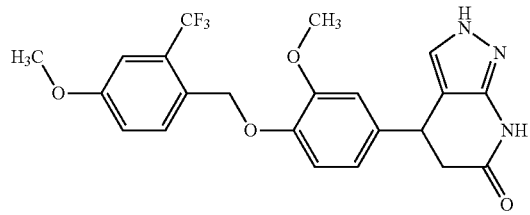

MS(ES⁺) m/z 448.2 (M+H)⁺.

20: 4-(2-methoxy-4-{6-oxo-2H,4H,5H,6H,7H-pyrazolo[3,4-b]pyridin-4-yl}phenoxymethyl)-3-(trifluoromethyl)benzonitrile

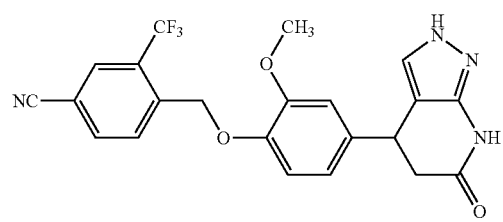 [SMILES: COc1cc(C2CC(=O)Nc3n[nH]cc32)ccc1OCc1ccc(C#N)cc1C(F)(F)F]

MS(ES⁺) m/z 443.2 (M+H)⁺.

21: 4-(4-{[2-fluoro-6-(trifluoromethyl)phenyl]methoxy}-3-methoxyphenyl)-2H,4H,5H,6H,7H-pyrazolo[3,4-b]pyridin-6-one

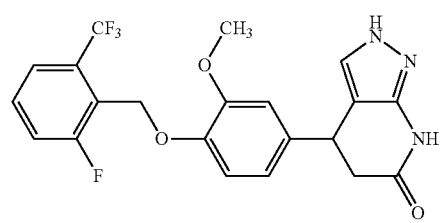 [SMILES: COc1cc(C2CC(=O)Nc3n[nH]cc32)ccc1OCc1c(F)cccc1C(F)(F)F]

MS(ES⁺) m/z 436.2 (M+H)⁺.

22: 4-{4-[(2,3-dichlorophenyl)methoxy]-3-methoxyphenyl}-2H,4H,5H,6H,7H-pyrazolo[3,4-b]pyridin-6-one

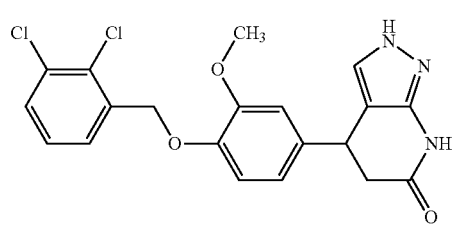 [SMILES: COc1cc(C2CC(=O)Nc3n[nH]cc32)ccc1OCc1cccc(Cl)c1Cl]

MS(ES⁺) m/z 418.2 (M+H)⁺.

23: 4-{4-[(2-iodophenyl)methoxy]-3-methoxyphenyl}-2H,4H,5H,6H, 7H-pyrazolo[3,4-b]pyridin-6-one

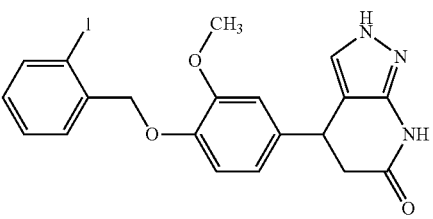

MS(ES⁺) m/z 476.2 (M+H)⁺.

24: 4-(3-methoxy-4-{[2-(trifluoromethoxy)phenyl]methoxy}phenyl)-2H,4H,5H,6H,7H-pyrazolo[3,4-b]pyridin-6-one

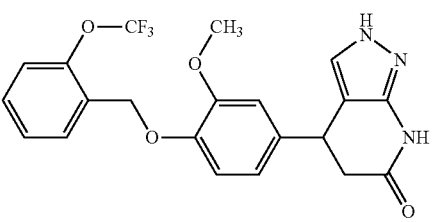

MS(ES⁺) m/z 434.2 (M+H)⁺.

25: 4-{3-methoxy-4-[(2-methoxy-5-nitrophenyl)methoxy]phenyl}-2H,4H,5H,6H,7H-pyrazolo[3,4-b]pyridin-6-one

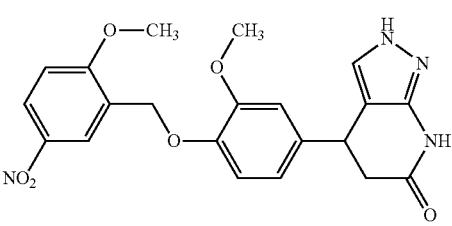 [SMILES: COc1ccc([N+](=O)[O-])cc1COc1ccc(C2CC(=O)Nc3n[nH]cc32)cc1OC]

MS(ES⁺) m/z 425.2 (M+H)⁺.

26: methyl 2-(2-methoxy-4-{6-oxo-2H,4H,5H,6H,7H-pyrazolo[3,4-b]pyridin-4-yl}phenoxymethyl)benzoate

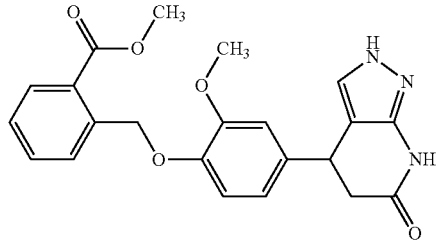 [SMILES: COC(=O)c1ccccc1COc1ccc(C2CC(=O)Nc3n[nH]cc32)cc1OC]

MS(ES⁺) m/z 408.2 (M+H)⁺.

27: 4-(4-{[3,5-bis(trifluoromethyl)phenyl]methoxy}-3-methoxyphenyl)-2H,4H,5H,6H,7H-pyrazolo[3,4-b]pyridin-6-one

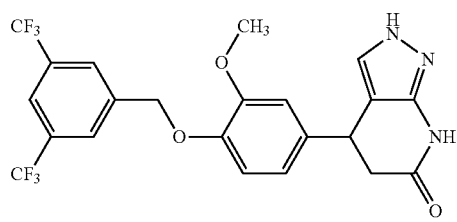

MS(ES⁺) m/z 486.2 (M+H)⁺.

28: 4-(4-{[2-fluoro-3-(trifluoromethyl)phenyl]methoxy}-3-methoxyphenyl)-2H,4H,5H,6H,7H-pyrazolo[3,4-b]pyridin-6-one

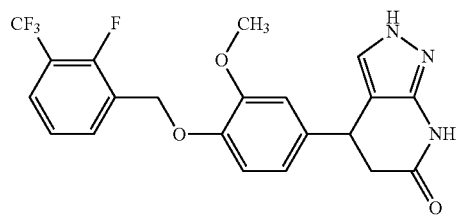 [SMILES: COc1cc(C2CC(=O)Nc3n[nH]cc32)ccc1OCc1cccc(C(F)(F)F)c1F]

29: 4-{4-[(2,5-dichlorophenyl)methoxy]-3-methoxyphenyl}-2H,4H,5H,6H,7H-pyrazolo[3,4-b]pyridin-6-one

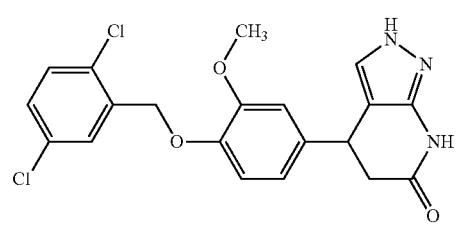 [SMILES: COc1cc(C2CC(=O)Nc3n[nH]cc32)ccc1OCc1cc(Cl)ccc1Cl]

MS(ES⁺) m/z 418.2 (M+H)⁺.

30: 4-{3-methoxy-4-[(2-methoxyphenyl)methoxy]phenyl}-2H,4H,5H,6H,7H-pyrazolo[3,4-b]pyridin-6-one

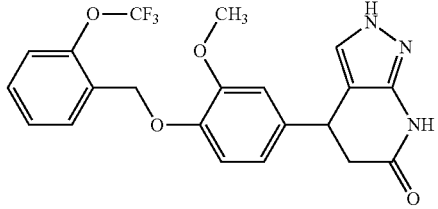

MS(ES⁺) m/z 380.2 (M+H)⁺.

31: 4-{3-methoxy-4-[(2,3,5-trichlorophenyl)methoxy]phenyl}-2H,4H,5H,6H,7H-pyrazolo[3,4-b]pyridin-6-one

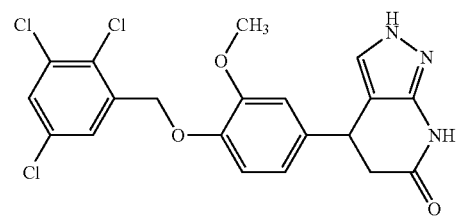

MS(ES⁺) m/z 452.2 (M+H)⁺.

32: 4-(3-methoxy-4-{[5-methyl-2-(trifluoromethyl)phenyl]methoxy}phenyl)-2H,4H,5H,6H,7H-pyrazolo[3,4-b]pyridin-6-one

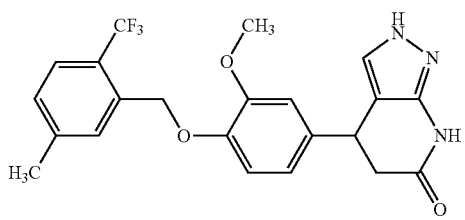 [SMILES: COc1cc(C2CC(=O)Nc3n[nH]cc32)ccc1OCc1cc(C)ccc1C(F)(F)F]

MS(ES⁺) m/z 432.2 (M+H)⁺.

33: 4-(4-{[4-bromo-2-(trifluoromethyl)phenyl]methoxy}-3-methoxyphenyl)-2H,4H,5H,6H,7H-pyrazolo[3,4-b]pyridin-6-one

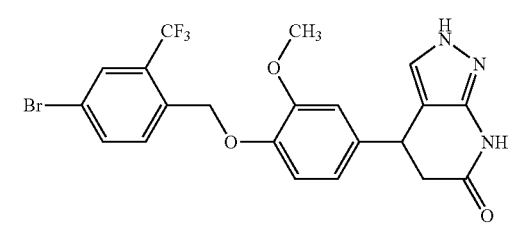

MS(ES⁺) m/z 496.2 (M+H)⁺.

34: 4-(3-methoxy-4-{[4-nitro-2-(trifluoromethyl)phenyl]methoxy}phenyl)-2H,4H,5H,6H,7H-pyrazolo[3,4-b]pyridin-6-one

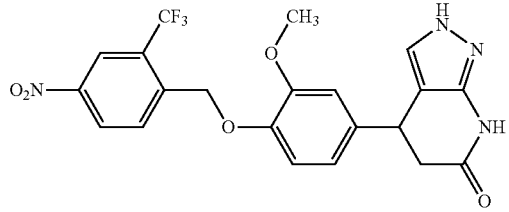 [SMILES: COc1cc(C2CC(=O)Nc3n[nH]cc32)ccc1OCc1ccc([N+](=O)[O-])cc1C(F)(F)F]

MS(ES⁺) m/z 463.2 (M+H)⁺

35: 4-(3-methoxy-4-{[5-methoxy-2-(trifluoromethyl)phenyl]methoxy}phenyl)-2H,4H,5H,6H,7H-pyrazolo[3,4-b]pyridin-6-one

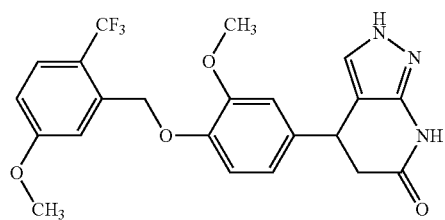 [SMILES: COc1ccc(C(F)(F)F)c(COc2ccc(C3CC(=O)Nc4n[nH]cc43)cc2OC)c1]

MS(ES⁺) m/z 448.2 (M+H)⁺

36: 4-(3-methoxy-4-{[3-methoxy-2-(trifluoromethyl)phenyl]methoxy}phenyl)-2H,4H,5H,6H,7H-pyrazolo[3,4-b]pyridin-6-one

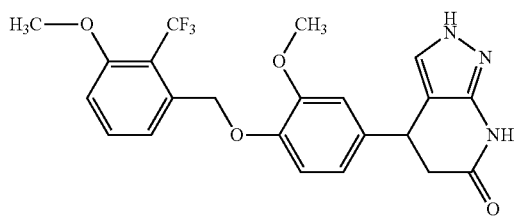 [SMILES: COc1cc(C2CC(=O)Nc3n[nH]cc32)ccc1OCc1cccc(OC)c1C(F)(F)F]

MS(ES⁺) m/z 448.2 (M+H)⁺ 37: 4-(4-{[4-methanesulfonyl-2-(trifluoromethyl)phenyl]methoxy}-3-methoxyphenyl)-2H,4H,5H,6H,7H-pyrazolo[3,4-b]pyridin-6-one

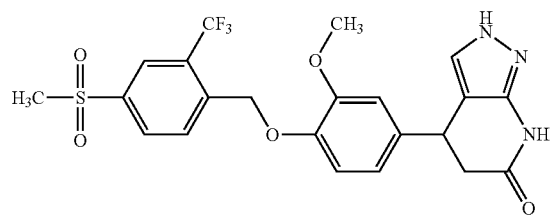 [SMILES: COc1cc(C2CC(=O)Nc3n[nH]cc32)ccc1OCc1ccc(S(C)(=O)=O)cc1Cl]

MS(ES⁺) m/z 496.2 (M+H)⁺ 38: 4-{4-[(2-chloro-4-methanesulfonylphenyl)methoxy]-3-methoxyphenyl}-2H,4H,5H,6H,7H-pyrazolo[3,4-b]pyridin-6-one

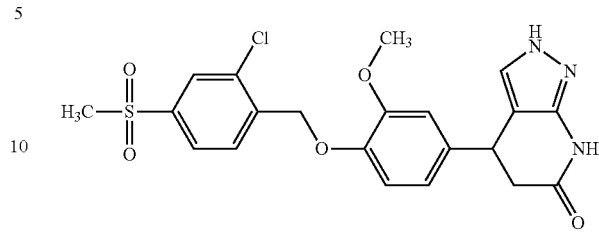

MS(ES⁺) m/z 462.2 (M+H)⁺

39: 4-{4-[(2,3-dimethoxyphenyl)methoxy]-3-methoxyphenyl}-2H,4H,5H,6H,7H-pyrazolo[3,4-b]pyridin-6-one

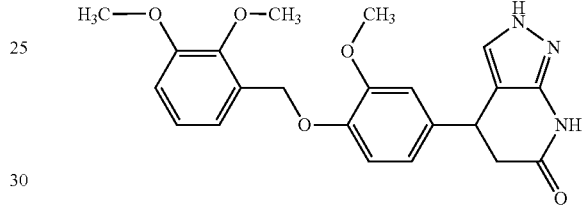

MS(ES⁺) m/z 410.2 (M+H)⁺ 40: 4-{4-[(2-tert-butylphenyl)methoxy]-3-methoxyphenyl}-2H,4H,5H,6H,7H-pyrazolo[3,4-b]pyridin-6-one

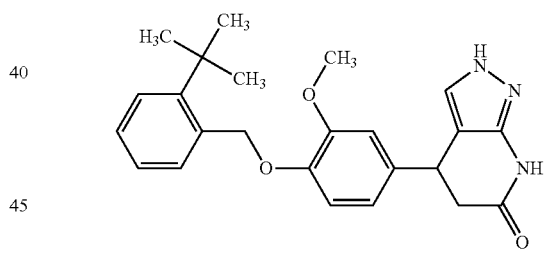

MS(ES⁺) m/z 406.2 (M+H)⁺

41: 4-(4-{[4-acetyl-2-(trifluoromethyl)phenyl]methoxy}-3-methoxyphenyl)-2H,4H,5H,6H,7H-pyrazolo[3,4-b]pyridin-6-one

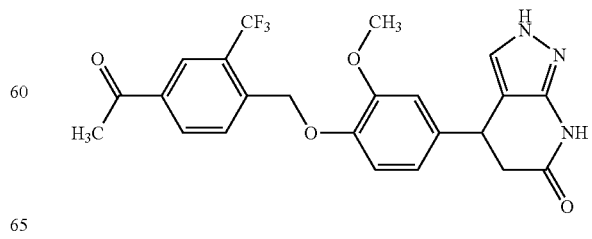

MS(ES⁺) m/z 460.1 (M+H)⁺

42: methyl 4-[(2-methoxy-4-{6-oxo-2H,4H,5H,6H,7H-pyrazolo[3,4-b]pyridin-4-yl}phenoxy)methyl]-3-(trifluoromethyl)benzoate

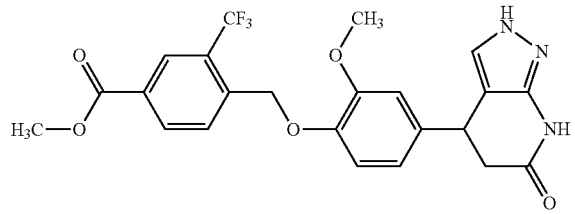 [SMILES: COC(=O)c1ccc(COc2ccc(C3CC(=O)Nc4n[nH]cc43)cc2OC)c(C(F)(F)F)c1]

MS(ES+) m/z 476.1 (M+H)+

43: 4-{4-[(6-bromo-2H-1,3-benzodioxol-5-yl)methoxy]-3-methoxyphenyl}-2H,4H,5H,6H,7H-pyrazolo[3,4-b]pyridin-6-one

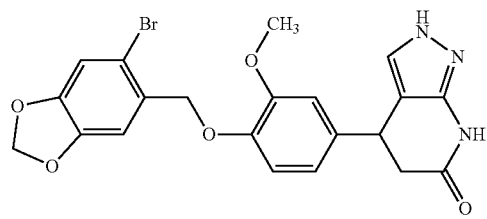 [SMILES: COc1cc(C2CC(=O)Nc3n[nH]cc32)ccc1OCc1cc2c(cc1Br)OCO2]

MS(ES+) m/z 472.0 (M+H)+

44: 4-{4-[(2-ethynylphenyl)methoxy]-3-methoxyphenyl}-2H,4H,5H,6H,7H-pyrazolo[3,4-b]pyridin-6-one

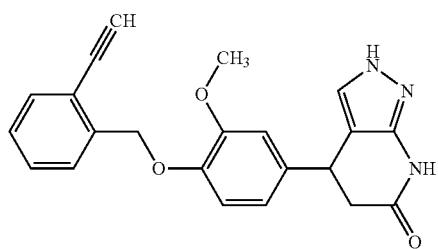 [SMILES: C#Cc1ccccc1COc1ccc(C2CC(=O)Nc3n[nH]cc32)cc1OC]

MS(ES+) m/z 374.1 (M+H)+

45: 4-{4-[(1-benzothiophen-7-yl)methoxy]-3-methoxyphenyl}-2H,4H,5H,6H,7H-pyrazolo[3,4-b]pyridin-6-one

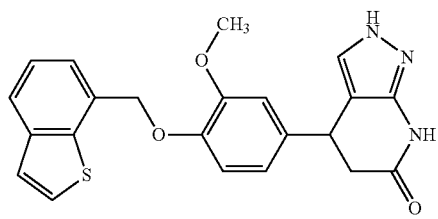 [SMILES: COc1cc(C2CC(=O)Nc3n[nH]cc32)ccc1OCc1cccc2ccsc12]

MS(ES+) m/z 406.1 (M+H)+

46: 4-{4-[(2,2-dimethyl-2,3-dihydro-1-benzofuran-7-yl)methoxy]-3-methoxyphenyl}-2H,4H,5H,6H,7H-pyrazolo[3,4-b]pyridin-6-one

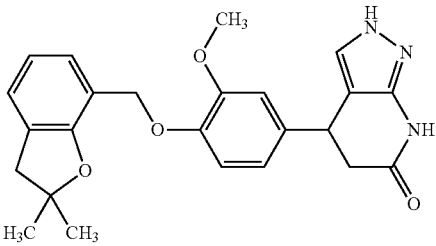

MS(ES+) m/z 420.2 (M+H)+

47: 4-{3-methoxy-4-[(quinolin-8-yl)methoxy]phenyl}-2H,4H,5H,6H,7H-pyrazolo[3,4-b]pyridin-6-one

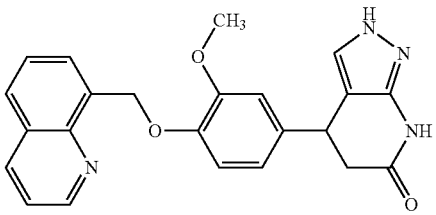 [SMILES: COc1cc(C2CC(=O)Nc3n[nH]cc32)ccc1OCc1cccc2cccnc12]

MS(ES+) m/z 401.2 (M+H)+

48: ethyl 2-[(2-methoxy-4-{6-oxo-2H,4H,5H,6H,7H-pyrazolo[3,4-b]pyridin-4-yl}phenoxy)methyl]benzoate

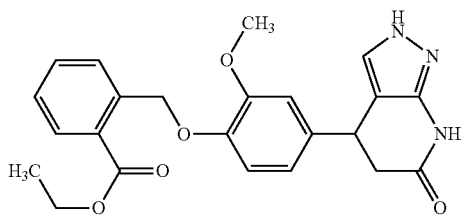 [SMILES: CCOC(=O)c1ccccc1COc1ccc(C2CC(=O)Nc3n[nH]cc32)cc1OC]

MS(ES+) m/z 422.2 (M+H)+

49: 4-(4-{[2-(difluoromethyl)phenyl]methoxy}-3-methoxyphenyl)-2H,4H,5H,6H, 7H-pyrazolo[3,4-b]pyridin-6-one

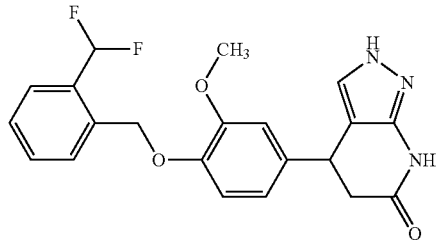 [SMILES: COc1cc(C2CC(=O)Nc3n[nH]cc32)ccc1OCc1ccccc1C(F)F]

MS(ES⁺) m/z 400.1 (M+H)⁺

50: 4-(3-methoxy-4-{[3-(trifluoromethyl)pyridin-4-yl]methoxy}phenyl)-2H,4H,5H,6H,7H-pyrazolo[3,4-b]pyridin-6-one

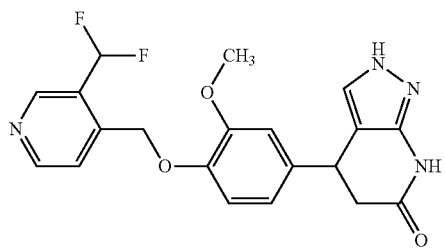 [SMILES: COc1cc(C2CC(=O)Nc3n[nH]cc32)ccc1OCc1ccncc1C(F)F]

MS(ES⁺) m/z 419.1 (M+H)⁺

51: 4-{4-[(3,4-dihydro-2H-1,5-benzodioxepin-6-yl)methoxy]-3-methoxyphenyl}-2H,4H,5H, 6H, 7H-pyrazolo[3,4-b]pyridin-6-one

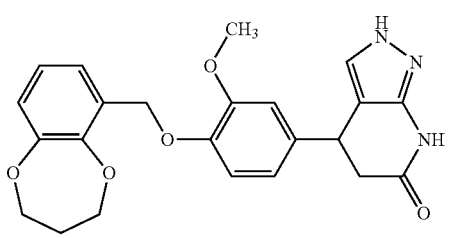 [SMILES: COc1cc(C2CC(=O)Nc3n[nH]cc32)ccc1OCc1cccc2c1OCCCO2]

MS(ES⁺) m/z 422.2 (M+H)⁺

52: 4-{3-methoxy-4-[(2-methylphenyl)methoxy]phenyl}-2H,4H,5H,6H, 7H-pyrazolo[3,4-b]pyridin-6-one

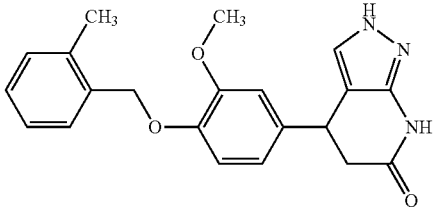

MS(ES⁺) m/z 364.2 (M+H)⁺

53: 4-{4-[(isoquinolin-5-yl)methoxy]-3-methoxyphenyl}-2H,4H,5H,6H,7H-pyrazolo[3,4-b]pyridin-6-one

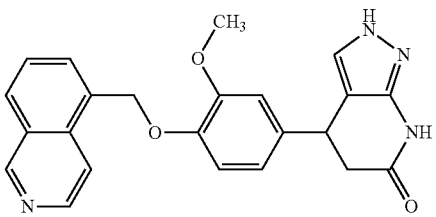 [SMILES: COc1cc(C2CC(=O)Nc3n[nH]cc32)ccc1OCc1cccc2cnccc12]

MS(ES⁺) m/z 401.2 (M+H)⁺

54: 4-{4-[(2-bromo-4,5-dimethoxyphenyl)methoxy]-3-methoxyphenyl}-2H,4H,5H, 6H, 7H-pyrazolo[3,4-b]pyridin-6-one

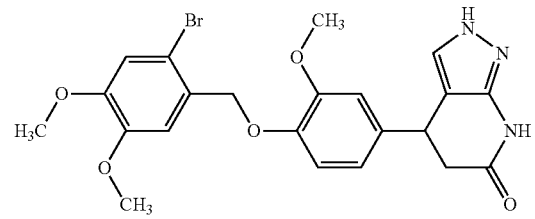 [SMILES: COc1cc(Br)c(COc2ccc(C3CC(=O)Nc4n[nH]cc43)cc2OC)cc1OC]

MS(ES⁺) m/z 488.1 (M+H)⁺

55: 4-{4-[(2,1,3-benzothiadiazol-4-yl)methoxy]-3-methoxyphenyl}-2H,4H,5H,6H,7H-pyrazolo[3,4-b]pyridin-6-one

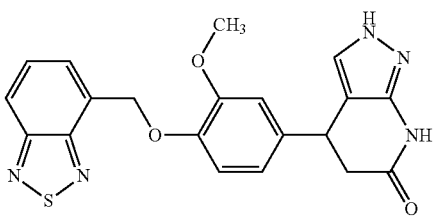 [SMILES: COc1cc(C2CC(=O)Nc3n[nH]cc32)ccc1OCc1cccc2nsnc12]

MS(ES⁺) m/z 408.1 (M+H)⁺

56: 4-(3-methoxy-4-{[3-(trifluoromethyl)pyridin-2-yl]methoxy}phenyl)-2H,4H,5H,6H,7H-pyrazolo[3,4-b]pyridin-6-one

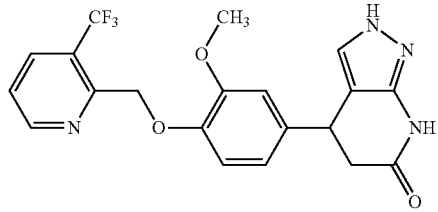 [SMILES: COc1cc(C2CC(=O)Nc3n[nH]cc32)ccc1OCc1ncccc1C(F)(F)F]

MS(ES⁺) m/z 419.1 (M+H)⁺

57: 4-{3-methoxy-4-[(pyridin-2-yl)methoxy]phenyl}-2H,4H,5H,6H,7H-pyrazolo[3,4-b]pyridin-6-one

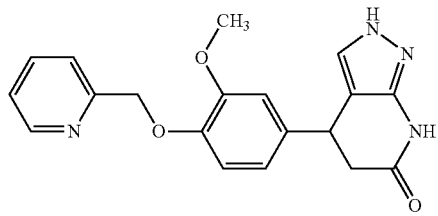 [SMILES: COc1cc(C2CC(=O)Nc3n[nH]cc32)ccc1OCc1ccccn1]

MS(ES⁺) m/z 351.1 (M+H)⁺

58: 4-{4-[(2-bromophenyl)methoxy]phenyl}-2H,4H,5H,6H,7H-pyrazolo[3,4-b]pyridin-6-one

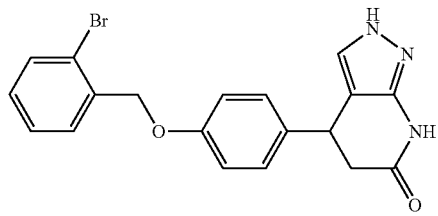 [SMILES: O=C1CC(c2ccc(OCc3ccccc3Br)cc2)c2c[nH]nc2N1]

MS(ES⁺) m/z 398.2 (M+H)⁺

59: 4-(4-{[2-(trifluoromethyl)phenyl]methoxy}phenyl)-2H,4H,5H,6H,7H-pyrazolo[3,4-b]pyridin-6-one

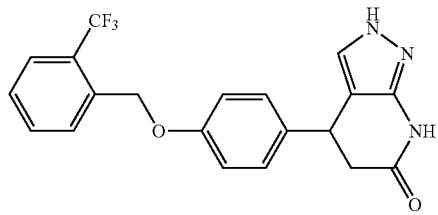

MS(ES⁺) m/z 388.2 (M+H)⁺

60: 4-{4-[(2-chlorophenyl)methoxy]phenyl}-2H,4H,5H,6H,7H-pyrazolo[3,4-b]pyridin-6-one

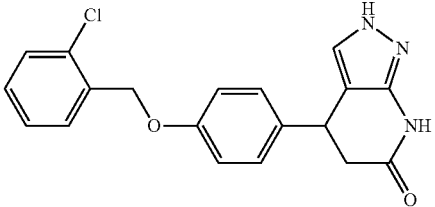 [SMILES: O=C1CC(c2ccc(OCc3ccccc3Cl)cc2)c2c[nH]nc2N1]

MS(ES⁺) m/z 354.2 (M+H)⁺

61: 4-(3,5-dimethoxy-4-{[2-(trifluoromethyl)phenyl]methoxy}phenyl)-2H,4H,5H,6H,7H-pyrazolo[3,4-b]pyridin-6-one

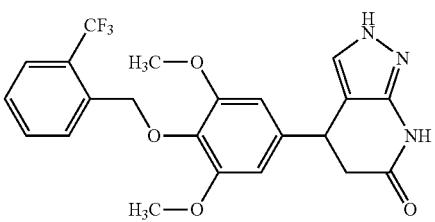 [SMILES: COc1cc(C2CC(=O)Nc3n[nH]cc32)cc(OC)c1OCc1ccccc1C(F)(F)F]

MS(ES⁺) m/z 448.2 (M+H)⁺

62: 4-(3-ethoxy-4-{[2-(trifluoromethyl)phenyl]methoxy}phenyl)-2H,4H,5H,6H,7H-pyrazolo[3,4-b]pyridin-6-one

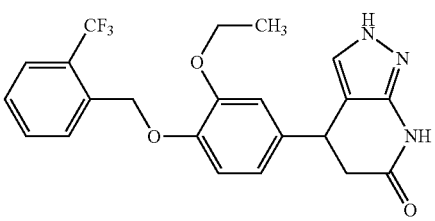 [SMILES: CCOc1cc(C2CC(=O)Nc3n[nH]cc32)ccc1OCc1ccccc1C(F)(F)F]

MS(ES⁺) m/z 432.2 (M+H)⁺

63: 4-(5-{[2-(trifluoromethyl)phenyl]methoxy}pyridin-2-yl)-2H,4H,5H,6H,7H-pyrazolo[3,4-b]pyridin-6-one

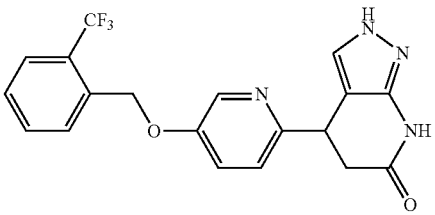 [SMILES: O=C1CC(c2ccc(OCc3ccccc3C(F)(F)F)cn2)c2c[nH]nc2N1]

MS(ES⁺) m/z 389.2 (M+H)⁺

64: 4-(2-methoxy-4-{[2-(trifluoromethyl)phenyl]methoxy}phenyl)-2H,4H,5H,6H,7H-pyrazolo[3,4-b]pyridin-6-one

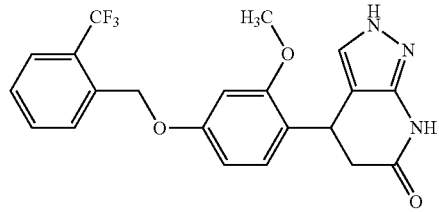 [SMILES: COc1cc(OCc2ccccc2C(F)(F)F)ccc1C1CC(=O)Nc2n[nH]cc21]

MS(ES+) m/z 418.2 (M+H)+

65: methyl 5-{6-oxo-2H,4H,5H,6H,7H-pyrazolo[3,4-b]pyridin-4-yl}-2-{[2-(trifluoromethyl)phenyl]methoxy}benzoate

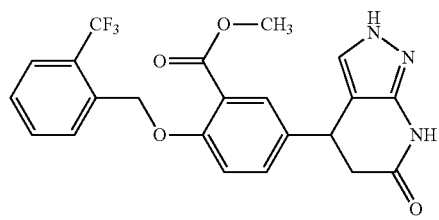 [SMILES: COC(=O)c1cc(C2CC(=O)Nc3n[nH]cc32)ccc1OCc1ccccc1C(F)(F)F]

MS(ES+) m/z 446.2 (M+H)+

66: 4-(2-fluoro-4-{[2-(trifluoromethyl)phenyl]methoxy}phenyl)-2H,4H,5H,6H,7H-pyrazolo[3,4-b]pyridin-6-one

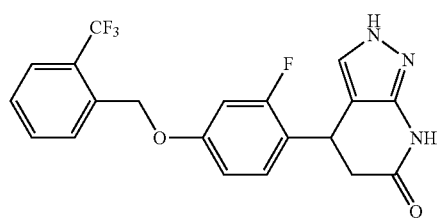 [SMILES: O=C1CC(c2ccc(OCc3ccccc3C(F)(F)F)cc2F)c2c[nH]nc2N1]

MS(ES+) m/z 406.2 (M+H)+

67: 4-(3-nitro-4-{[2-(trifluoromethyl)phenyl]methoxy}phenyl)-2H,4H,5H,6H,7H-pyrazolo[3,4-b]pyridin-6-one

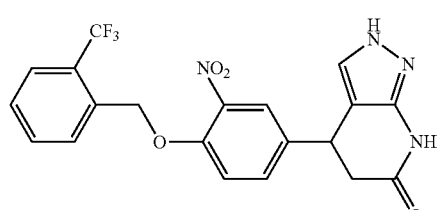

MS(ES+) m/z 433.2 (M+H)+

68: 4-[3-(difluoromethoxy)-4-{[2-(trifluoromethyl)phenyl]methoxy}phenyl]-2H,4H,5H,6H,7H-pyrazolo[3,4-b]pyridin-6-one

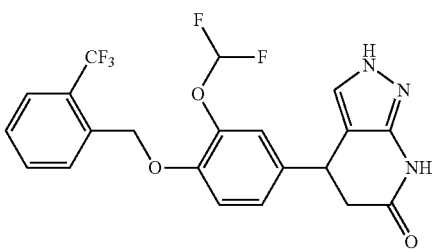 [SMILES: O=C1CC(c2ccc(OCc3ccccc3C(F)(F)F)c(OC(F)F)c2)c2c[nH]nc2N1]

MS(ES+) m/z 454.1 (M+H)+

69: 4-[3-(trifluoromethoxy)-4-{[2-(trifluoromethyl)phenyl]methoxy}phenyl]-2H,4H,5H,6H,7H-pyrazolo[3,4-b]pyridin-6-one

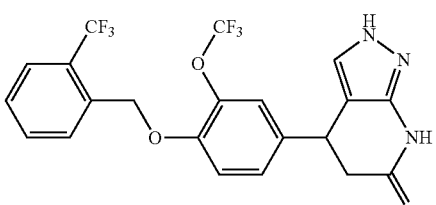

MS(ES+) m/z 472.1 (M+H)+

70: 4-(3-bromo-4-{[2-(trifluoromethyl)phenyl]methoxy}phenyl)-2H,4H,5H,6H,7H-pyrazolo[3,4-b]pyridin-6-one

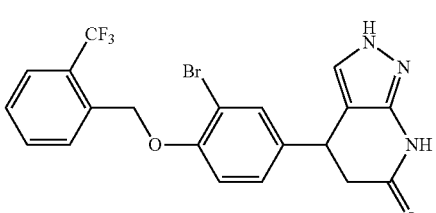

MS(ES+) m/z 466.0 (M+H)+

71: 4-(3-ethyl-4-{[2-(trifluoromethyl)phenyl]methoxy}phenyl)-2H,4H,5H,6H,7H-pyrazolo[3,4-b]pyridin-6-one

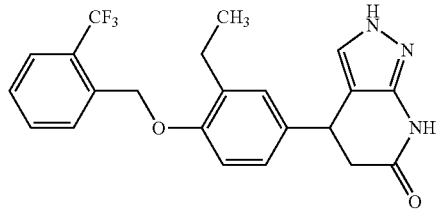

MS(ES$^+$) m/z 416.2 (M+H)$^+$

72: 4-(3-chloro-4-{[2-(trifluoromethyl)phenyl]methoxy}phenyl)-2H,4H,5H,6H,7H-pyrazolo[3,4-b]pyridin-6-one

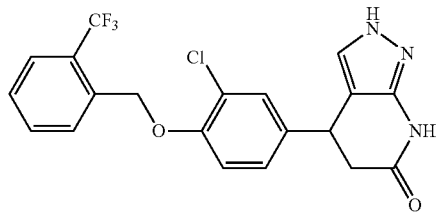 [SMILES: O=C1CC(c2ccc(OCc3ccccc3C(F)(F)F)c(Cl)c2)c2c[nH]nc2N1]

MS(ES$^+$) m/z 422.1 (M+H)$^+$

73: 4-(3-methyl-4-{[2-(trifluoromethyl)phenyl]methoxy}phenyl)-2H,4H,5H,6H,7H-pyrazolo[3,4-b]pyridin-6-one

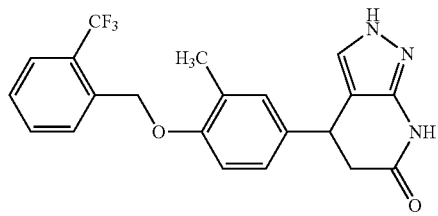

MS(ES$^+$) m/z 402.1 (M+H)$^+$

74: 4-(3-fluoro-4-{[2-(trifluoromethyl)phenyl]methoxy}phenyl)-2H,4H,5H,6H,7H-pyrazolo[3,4-b]pyridin-6-one

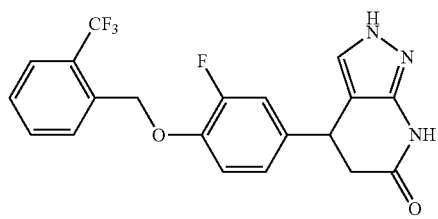 [SMILES: O=C1CC(c2ccc(OCc3ccccc3C(F)(F)F)c(F)c2)c2c[nH]nc2N1]

MS(ES$^+$) m/z 406.1 (M+H)$^+$

75: 4-(2-fluoro-5-methoxy-4-{[2-(trifluoromethyl)phenyl]methoxy}phenyl)-2H,4H,5H,6H,7H-pyrazolo[3,4-b]pyridin-6-one

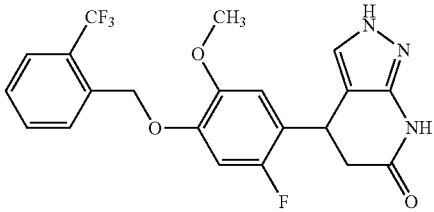 [SMILES: COc1cc(C2CC(=O)Nc3n[nH]cc32)c(F)cc1OCc1ccccc1C(F)(F)F]

MS(ES$^+$) m/z 436.1 (M+H)$^+$

76: 4-[3-(trifluoromethyl)-4-{[2-(trifluoromethyl)phenyl]methoxy}phenyl]-2H,4H,5H,6H,7H-pyrazolo[3,4-b]pyridin-6-one

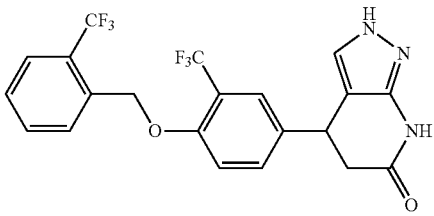 [SMILES: O=C1CC(c2ccc(OCc3ccccc3C(F)(F)F)c(C(F)(F)F)c2)c2c[nH]nc2N1]

MS(ES$^+$) m/z 456.1 (M+H)$^+$

77: 4-(2-fluoro-4-{[3-fluoro-2-(trifluoromethyl)phenyl]methoxy}-5-methoxyphenyl)-2H,4H,5H,6H,7H-pyrazolo[3,4-b]pyridin-6-one

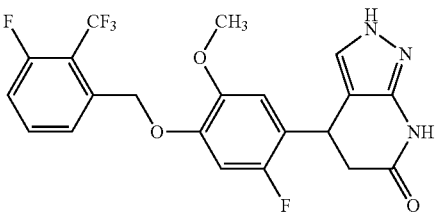 [SMILES: COc1cc(C2CC(=O)Nc3n[nH]cc32)c(F)cc1OCc1cccc(F)c1C(F)(F)F]

MS(ES$^+$) m/z 454.1 (M+H)$^+$

78: 4-(3-fluoro-5-methoxy-4-{[2-(trifluoromethyl)phenyl]methoxy}phenyl)-2H,4H,5H,6H,7H-pyrazolo[3,4-b]pyridin-6-one

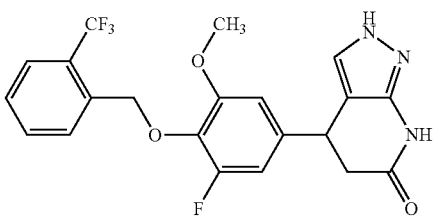 [SMILES: COc1cc(C2CC(=O)Nc3n[nH]cc32)cc(F)c1OCc1ccccc1C(F)(F)F]

MS(ES$^+$) m/z 436.1 (M+H)$^+$

79: 7-{4-[(2-chlorophenyl)methoxy]-3-methoxyphenyl}-4H,5H,6H, 7H-thieno[3,2-b]pyridin-5-one

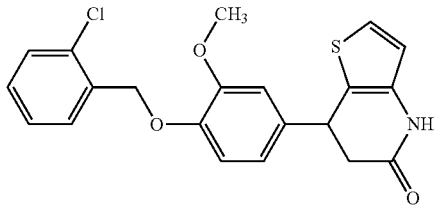

MS(ES⁺) m/z 400.2 (M+H)⁺

80: 4-(3-methoxy-4-{[2-(trifluoromethyl)phenyl]methoxy}phenyl)-2-methyl-2H,4H,5H,6H,7H-pyrazolo[3,4-b]pyridin-6-one

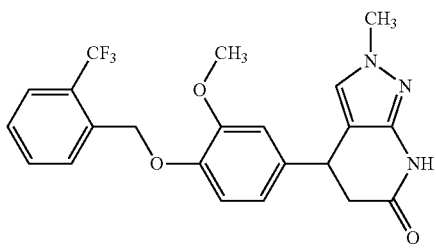 [SMILES: COc1cc(C2CC(=O)Nc3nn(C)cc32)ccc1OCc1ccccc1C(F)(F)F]

MS(ES⁺) m/z 432.2 (M+H)⁺

81: 4-(3-methoxy-4-{[3-(trifluoromethyl)phenyl]methoxy}phenyl)-3-methyl-2H,4H,5H,6H,7H-pyrazolo[3,4-b]pyridin-6-one

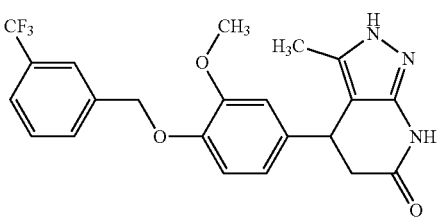 [SMILES: COc1cc(C2CC(=O)Nc3n[nH]c(C)c32)ccc1OCc1cccc(C(F)(F)F)c1]

MS(ES⁺) m/z 432.2 (M+H)⁺

82: 4-(3-methoxy-4-{[2-(trifluoromethyl)phenyl]methoxy}phenyl)-3-methyl-2H,4H,5H,6H,7H-pyrazolo[3,4-b]pyridin-6-one

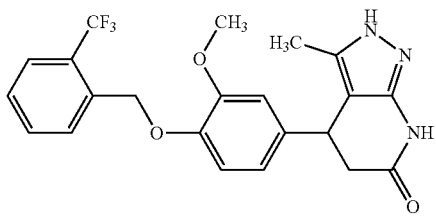 [SMILES: COc1cc(C2CC(=O)Nc3n[nH]c(C)c32)ccc1OCc1ccccc1C(F)(F)F]

MS(ES⁺) m/z 432.2 (M+H)⁺

83: 4-{4-[(2-bromophenyl)methoxy]-3-methoxyphenyl}-1-methyl-1H,4H,5H,6H,7H-pyrazolo[3,4-b]pyridin-6-one

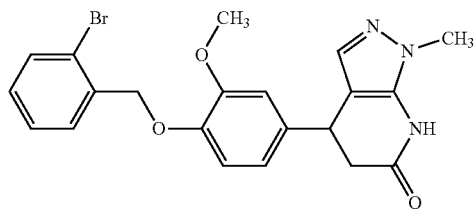 [SMILES: COc1cc(C2CC(=O)Nc3c2cnn3C)ccc1OCc1ccccc1Br]

MS(ES⁺) m/z 442.2 (M+H)⁺

84: 4-(3-methoxy-4-{[2-(trifluoromethyl)phenyl]methoxy}phenyl)-1-methyl-1H,4H,5H,6H,7H-pyrazolo[3,4-b]pyridin-6-one

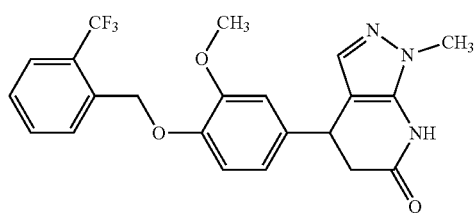 [SMILES: COc1cc(C2CC(=O)Nc3c2cnn3C)ccc1OCc1ccccc1C(F)(F)F]

MS(ES⁺) m/z 432.2 (M+H)⁺

85: 7-(3-methoxy-4-{[2-(trifluoromethyl)phenyl]methoxy}phenyl)-4H,5H,6H, 7H-thieno[3,2-b]pyridin-5-one

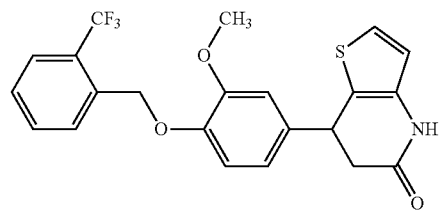

MS(ES⁺) m/z 434.2 (M+H)⁺

86: 4-(3-methoxy-4-{[2-(trifluoromethyl)phenyl]methoxy}phenyl)-7-methyl-2H,4H,5H,6H,7H-pyrazolo[3,4-b]pyridin-6-one

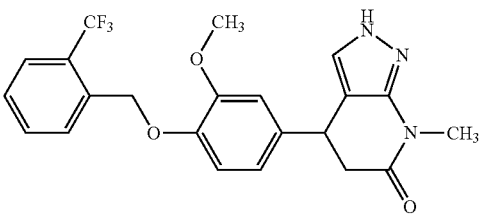 [SMILES: COc1cc(C2CC(=O)N(C)c3n[nH]cc32)ccc1OCc1ccccc1C(F)(F)F]

MS(ES⁺) m/z 432.2 (M+H)⁺

87: 7-(3-methoxy-4-{[2-(trifluoromethyl)phenyl]
methoxy}phenyl)-2H,4H,5H,6H, 7H-pyrazolo[4,3-
b]pyridin-5-one

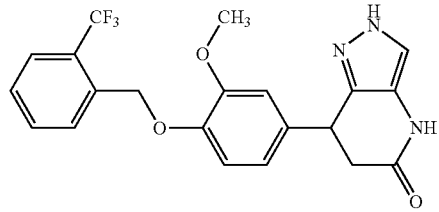

MS(ES+) m/z 418.2 (M+H)+

88: 7-(3-methoxy-4-{[2-(trifluoromethyl)phenyl]
methoxy}phenyl)-4H,5H,6H,7H-[1,3]thiazolo[4,5-b]
pyridin-5-one

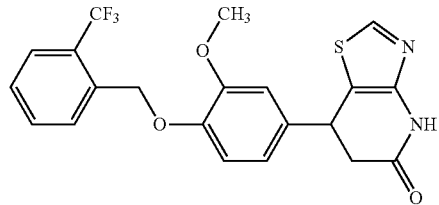 [SMILES: COc1cc(C2CC(=O)Nc3ncsc32)ccc1OCc1ccccc1C(F)(F)F]

MS(ES+) m/z 435.2 (M+H)+

89: 7-(3-methoxy-4-{[2-(trifluoromethyl)phenyl]
methoxy}phenyl)-3H,4H,5H,6H, 7H-imidazo[4,5-b]
pyridin-5-one

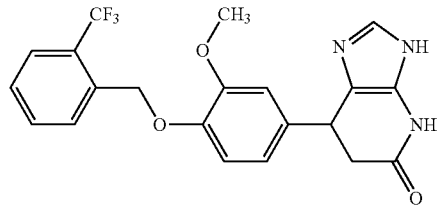 [SMILES: COc1cc(C2CC(=O)Nc3[nH]cnc32)ccc1OCc1ccccc1C(F)(F)F]

MS(ES+) m/z 418.2 (M+H)+

90: 7-(3-methoxy-4-{[2-(trifluoromethyl)phenyl]
methoxy}phenyl)-3H,4H,5H,6H, 7H-[1,2,3]triazolo
[4,5-b]pyridin-5-one

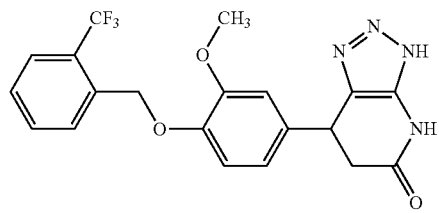 [SMILES: COc1cc(C2CC(=O)Nc3[nH]nnc32)ccc1OCc1ccccc1C(F)(F)F]

MS(ES+) m/z 419.2 (M+H)+

91: 7-(3-methoxy-4-{[4-methoxy-2-(trifluorom-
ethyl)phenyl]methoxy}phenyl)-3H,4H,5H,6H,7H-[1,
2,3]triazolo[4,5-b]pyridin-5-one

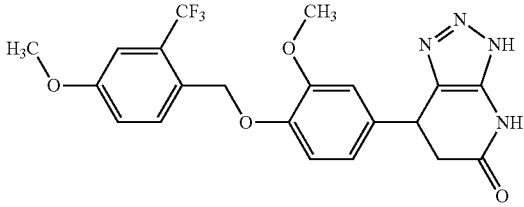 [SMILES: COc1ccc(COc2ccc(C3CC(=O)Nc4[nH]nnc43)cc2OC)c(C(F)(F)F)c1]

MS(ES+) m/z 449.2 (M+H)+

92: 7-(3-methoxy-4-{[4-methoxy-2-(trifluorom-
ethyl)phenyl]methoxy}phenyl)-2H,4H,5H,6H,7H-
pyrazolo[4,3-b]pyridin-5-one

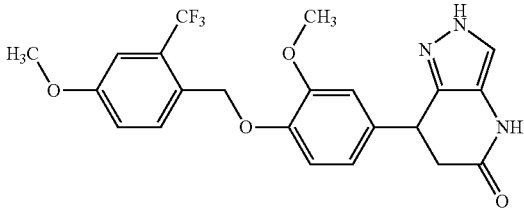 [SMILES: COc1ccc(COc2ccc(C3CC(=O)Nc4c[nH]nc43)cc2OC)c(C(F)(F)F)c1]

MS(ES+) m/z 448.2 (M+H)+

93: 7-(4-{[4-acetyl-2-(trifluoromethyl)phenyl]
methoxy}-3-methoxyphenyl)-2H,4H,5H,6H,7H-[1,2,
3]triazolo[4,5-b]pyridin-5-one

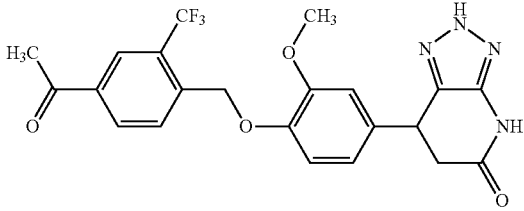 [SMILES: COc1cc(C2CC(=O)Nc3n[nH]nc32)ccc1OCc1ccc(C(C)=O)cc1C(F)(F)F]

MS(ES+) m/z 461.1 (M+H)+

94: 7-(4-{[4-acetyl-2-(trifluoromethyl)phenyl]
methoxy}-3-methoxyphenyl)-2H,4H,5H,6H,
7H-pyrazolo[4,3-b]pyridin-5-one

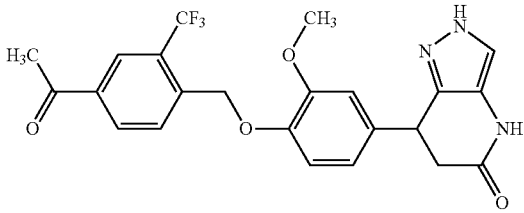 [SMILES: COc1cc(C2CC(=O)Nc3c[nH]nc32)ccc1OCc1ccc(C(C)=O)cc1C(F)(F)F]

MS(ES+) m/z 460.1 (M+H)+

95: 3-fluoro-4-(3-methoxy-4-{[2-(trifluoromethyl)phenyl]methoxy}phenyl)-2H,4H,5H,6H, 7H-pyrazolo[3,4-b]pyridin-6-one

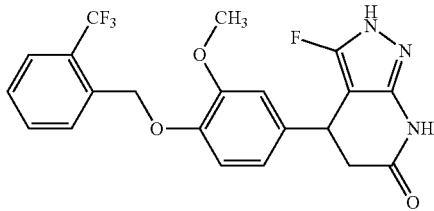 [SMILES: COc1cc(C2CC(=O)Nc3n[nH]c(F)c32)ccc1OCc1ccccc1C(F)(F)F]

MS(ES$^+$) m/z 436.1 (M+H)$^+$

96: 4-(4-{[4-bromo-2-(trifluoromethyl)phenoxy]methyl}-3-methoxyphenyl)-2H,4H,5H,6H, 7H-pyrazolo[3,4-b]pyridin-6-one

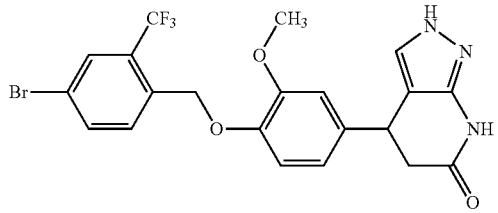 [SMILES: COc1cc(C2CC(=O)Nc3n[nH]cc32)ccc1OCc1ccc(Br)cc1C(F)(F)F]

i) To a solution of 3-methoxy-4-methyl-benzonitrile (11.55 g) and NBS (16.76 g) in ACN (550 mL) was added AIBN (1.29 g). The reaction mixture was heated to 85° C. and stirred for 4.5 hours. After cooling to room temperature, the reaction mixture was concentrated under reduced pressure and the resulting crude product was partitioned between water and EtOAc. The water layer was extracted twice with EtOAc and the combined organic layers were washed with brine, dried over MgSO$_4$, filtered and concentrated under reduced pressure. The compound was then purified on silica column, using a gradient of EtOAc/heptane 0/100 to 18/82 as the eluent, to afford 4-(bromomethyl)-3-methoxybenzonitrile (15.3 g).

ii) The in the previous step obtained product (15.3 g) was dissolved in anhydrous toluene under a nitrogen atmosphere and cooled to 0° C. DiBAl—H (1.2M in toluene, 85 mL) was added dropwise over 30 minutes and stirred 1 hour at 0° C. The reaction was quenched by the dropwise addition of 6N aqueous HCl (46 mL). The reaction was diluted with water and the product was extracted with EtOAc three times. The combined organic layers were washed with brine, dried over MgSO$_4$, filtered and concentrated under reduced pressure. The crude product was purified on silica column, using a gradient of toluene and EtOAc 100/0 to 80/20, followed by reversed phase flash chromatography, using a gradient of ACN/H$_2$O 45/55 to 60/40 as the eluent, to obtain 4-(bromomethyl)-3-methoxybenzaldehyde (7.35 g).

iii) The in the previous step obtained product (2.85 g), 4-bromo-2-(trifluoromethyl)phenol (3.00 g) and K$_2$CO$_3$ (5.16 g) were loaded in a 250 mL flask and ACN (50 mL) was added. The reaction mixture was heated to 70° C. and stirred for 1 hour. The acetonitrile was evaporated and the crude product was partitioned between water and EtOAc. The organic layer was washed with brine, dried over MgSO$_4$ and concentrated. The product was suspended in methanol and the solids were filtered off, washed with methanol and dried in the vacuum oven to yield 4-{[4-bromo-2-(trifluoromethyl)phenoxy]methyl}-3-methoxybenzaldehyde (4.10 g).

iv) Analogous to the procedure described in Example 1, step ii, the compound obtained in the previous step was converted into 4-(4-{[4-bromo-2-(trifluoromethyl)phenoxy]methyl}-3-methoxyphenyl)-2H,4H,5H,6H,7H-pyrazolo[3,4-b]pyridin-6-one (3.03 g). MS(ES$^+$) m/z 496.0 (M+H)$^+$.

Following a procedure analogous to that described for Example 96, steps i) to iv), using appropriate starting materials, the following compounds have been prepared.

97: 4-(4-{[4-(2-hydroxyethyl)-2-(trifluoromethyl)phenoxy]methyl}-3-methoxyphenyl)-2H,4H,5H, 6H, 7H-pyrazolo[3,4-b]pyridin-6-one

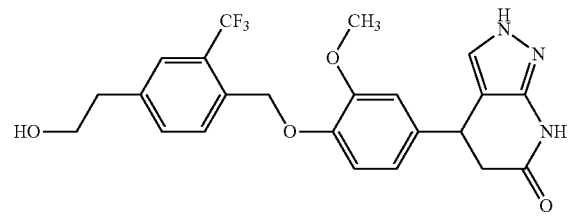 [SMILES: COc1cc(C2CC(=O)Nc3n[nH]cc32)ccc1OCc1ccc(CCO)cc1C(F)(F)F]

MS(ES$^+$) m/z 462.2 (M+H)$^+$

98: 4-(3-methoxy-4-{[4-methoxy-2-(trifluoromethyl)phenoxy]methyl}phenyl)-2H,4H,5H,6H, 7H-pyrazolo[3,4-b]pyridin-6-one

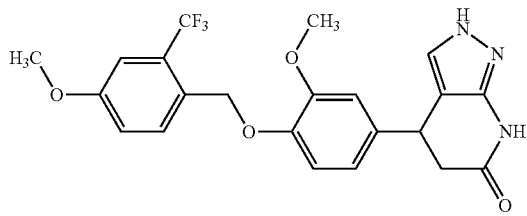 [SMILES: COc1ccc(COc2ccc(C3CC(=O)Nc4n[nH]cc43)cc2OC)c(C(F)(F)F)c1]

MS(ES$^+$) m/z 448.1 (M+H)$^+$

99: 4-(4-{[4-chloro-2-(trifluoromethyl)phenoxy]methyl}-3-methoxyphenyl)-2H,4H,5H,6H, 7H-pyrazolo[3,4-b]pyridin-6-one

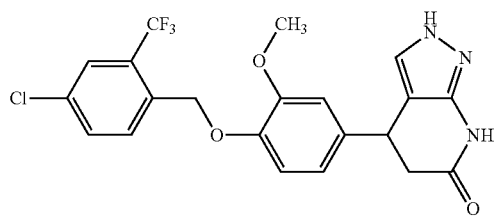

MS(ES$^+$) m/z 452.1 (M+H)$^+$

100: 4-(4-{[2,4-bis(trifluoromethyl)phenoxy]methyl}-3-methoxyphenyl)-2H,4H,5H,6H, 7H-pyrazolo[3,4-b]pyridin-6-one

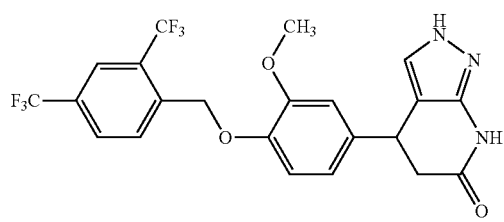

MS(ES⁺) m/z 486.1 (M+H)⁺

101: 4-(3-methoxy-4-{[2-(pentafluoro-$\lambda^6$-sulfanyl)phenoxy]methyl}phenyl)-2H,4H,5H,6H, 7H-pyrazolo[3,4-b]pyridin-6-one

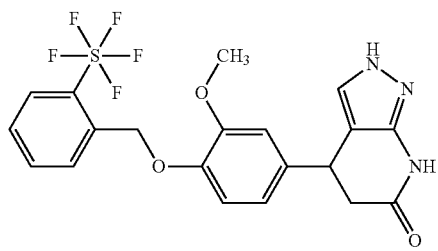 [SMILES: COc1cc(C2CC(=O)Nc3n[nH]cc32)ccc1OCc1ccccc1S(F)(F)(F)(F)F]

MS(ES⁺) m/z 476.1 (M+H)⁺

102: 4-(3-methoxy-4-{[2-(trifluoromethyl)phenoxy]methyl}phenyl)-2H,4H,5H, 6H, 7H-pyrazolo[3,4-b]pyridin-6-one

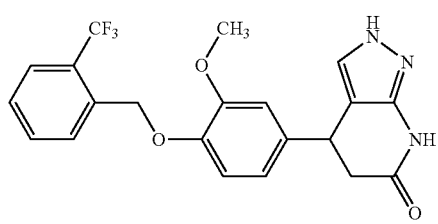

MS(ES⁺) m/z 418.1 (M+H)⁺

103: 4-(4-{[4-acetyl-2-(trifluoromethyl)phenoxy]methyl}-3-methoxyphenyl)-2H,4H,5H,6H, 7H-pyrazolo[3,4-b]pyridin-6-one

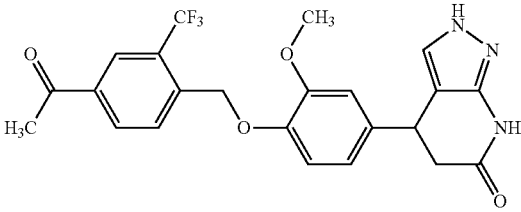 [SMILES: COc1cc(C2CC(=O)Nc3n[nH]cc32)ccc1OCc1ccc(C(C)=O)cc1C(F)(F)F]

MS(ES⁺) m/z 460.1 (M+H)⁺

104: 4-(4-{[4-fluoro-2-(trifluoromethyl)phenoxy]methyl}-3-methoxyphenyl)-2H,4H,5H,6H, 7H-pyrazolo[3,4-b]pyridin-6-one

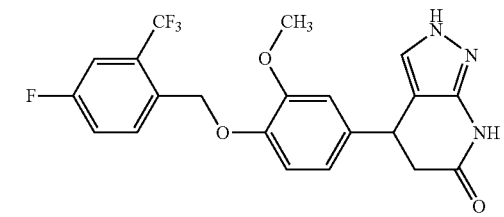

MS(ES⁺) m/z 436.1 (M+H)⁺

105: 4-[(2-methoxy-4-{6-oxo-2H,4H,55H, 6H, 7H-pyrazolo[3,4-b]pyridin-4-yl}phenyl)methoxy]-3-(trifluoromethyl)benzonitrile

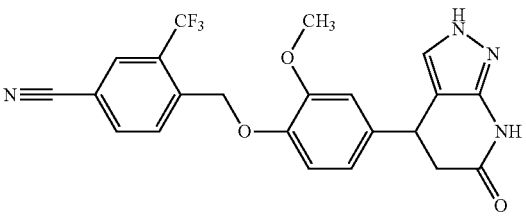 [SMILES: COc1cc(C2CC(=O)Nc3n[nH]cc32)ccc1OCc1ccc(C#N)cc1C(F)(F)F]

MS(ES⁺) m/z 443.1 (M+H)⁺

106: 4-(4-{[4-bromo-2-(trifluoromethyl)phenoxy]methyl}-3-(trifluoromethoxy)phenyl)-2H,4H,5H,6H, 7H-pyrazolo[3,4-b]pyridin-6-one

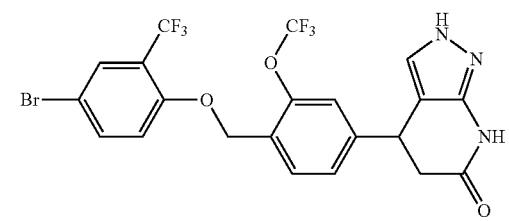

MS(ES⁺) m/z 550.0 (M+H)⁺

107: 4-(4-{[2-(pentafluoro-λ⁶-sulfanyl)phenoxy]methyl}-3-(trifluoromethoxy)phenyl)-2H,4H,5H,6H,7H-pyrazolo[3,4-b]pyridin-6-one

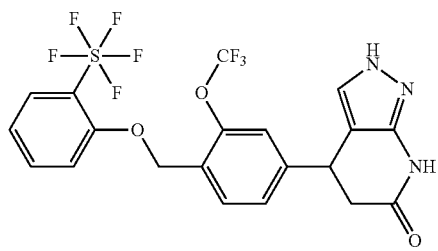 [SMILES: O=C1CC(c2ccc(COc3ccccc3S(F)(F)(F)(F)F)c(OC(F)(F)F)c2)c2c[nH]nc2N1]

MS(ES⁺) m/z 530.1 (M+H)⁺

108: 4-[3-(trifluoromethoxy)-4-{[2-(trifluoromethyl)phenoxy]methyl}phenyl]-2H,4H,5H,6H,7H-pyrazolo[3,4-b]pyridin-6-one

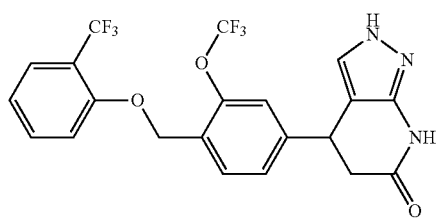 [SMILES: O=C1CC(c2ccc(COc3ccccc3C(F)(F)F)c(OC(F)(F)F)c2)c2c[nH]nc2N1]

MS(ES⁺) m/z 472.1 (M+H)⁺

109: 4-(4-{[2,4-bis(trifluoromethyl)phenoxy]methyl}-3-(trifluoromethoxy)phenyl)-2H,4H,5H,6H,7H-pyrazolo[3,4-b]pyridin-6-one

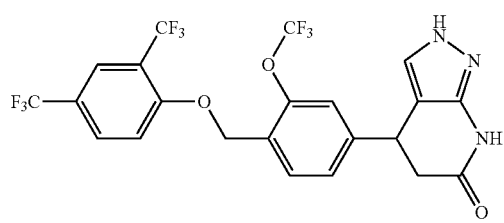

MS(ES⁺) m/z 540.1 (M+H)⁺

110: 4-(4-{[4-fluoro-2-(trifluoromethyl)phenoxy]methyl}-3-(trifluoromethoxy)phenyl)-2H,4H,5H,6H,7H-pyrazolo[3,4-b]pyridin-6-one

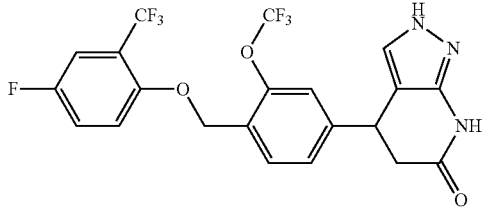 [SMILES: O=C1CC(c2ccc(COc3ccc(F)cc3C(F)(F)F)c(OC(F)(F)F)c2)c2c[nH]nc2N1]

MS(ES⁺) m/z 490.1 (M+H)⁺

111: 4-{4-[(2,4-dimethylphenoxy)methyl]-3-methoxyphenyl}-2H,4H,5H,6H,7H-pyrazolo[3,4-b]pyridin-6-one

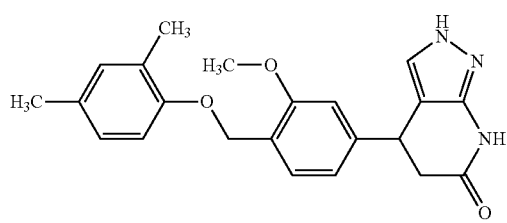

MS(ES⁺) m/z 378.4 (M+H)⁺

112: 4-(3-methoxy-4-{[2-methyl-4-(trifluoromethyl)phenoxy]methyl}phenyl)-2H,4H,5H,6H,7H-pyrazolo[3,4-b]pyridin-6-one

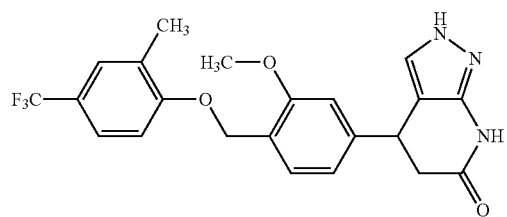

MS(ES⁺) m/z 432.4 (M+H)⁺

113: 4-{4-[(3,5-dimethylphenoxy)methyl]-3-methoxyphenyl}-2H,4H,5H,6H,7H-pyrazolo[3,4-b]pyridin-6-one

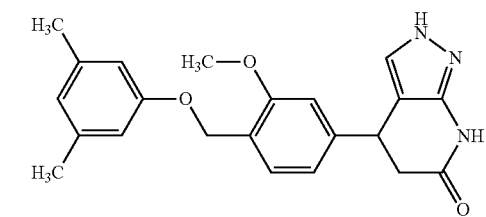 [SMILES: COc1cc(C2CC(=O)Nc3n[nH]cc32)ccc1COc1cc(C)cc(C)c1]

MS(ES⁺) m/z 378.4 (M+H)⁺

114: 4-(3-methoxy-4-{[3-methyl-5-(trifluoromethyl)phenoxy]methyl}phenyl)-2H,4H,5H,6H,7H-pyrazolo[3,4-b]pyridin-6-one

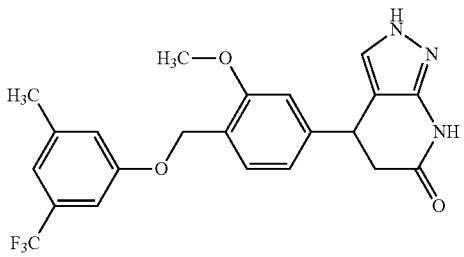 [SMILES: COc1cc(C2CC(=O)Nc3n[nH]cc32)ccc1COc1cc(C)cc(C(F)(F)F)c1]

MS(ES$^+$) m/z 432.4 (M+H)$^+$

115: 4-(4-{[4-(difluoromethyl)-2-(trifluoromethyl)phenoxy]methyl}-3-methoxyphenyl)-2H,4H,5H,6H,7H-pyrazolo[3,4-b]pyridin-6-one

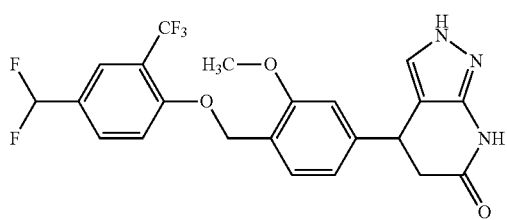 [SMILES: COc1cc(C2CC(=O)Nc3n[nH]cc32)ccc1COc1ccc(C(F)F)cc1C(F)(F)F]

i) The product obtained in Example 96 step i (14.13 g), 4-hydroxy-3-(trifluoromethyl)benzaldehyde (11.88 g) and K$_2$CO$_3$ (17.28 g) were suspended in ACN (400 mL) and heated to 70° C. for 2.5 hours. The solvent was evaporated on a rotary evaporator, the crude was suspended in water and the solids were filtered off. The solids were washed with EtOAc twice and dried in the vacuum oven at 40° C. to yield 4-[[4-formyl-2-(trifluoromethyl)phenoxy]methyl]-3-methoxy-benzonitrile (19.49 g).

ii) The in the previous step obtained product (19.49 g) was suspended in DCM (400 mL) under a nitrogen atmosphere. DAST (23 mL) was added dropwise and the reaction was stirred at room temperature for 5 days. During these days the reaction became a solution. The reaction was put on a water bath and sat. aq. NaHCO$_3$ was carefully added until no more gas was evolving. The product was extracted with DCM three times and the combined organic layers were dried over MgSO$_4$ and concentrated. The product was loaded on Celite and purified on silica column, using a gradient of DCM/heptane 40/60 to 70/30, to yield 4-[[4-(difluoromethyl)-2-(trifluoromethyl)phenoxy]methyl]-3-methoxy-benzonitrile (19.4 g).

iii) The in the previous step obtained product (19.40 g, 51.6 mmol, 1 equiv.) was suspended in toluene (427.5 mL) under a nitrogen atmosphere. The reaction was cooled to 0° C. and DiBAl—H (64 mL, 1.2M in toluene) was added dropwise over 35 minutes. During addition of the DiBAl—H the reaction became clear and light yellow. After the addition the reaction was stirred for 1.5 hours at 0° C. 6M aq. HCl (36 mL) was added dropwise and followed by the addition of water. The product was extracted with EtOAc three times and the combined organic layers were washed with brine, dried over MgSO$_4$ and concentrated to yield 4-[[4-(difluoromethyl)-2-(trifluoromethyl)phenoxy]methyl]-3-methoxy-benzaldehyde (19.23 g).

iv) Analogous to the procedure described in Example 1, step ii, the compound obtained in the previous step was converted into 4-(4-{[4-(difluoromethyl)-2-(trifluoromethyl)phenoxy]methyl}-3-methoxyphenyl)-2H,4H,5H,6H,7H-pyrazolo[3,4-b]pyridin-6-one (9.7 g). MS(ES$^+$) m/z 468.4 (M+H)$^+$.

Following a procedure analogous to that described for Example 115, using appropriate starting materials, the following compounds have been prepared.

116: 4-(4-{[2,4-bis(difluoromethyl)phenoxy]methyl}-3-methoxyphenyl)-2H,4H,5H,6H,7H-pyrazolo[3,4-b]pyridin-6-one

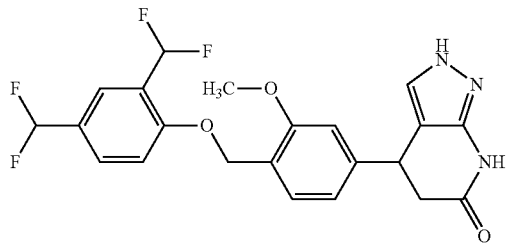 [SMILES: COc1cc(C2CC(=O)Nc3n[nH]cc32)ccc1COc1ccc(C(F)F)cc1C(F)F]

MS(ES$^+$) m/z 450.4 (M+H)$^+$

117: 4-(4-{[2-(difluoromethyl)-4-(trifluoromethyl)phenoxy]methyl}-3-methoxyphenyl)-2H,4H,5H,6H,7H-pyrazolo[3,4-b]pyridin-6-one

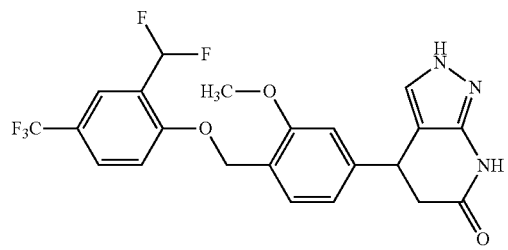 [SMILES: COc1cc(C2CC(=O)Nc3n[nH]cc32)ccc1COc1ccc(C(F)(F)F)cc1C(F)F]

MS(ES$^+$) m/z 468.4 (M+H)$^+$

118: 4-(4-{[3-(difluoromethyl)-5-(trifluoromethyl)phenoxy]methyl}-3-methoxyphenyl)-2H,4H,5H,6H,7H-pyrazolo[3,4-b]pyridin-6-one

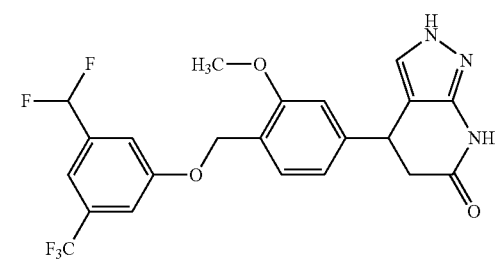 [SMILES: COc1cc(C2CC(=O)Nc3n[nH]cc32)ccc1COc1cc(C(F)F)cc(C(F)(F)F)c1]

MS(ES$^+$) m/z 468.4 (M+H)$^+$

119: 4-(4-{[4-(3-hydroxyprop-1-yn-1-yl)-2-(trifluoromethyl)phenoxy]methyl}-3-methoxyphenyl)-2H,4H,5H,6H,7H-pyrazolo[3,4-b]pyridin-6-one

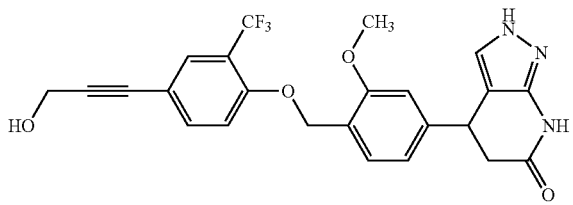 [SMILES: COc1cc(C2CC(=O)Nc3n[nH]cc32)ccc1COc1ccc(C#CCO)cc1C(F)(F)F]

i) The in Example 96, step iii obtained intermediate (1.00 g) was dissolved in THF (10 mL) together with CuI (0.05 g) and DBU (0.46 mL). The reaction mixture was degassed by bubbling nitrogen through it for 15 minutes. Then Pd(PPh$_3$)$_4$ (0.30 g) and propargyl alcohol (0.18 mL) were added and the vial was sealed. The reaction was stirred for 16 hours at 60° C. in the microwave. The reaction mixture was diluted with EtOAc and filtered over celite. The filtrate was concentrated and the residue was taken up in EtOAc and washed with H$_2$O/brine and brine sequentially. The organic layer was dried over MgSO$_4$, filtered and concentrated. The crude product was dissolved in DCM, loaded on Celite and purified via flash chromatography, using a gradient of EtOAc/heptane 20/80 to 80/20 as the eluent, to obtain 4-{[4-(3-hydroxyprop-1-yn-1-yl)-2-(trifluoromethyl)phenoxy]methyl}-3-methoxybenzaldehyde as a beige powder (0.81 g).

ii) Analogous to the procedure described in Example 1, step ii), the compound obtained in the previous step was converted into 4-(4-{[4-(3-hydroxyprop-1-yn-1-yl)-2-(trifluoromethyl)phenoxy]methyl}-3-methoxyphenyl)-2H,4H,5H,6H,7H-pyrazolo[3,4-b]pyridin-6-one (8 mg). MS(ES$^+$) m/z 472.4 (M+H)$^+$

120: 4-(2-methoxy-4-{6-oxo-2H,4H,5H,6H,7H-pyrazolo[3,4-b]pyridin-4-yl}phenoxymethyl)-3-(trifluoromethyl)benzoic acid

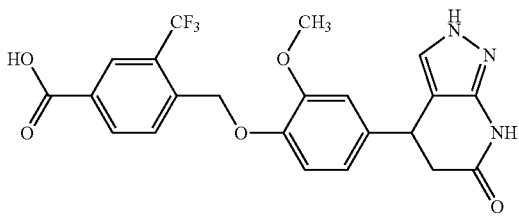 [SMILES: COc1cc(C2CC(=O)Nc3n[nH]cc32)ccc1OCc1ccc(C(=O)O)cc1C(F)(F)F]

i) Example 42 (3.0 g) was suspended in THF (30 mL) and a solution of LiOH (0.45 g) in water (15 mL) was added. The resulting yellow solution was stirred overnight at room temperature. The THF was evaporated, which resulted in precipitation of the product. The aqueous suspension was filtered and the solids were washed with water, ACN twice and Et$_2$O sequentially. The residue was dried in the vacuum oven to afford lithio 4-(2-methoxy-4-{6-oxo-2H,4H,5H,6H,7H-pyrazolo[3,4-b]pyridin-4-yl}phenoxymethyl)-3-(trifluoromethyl)benzoate (2.32 g) as a white powder.

ii) The compound obtained in the previous step (50 mg) was suspended in water (10 mL) and 2M aqueous HCl (2 mL) was added. The resulting suspension was stirred vigorously for 30 minutes, then filtered. The residue was washed with water, ACN (2×) and Et$_2$O, then dried under vacuum to afford 4-(2-methoxy-4-{6-oxo-2H,4H,5H,6H,7H-pyrazolo[3,4-b]pyridin-4-yl}phenoxymethyl)-3-(trifluoromethyl)benzoic acid (34 mg) as a white powder. MS(ES$^+$) m/z 462.2 (M+H)$^+$

121: 4-(2-methoxy-4-{6-oxo-2H,4H,5H,6H,7H-pyrazolo[3,4-b]pyridin-4-yl}phenoxymethyl)-3-(trifluoromethyl)benzamide

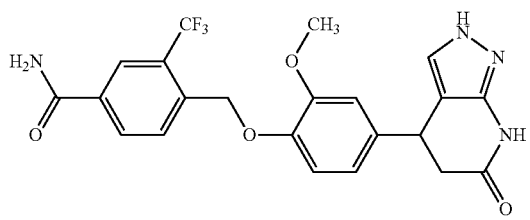 [SMILES: COc1cc(C2CC(=O)Nc3n[nH]cc32)ccc1OCc1ccc(C(N)=O)cc1C(F)(F)F]

i) The in Example 120, step i), obtained product (50 mg) was dissolved in DMF (0.5 mL) together with NH$_4$Cl (12 mg), EDC (25 mg), TEA (45 μL) and HOBt (20 mg). The reaction mixture was stirred at room temperature overnight.

The reaction mixture was diluted with EtOAc and water and stirred vigorously. A suspension was obtained which was filtered. The residue was washed with water, ACN twice and Et$_2$O sequentially, then dried in the vacuum over to afford 4-(2-methoxy-4-{6-oxo-2H,4H,5H,6H,7H-pyrazolo[3,4-b]pyridin-4-yl}phenoxymethyl)-3-(trifluoromethyl)benzamide (25 mg) as a white powder. MS(ES$^+$) m/z 461.2 (M+H)$^+$ Following a procedure analogous to that described for Example 121, using appropriate starting materials and solvents, the following compounds have been prepared.

122: 4-(2-methoxy-4-{6-oxo-2H,4H,5H,6H,7H-pyrazolo[3,4-b]pyridin-4-yl}phenoxymethyl)-N-methyl-3-(trifluoromethyl)benzamide

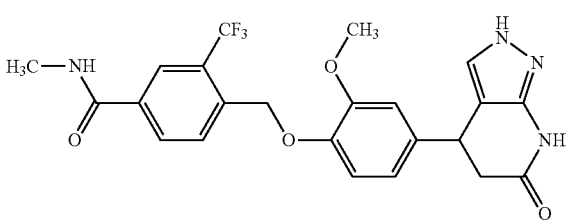 [SMILES: CNC(=O)c1ccc(COc2ccc(C3CC(=O)Nc4n[nH]cc43)cc2OC)c(C(F)(F)F)c1]

MS(ES$^+$) m/z 475.2 (M+H)$^+$

123: 4-(2-methoxy-4-{6-oxo-2H,4H,5H,6H, 7H-pyrazolo[3,4-b]pyridin-4-yl}phenoxymethyl)-N, N-dimethyl-3-(trifluoromethyl)benzamide

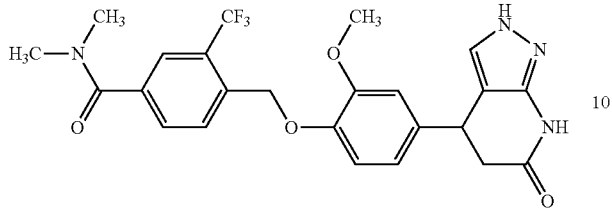

MS(ES⁺) m/z 489.2 (M+H)⁺

124: 4-(2-methoxy-4-{6-oxo-2H,4H,5H,6H, 7H-pyrazolo[3,4-b]pyridin-4-yl}phenoxymethyl)-N-(1H-pyrazol-3-yl)-3-(trifluoromethyl)benzamide

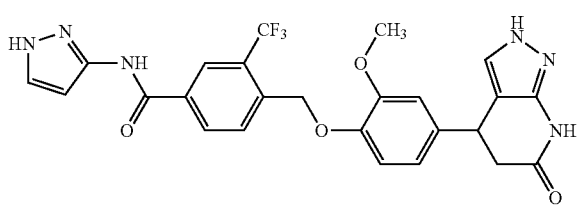 [SMILES: COc1cc(C2CC(=O)Nc3n[nH]cc32)ccc1OCc1ccc(C(=O)Nc2cc[nH]n2)cc1C(F)(F)F]

MS(ES⁺) m/z 527.2 (M+H)⁺

125: propyl 2-(2-methoxy-4-{6-oxo-2H,4H,5H,6H, 7H-pyrazolo[3,4-b]pyridin-4-yl}phenoxymethyl)benzoate

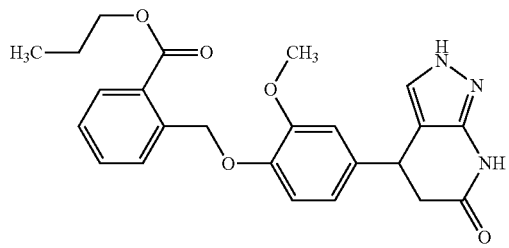 [SMILES: CCCOC(=O)c1ccccc1COc1ccc(C2CC(=O)Nc3n[nH]cc32)cc1OC]

MS(ES⁺) m/z 436.2 (M+H)⁺

126: butyl 2-(2-methoxy-4-{6-oxo-2H,4H,5H,6H, 7H-pyrazolo[3,4-b]pyridin-4-yl}phenoxymethyl)benzoate

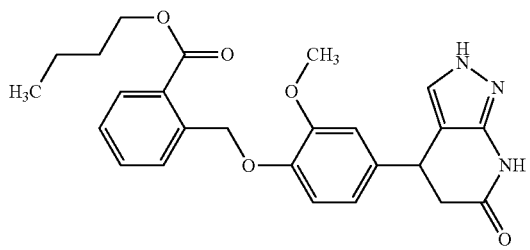 [SMILES: CCCCOC(=O)c1ccccc1COc1ccc(C2CC(=O)Nc3n[nH]cc32)cc1OC]

MS(ES⁺) m/z 450.2 (M+H)⁺

127: propan-2-yl 2-(2-methoxy-4-{6-oxo-2H,4H, 5H,6H,7H-pyrazolo[3,4-b]pyridin-4-yl}phenoxymethyl)benzoate

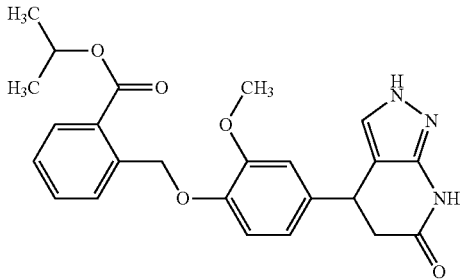 [SMILES: COc1cc(C2CC(=O)Nc3n[nH]cc32)ccc1OCc1ccccc1C(=O)OC(C)C]

MS(ES⁺) m/z 436.2 (M+H)⁺

Following a procedure analogous to that described for Examples 120 and 121, using Example 65 as the starting material and appropriate reagents and solvents, the following compounds have been prepared.

128: ethyl 5-{6-oxo-2H,4H,5H,6H,7H-pyrazolo[3,4-b]pyridin-4-yl}-2-{[2-(trifluoromethyl)phenyl]methoxy}benzoate

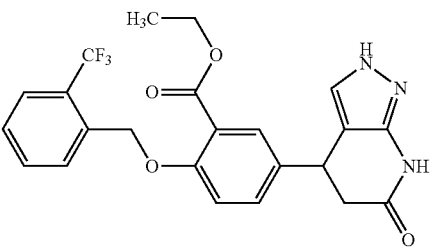 [SMILES: CCOC(=O)c1cc(C2CC(=O)Nc3n[nH]cc32)ccc1OCc1ccccc1C(F)(F)F]

MS(ES⁺) m/z 460.2 (M+H)⁺

129: N,N-dimethyl-5-{6-oxo-2H,4H,5H,6H,7H-pyrazolo[3,4-b]pyridin-4-yl}-2-{[2-(trifluoromethyl)phenyl]methoxy}benzamide

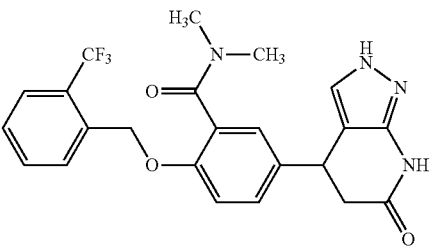 [SMILES: CN(C)C(=O)c1cc(C2CC(=O)Nc3n[nH]cc32)ccc1OCc1ccccc1C(F)(F)F]

MS(ES⁺) m/z 459.2 (M+H)⁺

130: 5-{6-oxo-2H,4H,5H,6H, 7H-pyrazolo[3,4-b]pyridin-4-yl}-2-{[2-(trifluoromethyl)phenyl]methoxy}benzamide

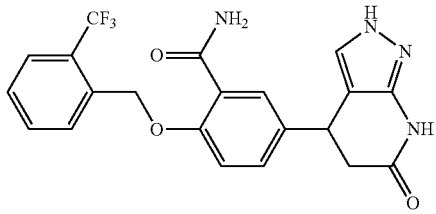 [SMILES: NC(=O)c1cc(C2CC(=O)Nc3n[nH]cc32)ccc1OCc1ccccc1C(F)(F)F]

MS(ES+) m/z 431.2 (M+H)+

131: 5-{6-oxo-2H, 4H,5H, 6H, 7H-pyrazolo[3,4-b]pyridin-4-yl}-N-(4H-1,2,4-triazol-3-yl)-2-{[2-(trifluoromethyl)phenyl]methoxy}benzamide

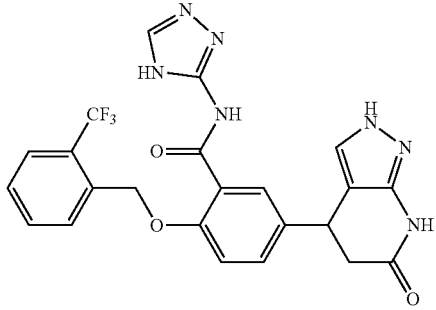 [SMILES: O=C1CC(c2ccc(OCc3ccccc3C(F)(F)F)c(C(=O)Nc3nnc[nH]3)c2)c2c[nH]nc2N1]

MS(ES+) m/z 498.2 (M+H)+

132: 2-hydroxyethyl 5-{6-oxo-2H,4H,5H,6H, 7H-pyrazolo[3,4-b]pyridin-4-yl}-2-{[2-(trifluoromethyl)phenyl]methoxy}benzoate

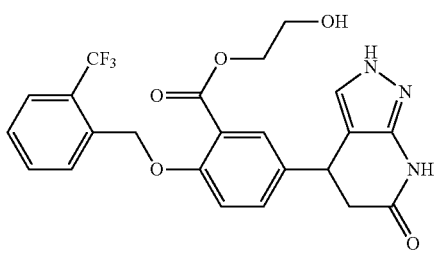 [SMILES: O=C1CC(c2ccc(OCc3ccccc3C(F)(F)F)c(C(=O)OCCO)c2)c2c[nH]nc2N1]

MS(ES+) m/z 476.2 (M+H)+

133: N-methyl-5-{6-oxo-2H,4H,5H,6H,7H-pyrazolo[3,4-b]pyridin-4-yl}-2-{[2-(trifluoromethyl)phenyl]methoxy}benzamide

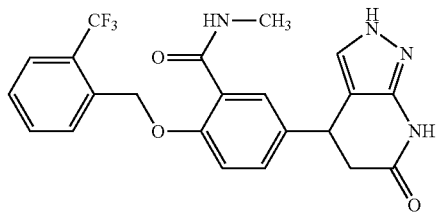 [SMILES: CNC(=O)c1cc(C2CC(=O)Nc3n[nH]cc32)ccc1OCc1ccccc1C(F)(F)F]

MS(ES+) m/z 445.2 (M+H)+

134: N-(1H-imidazol-4-yl)-5-{6-oxo-2H,4H,5H,6H, 7H-pyrazolo[3,4-b]pyridin-4-yl}-2-{[2-(trifluoromethyl)phenyl]methoxy}benzamide

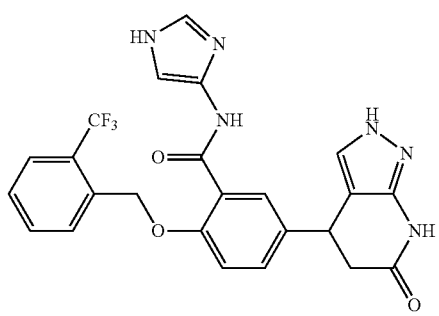 [SMILES: O=C1CC(c2ccc(OCc3ccccc3C(F)(F)F)c(C(=O)Nc3c[nH]cn3)c2)c2c[nH]nc2N1]

MS(ES+) m/z 497.2 (M+H)+

135: 4-(4-{[4-amino-2-(trifluoromethyl)phenyl]methoxy}-3-methoxyphenyl)-2H,4H,5H,6H, 7H-pyrazolo[3,4-b]pyridin-6-one

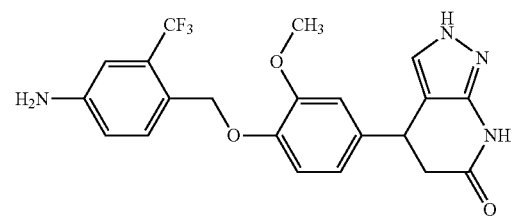

i) 4-methyl-3-(trifluoromethyl)-aniline (4.88 g) was dissolved in 1,4-dioxane (15 mL) and saturated aqueous K$_2$CO$_3$ (15 mL) was added. Then Boc$_2$O (7.40 g) was added and the reaction was stirred overnight at room temperature. The product was extracted with EtOAc three times and the combined organic layers were washed with brine, dried over MgSO$_4$, filtered and concentrated to yield 8.89 g tert-butyl N-[4-methyl-3-(trifluoromethyl)phenyl]carbamate.

ii) Analogous to the procedure described in Example 96, step i), the product obtained in the previous step was converted to tert-butyl N-[4-(bromomethyl)-3-(trifluoromethyl)phenyl]carbamate (9.01 g).

iii) Analogous to the procedures described in Example 1, step i), the product obtained in the previous step was converted to tert-butyl N-{4-[(4-formyl-2-methoxyphenoxy)methyl]-3-(trifluoromethyl)phenyl}carbamate.

iv) Analogous to the procedure described in Example 1, step ii), the product obtained in the previous step was converted to tert-butyl N-{4-[(2-methoxy-4-{6-oxo-2H,4H,5H,6H,7H-pyrazolo[3,4-b]pyridin-4-yl}phenoxy)methyl]-3-(trifluoromethyl)phenyl}carbamate.

v) The product obtained (93 mg) in the previous step was dissolved in DCM (1 mL) and HCl gas was bubbled through until the product precipitated. The reaction mixture was stirred for another 20 minutes and then concentrated under reduced pressure. The obtained residue was suspended in aqueous NaHCO₃ and stirred for 5 minutes, then the solids were filtered off and washed with water. The crude product was dissolved in ACN/MeOH and purified by preparative HPLC to afford 4-(4-{[4-amino-2-(trifluoromethyl)phenyl]methoxy}-3-methoxyphenyl)-2H,4H,5H,6H,7H-pyrazolo[3,4-b]pyridin-6-one as a white powder (21 mg). MS(ES⁺) m/z 433.4 (M+H)⁺

Following a procedure analogous to that described for Example 135, using appropriate starting materials and solvents, the following compounds have been prepared.

136: 7-(4-{[4-amino-2-(trifluoromethyl)phenyl]methoxy}-3-methoxyphenyl)-2H,4H,5H,6H,7H-[1,2,3]triazolo[4,5-b]pyridin-5-one

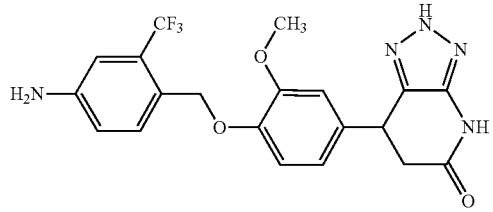 [SMILES: COc1cc(C2CC(=O)Nc3n[nH]nc32)ccc1OCc1ccc(N)cc1C(F)(F)F]

MS(ES⁺) m/z 434.2 (M+H)⁺

137: 7-(4-{[4-amino-2-(trifluoromethyl)phenyl]methoxy}-3-methoxyphenyl)-2H,4H,5H,6H,7H-pyrazolo[4,3-b]pyridin-5-one

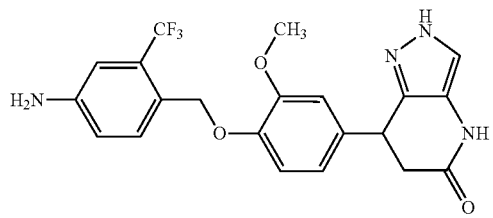 [SMILES: COc1cc(C2CC(=O)Nc3c[nH]nc32)ccc1OCc1ccc(N)cc1C(F)(F)F]

MS(ES⁺) m/z 433.2 (M+H)⁺

138: 4-(4-{[4-(dimethylamino)-2-(trifluoromethyl)phenyl]methoxy}-3-methoxyphenyl)-2H,4H,5H,6H,7H-pyrazolo[3,4-b]pyridin-6-one

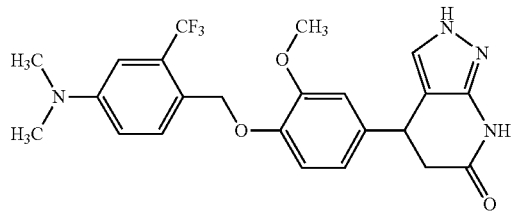 [SMILES: COc1cc(C2CC(=O)Nc3n[nH]cc32)ccc1OCc1ccc(N(C)C)cc1C(F)(F)F]

i) To a solution of Example 135 (25 mg) in acetic acid (1 mL) was added 43 µL of formaldehyde solution (37% in water) followed by the portion-wise addition of sodium cyanoborohydride (11 mg). After 40 minutes the reaction mixture was concentrated and the obtained oil was basified with aq. K₂CO₃, resulting in a white precipitation. The suspension was extracted with DCM twice and the combined organic layers were dried over MgSO₄, filtered and concentrated. The crude product was purified by preparative HPLC (isocratic gradient 40% ACN/H₂O) to obtain 3 mg of 4-(4-{[4-(dimethylamino)-2-(trifluoromethyl)phenyl]methoxy}-3-methoxyphenyl)-2H,4H,5H,6H,7H-pyrazolo[3,4-b]pyridin-6-one. MS(ES⁺) m/z 461.2 (M+H)⁺

139: N-{4-[(2-methoxy-4-{6-oxo-2H,4H,5H,6H,7H-pyrazolo[3,4-b]pyridin-4-yl}phenoxy)methyl]-3-(trifluoromethyl)phenyl}acetamide

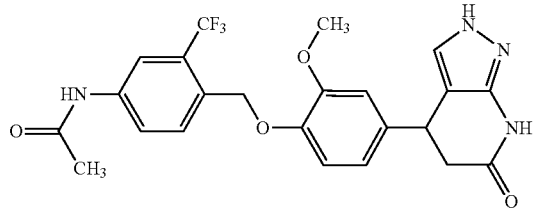 [SMILES: COc1cc(C2CC(=O)Nc3n[nH]cc32)ccc1OCc1ccc(NC(C)=O)cc1C(F)(F)F]

i) DIPEA (121 µL) was added to a mixture of Example 135 (50 mg), HATU (44 mg) and AcOH (7 µL) in DMF (1 mL). The reaction mixture was stirred at room temperature overnight. The mixture was then diluted with aq. NaHCO₃ and extracted with EtOAc. The organic layer was washed with brine, dried over MgSO₄, filtered and concentrated to afford a white solid. The crude product was purified by preparative HPLC to afford N-{4-[(2-methoxy-4-{6-oxo-2H,4H,5H,6H,7H-pyrazolo[3,4-b]pyridin-4-yl}phenoxy)methyl]-3-(trifluoromethyl)phenyl}acetamide (10 mg) as a white powder. MS(ES⁺) m/z 475.4 (M+H)⁺

140: 2-amino-N-{4-[(2-methoxy-4-{6-oxo-2H,4H, 5H,6H, 7H-pyrazolo[3,4-b]pyridin-4-yl}phenoxy) methyl]-3-(trifluoromethyl)phenyl}acetamide

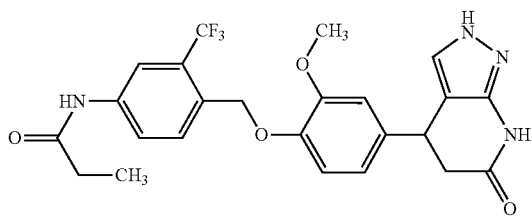 [SMILES: CCC(=O)Nc1ccc(COc2ccc(C3CC(=O)Nc4n[nH]cc43)cc2OC)c(C(F)(F)F)c1]

i) Analogous to the procedure described in Example 139, using Example 135 (100 mg) as the starting material, tert-butyl N-[({4-[(2-methoxy-4-{6-oxo-2H,4H,5H,6H,7H-pyrazolo[3,4-b]pyridin-4-yl}phenoxy)methyl]-3-(trifluoromethyl)phenyl}carbamoyl)methyl]carbamate (102 mg) was obtained as a white powder.

ii) Analogous to the procedure described in Example 135, step v), the compound obtained in the previous step (102 mg) was converted to 2-amino-N-{4-[(2-methoxy-4-{6-oxo-2H,4H,5H,6H,7H-pyrazolo[3,4-b]pyridin-4-yl}phenoxy)methyl]-3-(trifluoromethyl)phenyl}acetamide (40 mg, white powder). MS(ES$^+$) m/z 490.2 (M+H)$^+$

141: 4-(3-methoxy-4-{[4-(methylamino)-2-(trifluoromethyl)phenyl]methoxy}phenyl)-2H,4H,5H,6H, 7H-pyrazolo[3,4-b]pyridin-6-one

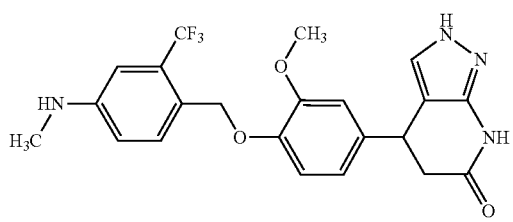 [SMILES: CCc1ccc(COc2ccc(C3CC(=O)Nc4n[nH]cc43)cc2OC)c(C(F)(F)F)c1]

i) A solution of the in Example 135, step iii) obtained Building Block (500 mg) in 3 mL anhydrous THF was added to a cooled (0° C.) suspension of NaH (94 mg, 60 wt %) in 2 mL anhydrous THF under a nitrogen atmosphere. The reaction was warmed to room temperature and stirred for 20 minutes, then MeI (2.9 mL, 2M in tert-butyl methyl ether) was added and the reaction was stirred overnight. The reaction mixture was diluted with H$_2$O, extracted with EtOAc two times and washed with brine. The organic layers were combined, dried over MgSO$_4$, filtered and concentrated to afford a yellow oil. This was dissolved in DCM, loaded on silica powder and purified by silica gel chromatography, using an isocratic gradient of 15% EtOAc in heptane, to afford tert-butyl N-{4-[(4-formyl-2-methoxyphenoxy)methyl]-3-(trifluoromethyl)phenyl}-N-methylcarbamate (107 mg) as a colourless oil.

ii) Analogous to the procedure described in Example 1, step ii), the compound obtained in the previous step (107 mg) was converted to tert-butyl N-{4-[(2-methoxy-4-{6-oxo-2H,4H,5H,6H,7H-pyrazolo[3,4-b]pyridin-4-yl}phenoxy)methyl]-3-(trifluoromethyl)phenyl}-N-methylcarbamate (88 mg, beige solid).

iii) Analogous to the procedure described in Example 135, step v), the compound obtained in the previous step (88 mg) was converted to 4-(3-methoxy-4-{[4-(methylamino)-2-(trifluoromethyl)phenyl]methoxy}phenyl)-2H,4H,5H,6H,7H-pyrazolo[3,4-b]pyridin-6-one (4 mg, a white powder). MS(ES$^+$) m/z 447.2 (M+H)$^+$

142: 4-(3-methoxy-4-{[4-(prop-2-en-1-yl)-2-(trifluoromethyl)phenyl]methoxy}phenyl)-2H,4H,5H,6H, 7H-pyrazolo[3,4-b]pyridin-6-one

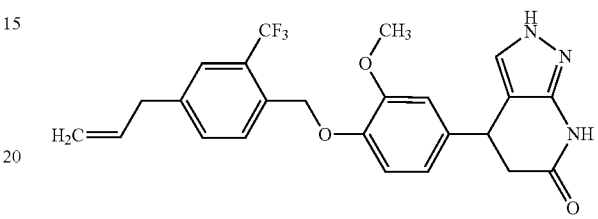

i) Anhydrous DMF (2.5 mL) and allyltri-n-butyltin (375 µL) were added to a vial containing example 33 (500 mg), Pd(PPh$_3$)$_2$Cl$_2$, and PPh$_3$. The vial was capped and stirred for 20 minutes at 150° C. in the microwave. The reaction mixture was diluted with EtOAc and washed with brine. The organic layer was dried over MgSO$_4$, filtered, concentrated and purified by reversed phase flash chromatography, using a gradient of 20% to 60% ACN in H$_2$O as the eluent, to afford 4-(3-methoxy-4-{[4-(prop-2-en-1-yl)-2-(trifluoromethyl)phenyl]methoxy}phenyl)-2H,4H,5H,6H,7H-pyrazolo[3,4-b]pyridin-6-one (316 mg, white powder). MS(ES$^+$) m/z 458.2 (M+H)$^+$

143: 4-(4-{[4-(2,3-dihydroxypropyl)-2-(trifluoromethyl)phenyl]methoxy}-3-methoxyphenyl)-2H,4H, 5H,6H, 7H-pyrazolo[3,4-b]pyridin-6-one

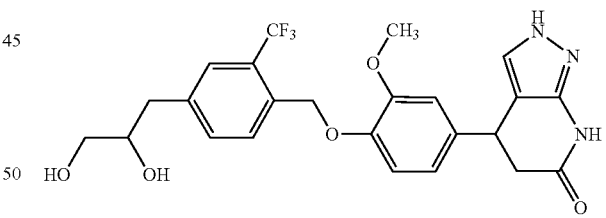

i) To a solution of Example 142 (100 mg) in acetone (1 mL) and H$_2$O (0.1 mL) were added sequentially NMO (51 mg) and OsO$_4$ (catalytic amount). The reaction mixture was stirred at room temperature for three hours. A solution of sodium sulfite in 4 ml of H$_2$O was added and the reaction mixture was stirred for another 20 minutes. The product was extracted with EtOAc and the organic phase was washed with brine, dried over MgSO$_4$, filtered and concentrated to afford an oil. The crude product was purified by reversed phase flash chromatography, using a gradient of 10% to 100% ACN in H$_2$O as the eluent, to obtain 4-(4-{[4-(2,3-dihydroxypropyl)-2-(trifluoromethyl)phenyl]methoxy}-3-methoxyphenyl)-2H,4H,5H,6H, 7H-pyrazolo[3,4-b]pyridin-6-one (12 mg, white powder). MS(ES$^+$) m/z 492.2 (M+H)$^+$ 144: 4-(4-{[4-ethyl-2-(trifluoromethyl)phenyl]
methoxy}-3-methoxyphenyl)-2H,4H,5H,6H,
7H-pyrazolo[3,4-b]pyridin-6-one

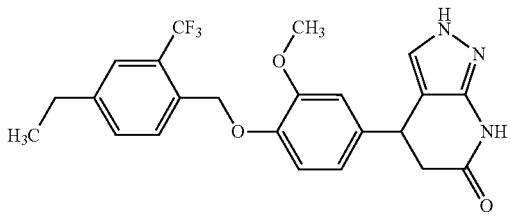

i) Analogous to the procedure described in Example 1, step i), 4-{[4-bromo-2-(trifluoromethyl)phenyl]methoxy}-3-methoxybenzaldehyde was obtained, starting from 4-Bromo-1-(bromomethyl)-2-(trifluoromethyl)benzene.

ii) A solution of the in the previous step obtained compound (5.91 g), ethylene glycol (8.49 mL) and p-TsOH monohydrate (0.29 g) in toluene (50 mL) was refluxed under Dean-Stark conditions for 7 hours. The reaction was cooled to room temperature and NaHCO$_3$ was added. Toluene was added and the organic later was washed with saturated aqueous NaHCO$_3$, H$_2$O and brine sequentially. The organic layer was dried over Na$_2$SO$_4$, filtered and concentrated to afford 2-(4-{[4-bromo-2-(trifluoromethyl)phenyl]methoxy}-3-methoxyphenyl)-1,3-dioxolane (6.29 g, beige powder).

iii) A vial was loaded with the compound obtained from the previous step (100 mg), K$_3$PO$_4$ (147 mg) and ethylboronic acid (51 mg). 1,4-Dioxane (1 mL) was added and the resulting mixture was degassed by bubbling nitrogen through it for 30 minutes. Pd(PPh$_3$)$_2$Cl$_2$ was added and the vial was capped and stirred for 90 minutes at 90° C. in the microwave. The reaction mixture was diluted with EtOAc and washed sequentially with H$_2$O, 2N aq. HCl, 2N aq. NaOH, H$_2$O and brine. The organic phase was dried over MgSO$_4$, filtered and concentrated to afford 2-(4-{[4-ethyl-2-(trifluoromethyl)phenyl]methoxy}-3-methoxyphenyl)-1,3-dioxolane (48 mg, yellow oil).

iv) To a solution of the in the previous step obtained compound (48 mg) in THF (1 mL) was added 0.41 ml of a 6M aq. HCl solution. The resulting solution was stirred at room temperature overnight. The THF was evaporated and the resulting aqueous mixture was basified with saturated aqueous K$_2$CO$_3$. The mixture was then extracted with EtOAc and washed with saturated aqueous K$_2$CO$_3$ and brine sequentially. The organic layer was dried over MgSO$_4$, filtered and concentrated to afford a yellow oil, which was dissolved in heptane. A yellow powder was filtered off and the filtrate was concentrated to afford 4-{[4-ethyl-2-(trifluoromethyl)phenyl]methoxy}-3-methoxybenzaldehyde as a white powder.

v) Analogous to the procedure described in Example 1, step ii), the compound obtained in the previous step (57 mg) was converted to 4-(4-{[4-ethyl-2-(trifluoromethyl)phenyl]methoxy}-3-methoxyphenyl)-2H,4H,5H,6H,7H-pyrazolo[3,4-b]pyridin-6-one (17 mg, white powder). MS(ES$^+$) m/z 446.2 (M+H)$^+$ Following a procedure analogous to that described for Example 144, using appropriate starting materials and solvents, the following compounds have been prepared.

145: 4-(4-{[4-cyclopropyl-2-(trifluoromethyl)phenyl]methoxy}-3-methoxyphenyl)-2H,4H,5H,6H,7H-pyrazolo[3,4-b]pyridin-6-one

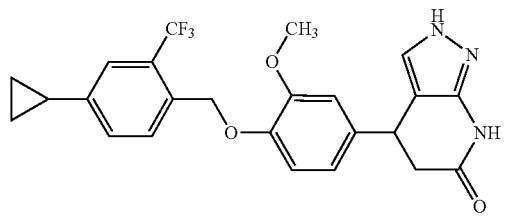 [SMILES: COc1cc(C2CC(=O)Nc3n[nH]cc32)ccc1OCc1ccc(C2CC2)cc1C(F)(F)F]

MS(ES$^+$) m/z 458.2 (M+H)$^+$

146: 4-(4-{[4-(3-hydroxyprop-1-yn-1-yl)-2-(trifluoromethyl)phenyl]methoxy}-3-methoxyphenyl)-2H,4H,5H,6H, 7H-pyrazolo[3,4-b]pyridin-6-one

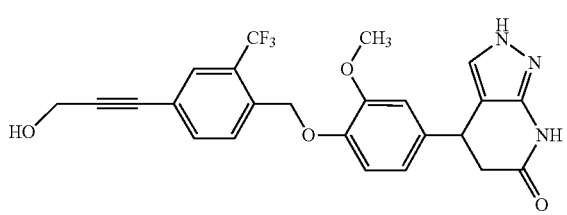 [SMILES: COc1cc(C2CC(=O)Nc3n[nH]cc32)ccc1OCc1ccc(C#CCO)cc1C(F)(F)F]

MS(ES$^+$) m/z 472.2 (M+H)$^+$

147: 2-[4-(2-methoxy-4-{6-oxo-2H,4H,5H,6H,7H-pyrazolo[3,4-b]pyridin-4-yl}phenoxymethyl)-3-(trifluoromethyl)phenyl]acetonitrile

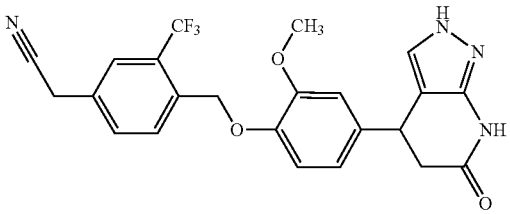 [SMILES: COc1cc(C2CC(=O)Nc3n[nH]cc32)ccc1OCc1ccc(CC#N)cc1C(F)(F)F]

MS(ES$^+$) m/z 457.2 (M+H)$^+$

148: methyl 2-[4-(2-methoxy-4-{6-oxo-2H,4H,5H,6H,7H-pyrazolo[3,4-b]pyridin-4-yl}phenoxymethyl)-3-(trifluoromethyl)phenyl]acetate

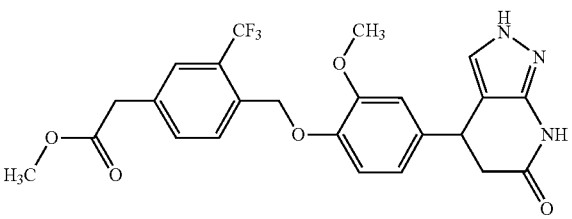 [SMILES: COC(=O)Cc1ccc(COc2ccc(C3CC(=O)Nc4n[nH]cc43)cc2OC)c(C(F)(F)F)c1]

MS(ES$^+$) m/z 490.2 (M+H)$^+$

149: 4-(4-{[4-(3-hydroxypropyl)-2-(trifluoromethyl)phenyl]methoxy}-3-methoxyphenyl)-2H,4H,5H,6H,7H-pyrazolo[3,4-b]pyridin-6-one

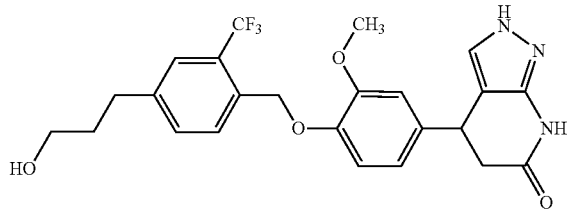 [SMILES: COc1cc(C2CC(=O)Nc3n[nH]cc32)ccc1OCc1ccc(CCCO)cc1C(F)(F)F]

i) A solution of Example 146 (116 mg) in MeOH (10 mL) was degassed by bubbling it with nitrogen for 10 minutes. 10% Pd/C (52 mg, contains 50% $H_2O$) was added and the reaction was bubbled with hydrogen gas for 3 hours. The reaction was filtered over Celite and the filtrate was concentrated. The crude product was purified on preparative HPLC to obtain 4-(4-{[4-(3-hydroxypropyl)-2-(trifluoromethyl)phenyl]methoxy}-3-methoxyphenyl)-2H,4H,5H,6H,7H-pyrazolo[3,4-b]pyridin-6-one (48 mg, white powder). MS(ES+) m/z 476.5 (M+H)+

Following a procedure analogous to that described for Example 149, using Example 147 as the starting material and the appropriate reagents and solvents, the following compound has been prepared.

150: 4-(4-{[4-(2-aminoethyl)-2-(trifluoromethyl)phenyl]methoxy}-3-methoxyphenyl)-2H,4H,5H,6H,7H-pyrazolo[3,4-b]pyridin-6-one

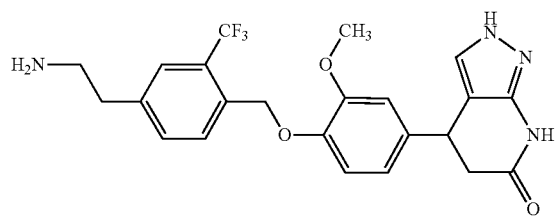 [SMILES: COc1cc(C2CC(=O)Nc3n[nH]cc32)ccc1OCc1ccc(CCN)cc1C(F)(F)F]

MS(ES+) m/z 461.2 (M+H)+

151: 2-{4-[(2-methoxy-4-{6-oxo-2H,4H,5H,6H,7H-pyrazolo[3,4-b]pyridin-4-yl}phenoxy)methyl]-3-(trifluoromethyl)phenyl}acetic acid

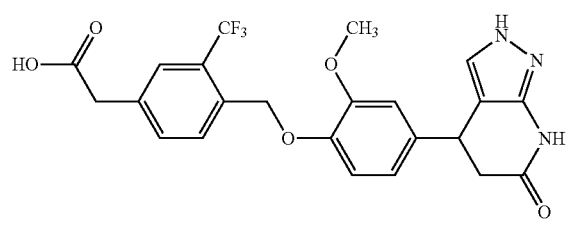 [SMILES: COc1cc(C2CC(=O)Nc3n[nH]cc32)ccc1OCc1ccc(CC(=O)O)cc1C(F)(F)F]

i) Using a procedure analogous to Example 120, step i) and ii), 66 mg of Example 148 was converted to 2-{4-[(2-methoxy-4-{6-oxo-2H,4H,5H,6H,7H-pyrazolo[3,4-b]pyridin-4-yl}phenoxy)methyl]-3-(trifluoromethyl)phenyl}acetic acid (21 mg, white powder). MS(ES+) m/z 461.2 (M+H)+

152: 4-(4-{[4-(1-hydroxy-2-methylpropan-2-yl)-2-(trifluoromethyl)phenyl]methoxy}-3-methoxyphenyl)-2H,4H,5H,6H,7H-pyrazolo[3,4-b]pyridin-6-one

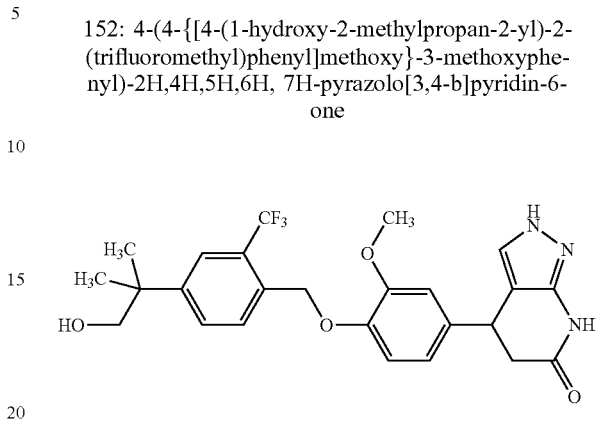

i) Following a procedure analogous to that described in Example 144, step iii), using the compound obtained from Example 144, step ii) (200 mg) and 1-methoxy-1-(trimethylsiloxy)-2-methyl-1-propene (121 mg), methyl 2-{4-[4-(1,3-dioxolan-2-yl)-2-methoxyphenoxymethyl]-3-(trifluoromethyl)phenyl}-2-methylpropanoate (58 mg) was obtained.

ii) To a cooled (0° C.) solution of the in the previous step obtained product (58 mg) in anhydrous THF (1 mL) was added $LiAlH_4$ (0.51 mL, 1M in $Et_2O$) under a nitrogen atmosphere. The reaction mixture was stirred at 0° C. for 30 minutes, then quenched by the dropwise addition of EtOAc while cooling. The mixture was washed with a saturated aqueous potassium sodium tartrate solution two times, saturated aqueous $NaHCO_3$ and brine sequentially, then dried over $MgSO_4$, filtered and concentrated to afford a colourless oil. This was dissolved in DCM and purified by silica gel chromatography, using a gradient of 0% to 50% EtOAc in heptane as the eluent, to afford 15 mg 2-(4-{[4-(1,3-dioxolan-2-yl)-2-methoxyphenoxy]methyl}-3-(trifluoromethyl)phenyl)-2-methylpropan-1-ol as a colourless oil.

iii) Following a procedure analogous to that described in Example 144, step iv), followed by a procedure analogous to that described in Example 1, step ii), the compound obtained in the previous step (15 mg) was converted to 4-(4-{[4-(1-hydroxy-2-methylpropan-2-yl)-2-(trifluoromethyl)phenyl]methoxy}-3-methoxyphenyl)-2H,4H,5H,6H, 7H-pyrazolo[3,4-b]pyridin-6-one (4 mg, white powder). MS(ES+) m/z 490.2 (M+H)+

153: 4-(4-{[4-(2-hydroxy-2-methylpropyl)-2-(trifluoromethyl)phenyl]methoxy}-3-methoxyphenyl)-2H,4H,5H,6H,7H-pyrazolo[3,4-b]pyridin-6-one

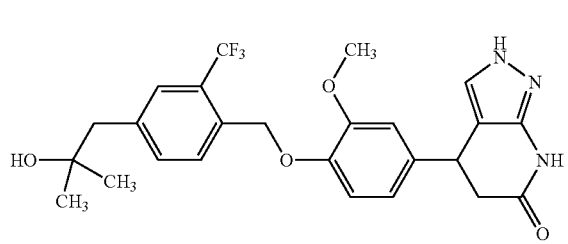 [SMILES: COc1cc(C2CC(=O)Nc3n[nH]cc32)ccc1OCc1ccc(CC(C)(C)O)cc1C(F)(F)F]

i) Following a procedure analogous to that described in Example 144, step iii), using the compound obtained from Example 144, step ii) (589 mg) and 1-(tert-butyldimethylsilyloxy)-1-methoxyethene (512 mg), methyl 2-(4-{[4-(1,3-dioxolan-2-yl)-2-methoxyphenoxy]methyl}-3-(trifluoromethyl)phenyl)acetate (421 mg) was obtained.

ii) The in the previous step obtained compound (421 mg) was dissolved in 10 mL anhydrous THF under a nitrogen atmosphere. The reaction mixture was cooled to 10° C. and MeMgBr (1 mL, 3M in Et$_2$O) was slowly added. The reaction mixture was stirred 30 minutes at room temperature and then refluxed for 2 hours. The reaction was cooled to room temperature, 2 mL of saturated aqueous NH$_4$Cl was added and the reaction mixture was then stirred overnight at room temperature. 2 mL of 2M aq. HCl was added and the mixture was stirred for 1h. The product was extracted with EtOAc three times and the combined organic layers were dried over MgSO$_4$, filtered and concentrated to give 1-(4-{[4-(1,3-dioxolan-2-yl)-2-methoxyphenoxy]methyl}-3-(trifluoromethyl)phenyl)-2-methylpropan-2-ol as a yellow oil (387 mg). The product was used in next step without further purification.

iii) Following a procedure analogous to that described in Example 1, step ii), the compound obtained in the previous step (387 mg) was converted to 4-(4-{[4-(2-hydroxy-2-methylpropyl)-2-(trifluoromethyl)phenyl]methoxy}-3-methoxyphenyl)-2H,4H,5H,6H, 7H-pyrazolo[3,4-b]pyridin-6-one (75 mg, white powder). MS(ES$^+$) m/z 490.2 (M+H)$^+$ 154: 4-(4-{[4-hydroxy-2-(trifluoromethyl)phenyl]methoxy}-3-methoxyphenyl)-2H,4H,5H,6H,7H-pyrazolo[3,4-b]pyridin-6-one

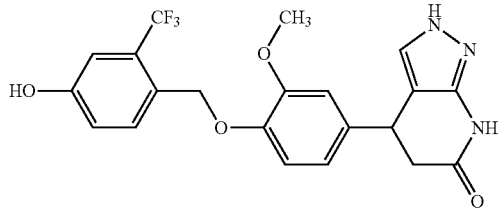

MS(ES$^+$) m/z 434.1 (M+H)$^+$ i) A solution of the compound obtained in Example 144, step ii) (100 mg), bis(pinacolato)diboron (88 mg) and KOAc (68 mg) in 1,4-dioxane (1 mL) was degassed with nitrogen for 20 minutes. Pd(dppf)Cl$_2$ (19 mg) was added and the vial was capped and stirred in the microwave for 16 hour at 80° C. The reaction mixture was diluted with Et$_2$O and filtered over Celite. The filtrate was concentrated to afford a brown oil. The crude product was purified on a silica column, using a gradient of 0% to 50% EtOAc in heptane as the eluent, to obtain 2-{4-[4-(1,3-dioxolan-2-yl)-2-methoxyphenoxymethyl]-3-(trifluoromethyl)phenyl}-4,4,5,5-tetramethyl-1,3,2-dioxaborolane (75 mg) as a colorless oil.

ii) To a solution of the compound obtained in the previous step (75 mg) in methanol (4 mL) was added a 30 wt % hydrogen peroxide in water solution (425 µL). The resulting solution was stirred at room temperature for 1 hour. The reaction mixture was quenched with sodium sulfite (powder) and the organic solvents were evaporated under vacuum. The obtained aqueous suspension was diluted with water and extracted with EtOAc. The organic layer was washed with saturated aqueous NaHCO$_3$ and brine sequentially, then dried over MgSO$_4$, filtered and concentrated to afford 4-[4-(1,3-dioxolan-2-yl)-2-methoxyphenoxymethyl]-3-(trifluoromethyl)phenol (60 mg) as a pale yellow oil. The product was used in the next step without further purification.

iii) Following a procedure analogous to that described in Example 144, step iv), followed by a procedure analogous to that described in Example 1, step ii, the compound obtained in the previous step (60 mg) was converted to 4-(4-{[4-(1-hydroxy-2-methylpropan-2-yl)-2-(trifluoromethyl)phenyl]methoxy}-3-methoxyphenyl)-2H,4H,5H,6H,7H-pyrazolo[3,4-b]pyridin-6-one (23 mg). MS(ES$^+$) m/z 434.2 (M+H)$^+$ 155: 4-(4-{[4-(2-hydroxyethyl)-2-(trifluoromethyl)phenyl]methoxy}-3-methoxyphenyl)-2H,4H,5H,6H,7H-pyrazolo[3,4-b]pyridin-6-one

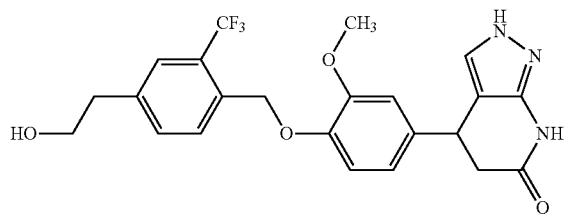 [SMILES: COc1cc(C2CC(=O)Nc3n[nH]cc32)ccc1OCc1ccc(CCO)cc1C(F)(F)F]

i) To a 0° C. solution of the compound obtained in Example 151, step i) (93 mg) in anhydrous THF (1 mL) was added LiAlH$_4$ (0.86 mL, 1 M in Et$_2$O) under nitrogen atmosphere. The reaction mixture was stirred at 0° C. for 90 minutes and was then quenched by dropwise addition of EtOAc while cooling. The mixture was washed with a saturated aqueous potassium sodium tartrate solution two times, saturated aqueous NaHCO$_3$ and brine sequentially, then dried over MgSO$_4$, filtered and concentrated to afford 2-{4-[4-(1,3-dioxolan-2-yl)-2-methoxyphenoxymethyl]-3-(trifluoromethyl)phenyl}ethan-1-ol (60 mg) as a colorless oil. The product was used in the next step without further purification.

ii) Following a procedure analogous to that described in Example 144, step iv), followed by a procedure analogous to that described in example 1, step ii), the compound obtained in the previous step (60 mg) was converted to 4-(4-{[4-(2-hydroxyethyl)-2-(trifluoromethyl)phenyl]methoxy}-3-methoxyphenyl)-2H,4H,5H,6H,7H-pyrazolo[3,4-b]pyridin-6-one (5 mg). MS(ES$^+$) m/z 462.2 (M+H)$^+$ Following a procedure analogous to that described for Example 155, using appropriate starting materials, the following compounds have been prepared.

156: 7-(4-{[4-(2-hydroxyethyl)-2-(trifluoromethyl)phenyl]methoxy}-3-methoxyphenyl)-2H,4H,5H,6H,7H-pyrazolo[4,3-b]pyridin-5-one

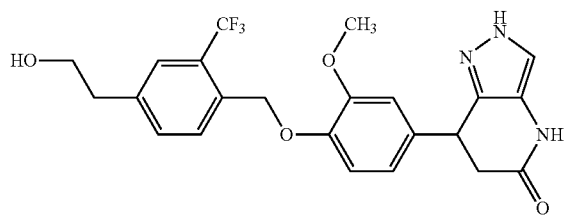

MS(ES$^+$) m/z 462.2 (M+H)$^+$

157: 7-(4-{[4-(2-hydroxyethyl)-2-(trifluoromethyl)phenyl]methoxy}-3-methoxyphenyl)-2H,4H,5H,6H,7H-[1,2,3]triazolo[4,5-b]pyridin-5-one

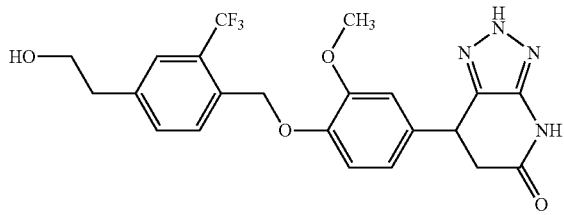

MS(ES+) m/z 463.2 (M+H)+

158: 4-(4-{[4-(hydroxymethyl)-2-(trifluoromethyl)phenyl]methoxy}-3-methoxyphenyl)-2H,4H,5H,6H,7H-pyrazolo[3,4-b]pyridin-6-one

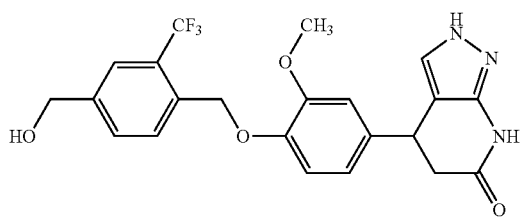 [SMILES: COc1cc(C2CC(=O)Nc3n[nH]cc32)ccc1OCc1ccc(CO)cc1C(F)(F)F]

i) The compound obtained in Example 120, step i) (200 mg) was suspended in anhydrous THF (4 mL) and BH$_3$-Me$_2$S (321 µL, 2M in THF) was added dropwise. After 2 hours stirring at room temperature another 321 µL BH$_3$-Me$_2$S (2M in THF) was added dropwise and the reaction mixture was stirred for 1 hour. 0.5M aq. HCl was added and the product was extracted with DCM twice and EtOAc. The combined organic layers were dried over MgSO$_4$, filtered and concentrated. The crude product was purified by preparative HPLC, using an isocratic gradient of 35% ACN in H$_2$O as the eluent, to afford 4-(4-{[4-(hydroxymethyl)-2-(trifluoromethyl)phenyl]methoxy}-3-methoxyphenyl)-2H,4H,5H,6H,7H-pyrazolo[3,4-b]pyridin-6-one (6 mg) as a white powder. MS(ES+) m/z 448.2 (M+H)+

159: 4-[(2-methoxy-4-{6-oxo-2H,4H,5H,6H,7H-pyrazolo[3,4-b]pyridin-4-yl}phenoxy)methyl]-3-(trifluoromethyl)benzaldehyde

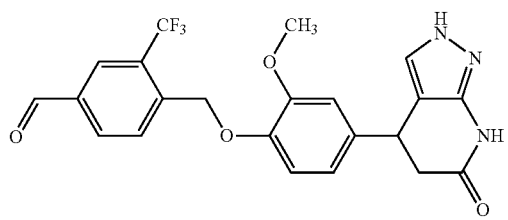 [SMILES: COc1cc(C2CC(=O)Nc3n[nH]cc32)ccc1OCc1ccc(C=O)cc1C(F)(F)F]

i) Example 42 (146 mg) was dissolved in anhydrous THF (5 mL) under a nitrogen atmosphere. The solution was cooled to −78° C. and DiBAl—H (921 µL, 1M in toluene) was added. The reaction was stirred for 4 hours at −78° C. and then quenched with 1 M aqueous HCl. The reaction was warmed to room temperature and the product was extracted with EtOAc three times and the combined organic layers were washed with brine, dried over MgSO$_4$, filtered and concentrated to yield 176 mg crude product. The crude product was suspended in ACN and the solids were filtered off and washed with ACN. The filtrate was evaporated and the crude product was purified twice with reversed phase, flash chromatography to yield 4-[(2-methoxy-4-{6-oxo-2H,4H,5H,6H,7H-pyrazolo[3,4-b]pyridin-4-yl}phenoxy)methyl]-3-(trifluoromethyl)benzaldehyde(14 mg, white powder). MS(ES+) m/z 446.2 (M+H)+

160: 4-(4-{[3-(2-hydroxyethoxy)-2-(trifluoromethyl)phenyl]methoxy}-3-methoxyphenyl)-2H,4H,5H,6H,7H-pyrazolo[3,4-b]pyridin-6-one

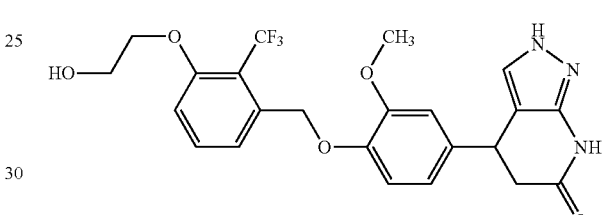

i) Analogous to the procedure described in Example 1, step i), 4-{[3-bromo-2-(trifluoromethyl)phenyl]methoxy}-3-methoxybenzaldehyde was obtained, starting from 1-bromo-3-(bromomethyl)-2-(trifluoromethyl)benzene.

ii) Analogous to the procedure described in Example 144, step ii), the compound obtained in the previous step (4.53 g) was converted to 2-(4-{[3-bromo-2-(trifluoromethyl)phenyl]methoxy}-3-methoxyphenyl)-1,3-dioxolane (4.5 g, white solid).

iii) A mixture of the in the previous step obtained compound (100 mg), copper(II) bromide (16 mg) and K$_2$CO$_3$ (96 mg) in anhydrous ethylene glycol (0.5 mL) was stirred at 130° C. overnight. The reaction mixture was diluted with EtOAc and washed sequentially with H$_2$O, saturated aqueous NaHCO$_3$ and brine. The organic layer was then dried over MgSO$_4$, filtered and concentrated to afford a yellow solid. This was dissolved in ACN and purified by reversed phase flash chromatography to afford 2-(3-{[4-(1,3-dioxolan-2-yl)-2-methoxyphenoxy]methyl}-2-(trifluoromethyl)phenoxy)ethan-1-ol (28 mg, beige solid).

iv) Analogous to the procedure described in Example 144, step iv), followed by the procedure described in Example 1, step ii), the compound obtained in the previous step (28 mg) was converted to 4-(4-{[3-(2-hydroxyethoxy)-2-(trifluoromethyl)phenyl]methoxy}-3-methoxyphenyl)-2H,4H,5H,6H,7H-pyrazolo[3,4-b]pyridin-6-one (12 mg, white powder). MS(ES+) m/z 478.2 (M+H)+

161: 4-(3-amino-4-{[2-(trifluoromethyl)phenyl]methoxy}phenyl)-2H,4H,5H,6H,7H-pyrazolo[3,4-b]pyridin-6-one

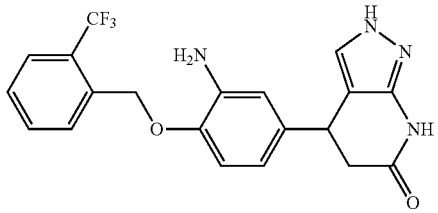 [SMILES: Nc1cc(C2CC(=O)Nc3n[nH]cc32)ccc1OCc1ccccc1C(F)(F)F]

i) A solution of NH₄Cl (14 mg) in water (1 mL) was added to a solution of Example 67 (30 mg) in THF/MeOH (0.5 mL/0.5 mL) followed by the addition of iron powder (15 mg). The reaction mixture was stirred at 70° C. for 4 hours. Then the reaction mixture was cooled to room temperature, diluted with EtOAc, filtered over Celite and concentrated to obtain a colourless oil. The oil was purified on preparative HPLC to obtain 4-(3-amino-4-{[2-(trifluoromethyl)phenyl]methoxy}phenyl)-2H,4H,5H,6H,7H-pyrazolo[3,4-b]pyridin-6-one (14 mg). MS(ES⁺) m/z 403.2 (M+H)⁺

162: 4-[2-(dimethylamino)-4-{[2-(trifluoromethyl)phenyl]methoxy}phenyl]-2H,4H,5H,6H, 7H-pyrazolo[3,4-b]pyridin-6-one

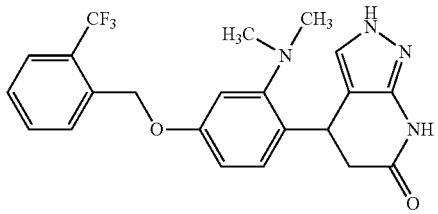 [SMILES: CN(C)c1cc(OCc2ccccc2C(F)(F)F)ccc1C1CC(=O)Nc2n[nH]cc21]

i) Following a procedure analogous to that described in Example 1, step i), 2-fluoro-4-hydroxybenzaldehyde (2 g) was converted to 2-fluoro-4-{[2-(trifluoromethyl)phenyl]methoxy}benzaldehyde (4.1 g).

ii) The compound obtained in the previous step (100 mg) was dissolved in DMF (2 mL) and dimethylamine HCl (32 mg) and K₂CO₃ (109 mg) were added. The reaction mixture was heated to 110° C. and stirred for 5 days. The reaction mixture was cooled to room temperature and 10 mL of water was added. The product was extracted with EtOAc three times and the combined organic layers were washed brine three times, dried over MgSO₄, filtered and concentrated to yield 2-(dimethylamino)-4-{[2-(trifluoromethyl)phenyl]methoxy}benzaldehyde (107 mg). The product was used in the next step without further purification.

iii) Following a procedure analogous to that described in Example 1, step ii), the compound obtained in the previous step (107 mg) was converted to 4-[2-(dimethylamino)-4-{[2-(trifluoromethyl)phenyl]methoxy}phenyl]-2H,4H,5H,6H,7H-pyrazolo[3,4-b]pyridin-6-one (9 mg). MS(ES⁺) m/z 431.2 (M+H)⁺

163: 4-[3-(3-methoxypropoxy)-4-{[2-(trifluoromethyl)phenyl]methoxy}phenyl]-2H,4H,5H,6H,7H-pyrazolo[3,4-b]pyridin-6-one

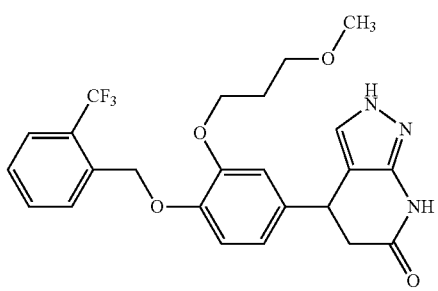 [SMILES: COCCCOc1cc(C2CC(=O)Nc3n[nH]cc32)ccc1OCc1ccccc1C(F)(F)F]

i) 4-Fluoro-3-hydroxybenzaldehyde (300 mg) and 1-bromo-3-methoxypropane (327 mg) were dissolved in ACN (10 mL), K₂CO₃ (647 mg) was added and the reaction mixture was heated to 70° C. overnight. The reaction mixture was cooled to room temperature and was then partitioned between EtOAc and water. The water layer was extracted twice more with EtOAc and the combined organic layers were dried over MgSO₄, filtered and concentrated. The crude product was purified on a silica column, using a gradient of 0% to 30% EtOAc in heptane as the eluent, to afford 4-fluoro-3-(3-methoxypropoxy)benzaldehyde (198 mg).

ii) To a cooled (0° C.) solution of [2-(trifluoromethyl)phenyl]methanol (193 mg) in anhydrous DMF (5 mL) was added NaH (14 mg) under a nitrogen atmosphere. The reaction mixture was stirred for 15 minutes at 0° C. then the compound obtained in the previous step (109 mg) was added and the reaction mixture was stirred at room temperature overnight. The reaction mixture was partitioned between EtOAc and water. The water layer was extracted twice more with EtOAc and the combined organic layers were dried over MgSO₄, filtered and concentrated. The crude product was purified on a silica column, using a gradient of 0% to 30% EtOAc in heptane as the eluent, to yield 3-(3-methoxypropoxy)-4-{[2-(trifluoromethyl)phenyl]methoxy}benzaldehyde (96 mg).

iii) Following a procedure analogous to that described in Example 1, step ii), the compound obtained in the previous step (96 mg) was converted to 4-[3-(3-methoxypropoxy)-4-{[2-(trifluoromethyl)phenyl]methoxy}phenyl]-2H,4H,5H,6H, 7H-pyrazolo[3,4-b]pyridin-6-one (11 mg). MS(ES⁺) m/z 476.2 (M+H)⁺

Following a procedure analogous to that described for Example 163, using appropriate starting materials, the following compound has been prepared.

164: 4-[3-(2-methoxyethoxy)-4-{[2-(trifluoromethyl)phenyl]methoxy}phenyl]-2H,4H,5H,6H,7H-pyrazolo[3,4-b]pyridin-6-one

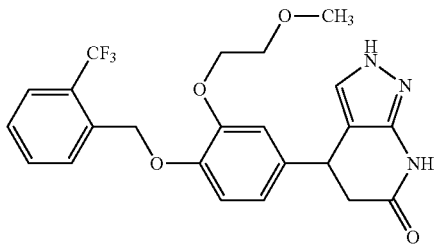 [SMILES: COCCOc1cc(C2CC(=O)Nc3n[nH]cc32)ccc1OCc1ccccc1C(F)(F)F]

MS(ES$^+$) m/z 462.2 (M+H)$^+$

165: 4-(2-{[2-(trifluoromethyl)phenyl]methoxy}pyrimidin-5-yl)-2H,4H,5H,6H,7H-pyrazolo[3,4-b]pyridin-6-one

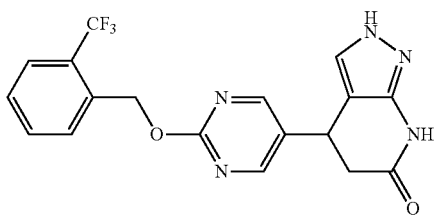 [SMILES: O=C1CC(c2cnc(OCc3ccccc3C(F)(F)F)nc2)c2c[nH]nc2N1]

i) 2-Chloropyrimidine-5-carbaldehyde (200 mg) and Cs$_2$CO$_3$ (914 mg) were loaded in a flask and 15 mL ACN was added. Then 2-(trifluoromethyl)benzyl alcohol (186 µL) was added and the reaction was stirred four days at room temperature. The solvent was evaporated and the crude product was partitioned between EtOAc and water. The water layer was extracted twice more with EtOAc and the combined organic layers were washed with brine, dried over MgSO$_4$, filtered and concentrated. The crude product was purified by reversed phase flash chromatography to yield 32 mg of 2-{[2-(trifluoromethyl)phenyl]methoxy}pyrimidine-5-carbaldehyde.

ii) Following a procedure analogous to that described in Example 1, step ii), the compound obtained in the previous step (32 mg) was converted to 4-(2-{[2-(trifluoromethyl)phenyl]methoxy}pyrimidin-5-yl)-2H,4H,5H,6H,7H-pyrazolo[3,4-b]pyridin-6-one (18 mg). MS(ES$^+$) m/z 390.1 (M+H)$^+$ 166: 4-(3-methoxy-4-{[2-(trifluoromethyl)phenyl]methoxy}phenyl)-2H,4H,5H,6H,7H-pyrazolo[3,4-b]pyridine-6-thione

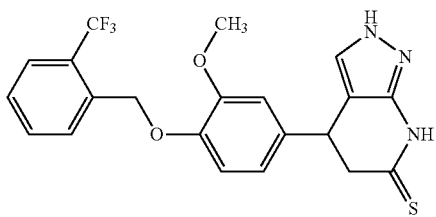

i) Example 1 (80 mg) was suspended in anhydrous DCM (10 mL) under a nitrogen atmosphere. Lawesson's reagent (39 mg) was added and the reaction was heated to 30° C. and stirred overnight. The solvent was evaporated and the crude product was purified by reversed phase flash chromatography, using solid loading, to obtain 4-(3-methoxy-4-{[2-(trifluoromethyl)phenyl]methoxy}phenyl)-2H,4H,5H,6H,7H-pyrazolo[3,4-b]pyridine-6-thione (48 mg). MS(ES$^+$) m/z 434.1 (M+H)$^+$ 167: 4-(3-methoxy-4-{[2-(trifluoromethyl)phenyl]methoxy}phenyl)-2H,4H,5H,6H,7H-pyrazolo[3,4-b]pyridin-6-imine

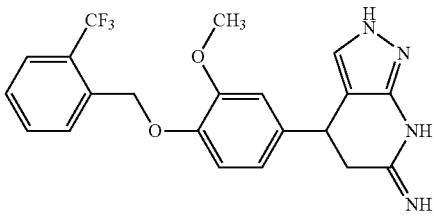 [SMILES: COc1cc(C2CC(=N)Nc3n[nH]cc32)ccc1OCc1ccccc1C(F)(F)F]

i) Example 166 (18 mg) was dissolved in 7N ammonia in MeOH (1.5 mL) under a nitrogen atmosphere. The reaction was stirred for 4 hours. The solvent was evaporated and the crude product was purified by preparative HPLC, to obtain 4-(3-methoxy-4-{[2-(trifluoromethyl)phenyl]methoxy}phenyl)-2H,4H,5H,6H,7H-pyrazolo[3,4-b]pyridin-6-imine (17 mg). MS(ES$^+$) m/z 417.1 (M+H)$^+$ 168: 4-(3-methoxy-4-{[2-(trifluoromethyl)phenyl]methoxy}phenyl)-1H,6H,7H-pyrrolo[2,3-b]pyridin-6-one

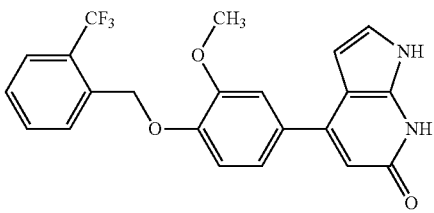 [SMILES: COc1cc(-c2cc(=O)[nH]c3[nH]ccc23)ccc1OCc1ccccc1C(F)(F)F]

i) Following a procedure analogous to that described in Example 1, step i), 4-bromo-2-methoxyphenol (2.6 g) and 2-(trifluoromethyl)benzylbromide (3.06 g) were converted to 4-bromo-2-methoxy-1-{[2-(trifluoromethyl)phenyl]methoxy}benzene (4.64 g).

ii) Following a procedure analogous to that described in Example 154, step i), the in the previous step obtained compound (2.32 g) was converted to 2-(3-methoxy-4-{[2-(trifluoromethyl)phenyl]methoxy}phenyl)-4,4,5,5-tetramethyl-1,3,2-dioxaborolane (2.32 g).

iii) 4-bromo-6-methoxy-1H-pyrrolo[2,3-b]pyridine (243 mg), potassium iodide (355 mg) and TMS-Cl (272 µL) were dissolved in 15 mL ACN, heated to 80° C. and stirred for 3.5 hours. The solvent was evaporated and the crude product was partitioned between water and EtOAc. The water layer was extracted twice more with EtOAc and the combined organic layers were washed with brine, dried over MgSO$_4$ and concentrated. The crude product was suspended in ACN/water. The solids were filtered off and washed with ACN, to afford 4-iodo-1H-pyrrolo[2,3-b]pyridin-6-ol (46 mg).

iv) 4-iodo-1H-pyrrolo[2,3-b]pyridin-6-ol (Example 168, step iii) (46 mg), 2-(3-methoxy-4-{[2-(trifluoromethyl)phenyl]methoxy}phenyl)-4,4,5,5-tetramethyl-1,3,2-dioxaborolane (Example 168, step ii) (108 mg) and K$_2$CO$_3$ (49 mg) were dissolved in 2 mL 1,4-dioxane/water (3/1) in a microwave vial. The mixture was degassed with nitrogen for 15 minutes, Pd(PPh$_3$)$_4$ (20 mg) was added and the vial was capped. The reaction was stirred in the microwave for 6 hours at 100° C. The reaction was diluted with EtOAc and the filtered over Celite. The filtrate was evaporated and the crude product was suspended in ACN with a little water. The solids were filtered off and washed with ACN to obtain 4-(3-methoxy-4-{[2-(trifluoromethyl)phenyl]methoxy}phenyl)-1H,6H,7H-pyrrolo[2,3-b]pyridin-6-one (4 mg). MS(ES$^+$) m/z 415.1 (M+H)$^+$ 169: 4-(3-methoxy-4-{[2-(trifluoromethyl)phenyl]methoxy}phenyl)-2H,6H,7H-pyrazolo[3,4-b]pyridin-6-one

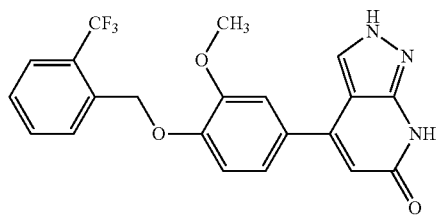 [SMILES: COc1cc(-c2cc(=O)[nH]c3n[nH]cc23)ccc1OCc1ccccc1C(F)(F)F]

i) A solution of Example 1 (40 mg) and DDQ (131 mg) in 1,4-dioxane (1 mL) was stirred 1 hour at 70° C. The solvent was evaporated and to the crude product was added saturated aqueous K$_2$CO$_3$. The water layer was extracted with DCM three times. The combined organic layers were washed with brine, dried over MgSO$_4$, filtered and concentrated. The product was dissolved in little ACN, THF and water. The THF was evaporated and then the product precipitated. The solids were filtered off and dried in the vacuum oven to obtain 4-(3-methoxy-4-{[2-(trifluoromethyl)phenyl]methoxy}phenyl)-2H,6H,7H-pyrazolo[3,4-b]pyridin-6-one (3 mg) as a light brown solid. MS(ES$^+$) m/z 416.2 (M+H)$^+$ Following a procedure analogous to that described for Example 169, using appropriate starting materials, the following compounds have been prepared.

170: 4-(3-methoxy-4-{[4-methoxy-2-(trifluoromethyl)phenyl]methoxy}phenyl)-2H,6H, 7H-pyrazolo[3,4-b]pyridin-6-one

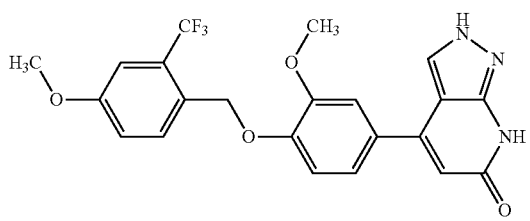 [SMILES: COc1ccc(COc2ccc(-c3cc(=O)[nH]c4n[nH]cc34)cc2OC)c(C(F)(F)F)c1]

MS(ES$^+$) m/z 446.2 (M+H)$^+$

171: 4-{3-methoxy-4-[(2-methoxyphenyl)methoxy]phenyl}-2H,6H, 7H-pyrazolo[3,4-b]pyridin-6-one

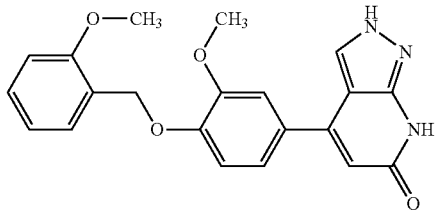 [SMILES: COc1ccccc1COc1ccc(-c2cc(=O)[nH]c3n[nH]cc23)cc1OC]

MS(ES$^+$) m/z 378.2 (M+H)$^+$

172: 4-(3-methoxy-4-{[3-(trifluoromethyl)pyridin-4-yl]methoxy}phenyl)-2H,6H, 7H-pyrazolo[3,4-b]pyridin-6-one

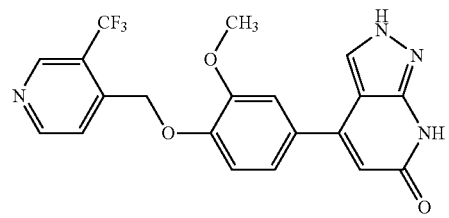 [SMILES: COc1cc(-c2cc(=O)[nH]c3n[nH]cc23)ccc1OCc1ccncc1C(F)(F)F]

MS(ES$^+$) m/z 417.2 (M+H)$^+$

173: 4-(4-{[4-amino-2-(trifluoromethyl)phenyl]methoxy}-3-methoxyphenyl)-2H,6H,7H-pyrazolo[3,4-b]pyridin-6-one

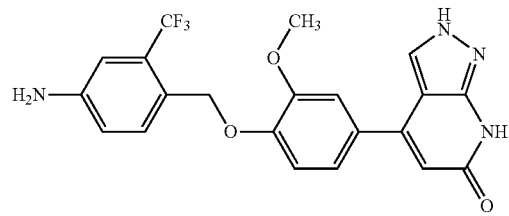

MS(ES$^+$) m/z 431.2 (M+H)$^+$

174: 4-(4-{[4-acetyl-2-(trifluoromethyl)phenyl]methoxy}-3-methoxyphenyl)-2H,6H, 7H-pyrazolo[3,4-b]pyridin-6-one

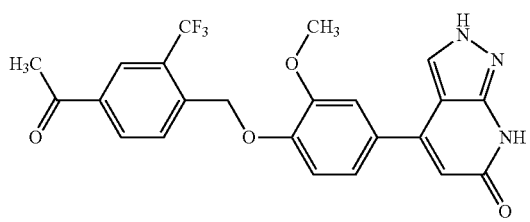 [SMILES: COc1cc(-c2cc(=O)[nH]c3n[nH]cc23)ccc1OCc1ccc(C(C)=O)cc1C(F)(F)F]

MS(ES$^+$) m/z 458.2 (M+H)$^+$

175: 4-(4-{[4-ethyl-2-(trifluoromethyl)phenyl]
methoxy}-3-methoxyphenyl)-2H,6H, 7H-pyrazolo
[3,4-b]pyridin-6-one

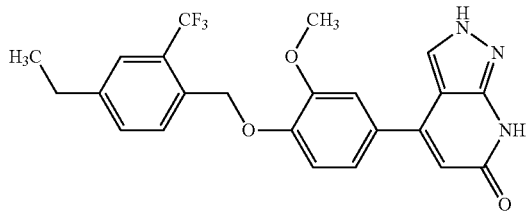

MS(ES⁺) m/z 444.2 (M+H)⁺

176: 4-(4-{[4-(2-hydroxyethyl)-2-(trifluoromethyl)
phenyl]methoxy}-3-methoxyphenyl)-2H, 6H,
7H-pyrazolo[3,4-b]pyridin-6-one

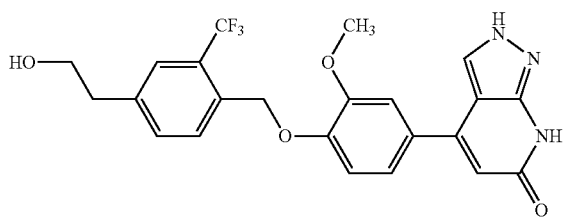 [SMILES: COc1cc(-c2cc(=O)[nH]c3n[nH]cc23)ccc1OCc1ccc(CCO)cc1C(F)(F)F]

MS(ES⁺) m/z 460.2 (M+H)⁺

177: 4-(3-methoxy-4-{[3-methoxy-2-(trifluoromethyl) phenyl]methoxy}phenyl)-2H, 6H, 7H-pyrazolo[3,4-b]pyridin-6-one

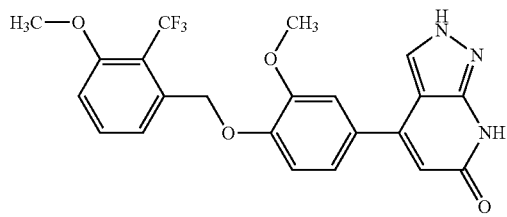 [SMILES: COc1cc(-c2cc(=O)[nH]c3n[nH]cc23)ccc1OCc1cccc(OC)c1C(F)(F)F]

MS(ES⁺) m/z 446.1 (M+H)⁺

178: 4-(3-methoxy-4-{[5-methoxy-2-(trifluoromethyl)phenyl]methoxy}phenyl)-2H,6H,7H-pyrazolo
[3,4-b]pyridin-6-one

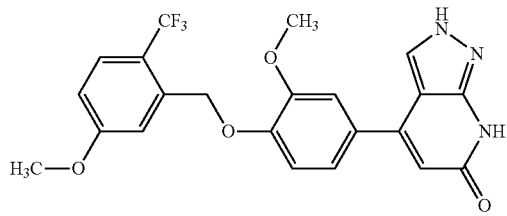 [SMILES: COc1ccc(C(F)(F)F)c(COc2ccc(-c3cc(=O)[nH]c4n[nH]cc34)cc2OC)c1]

MS(ES⁺) m/z 446.1 (M+H)⁺

179: 4-(4-{[4-fluoro-2-(trifluoromethyl)phenyl]
methoxy}-3-methoxyphenyl)-2H,6H, 7H-pyrazolo
[3,4-b]pyridin-6-one

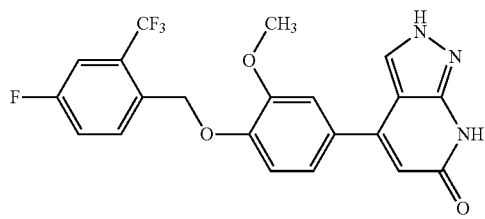 [SMILES: COc1cc(-c2cc(=O)[nH]c3n[nH]cc23)ccc1OCc1ccc(F)cc1C(F)(F)F]

MS(ES⁺) m/z 434.1 (M+H)⁺

180: 4-(4-{[2-(difluoromethoxy)phenyl]methoxy}-
3-methoxyphenyl)-2H,6H, 7H-pyrazolo[3,4-b]pyridin-6-one

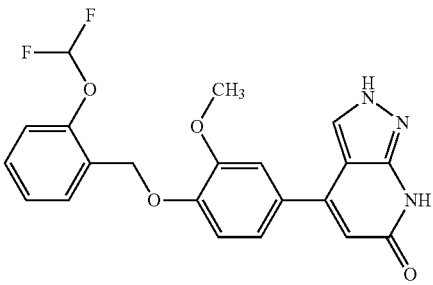 [SMILES: COc1cc(-c2cc(=O)[nH]c3n[nH]cc23)ccc1OCc1ccccc1OC(F)F]

MS(ES⁺) m/z 414.1 (M+H)⁺

181: 4-[(2-methoxy-4-{6-oxo-2H,6H, 7H-pyrazolo
[3,4-b]pyridin-4-yl}phenoxy)methyl]-3-(trifluoromethyl)benzonitrile

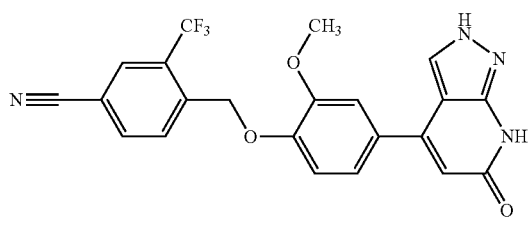 [SMILES: COc1cc(-c2cc(=O)[nH]c3n[nH]cc23)ccc1OCc1ccc(C#N)cc1C(F)(F)F]

MS(ES⁺) m/z 441.1 (M+H)⁺

182: 4-{3-methoxy-4-[(2-methoxy-5-nitrophenyl)methoxy]phenyl}-2H,6H,7H-pyrazolo[3,4-b]pyridin-6-one

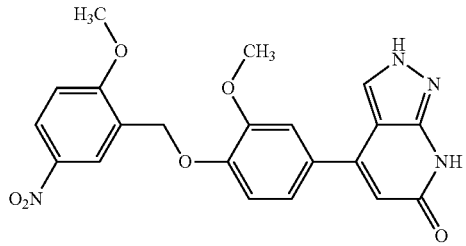 [SMILES: COc1ccc([N+](=O)[O-])cc1COc1ccc(-c2cc(=O)[nH]c3n[nH]cc23)cc1OC]

MS(ES⁺) m/z 423.1 (M+H)⁺

183: 4-[4-(benzyloxy)-3-methoxyphenyl]-2H,6H,7H-pyrazolo[3,4-b]pyridin-6-one

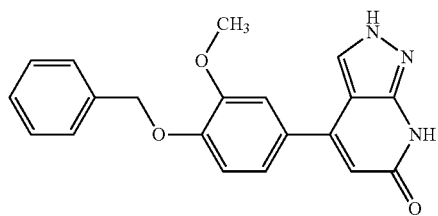 [SMILES: COc1cc(-c2cc(=O)[nH]c3n[nH]cc23)ccc1OCc1ccccc1]

MS(ES⁺) m/z 348.1 (M+H)⁺

184: 4-{4-[(2-bromo-4,5-dimethoxyphenyl)methoxy]-3-methoxyphenyl}-2H,6H, 7H-pyrazolo[3,4-b]pyridin-6-one

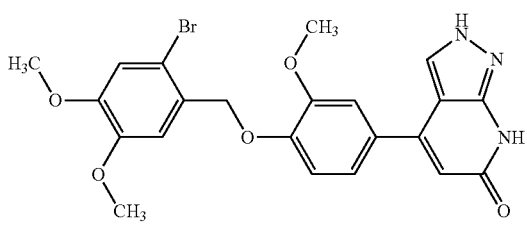 [SMILES: COc1cc(Br)c(COc2ccc(-c3cc(=O)[nH]c4n[nH]cc34)cc2OC)cc1OC]

MS(ES⁺) m/z 486.1 (M+H)⁺

185: 4-{3-methoxy-4-[(pyridin-2-yl)methoxy]phenyl}-2H,6H, 7H-pyrazolo[3,4-b]pyridin-6-one

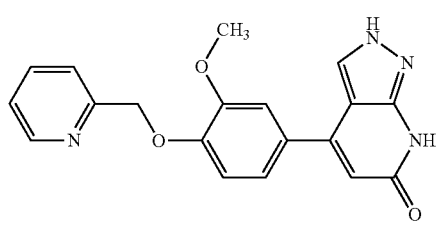 [SMILES: COc1cc(-c2cc(=O)[nH]c3n[nH]cc23)ccc1OCc1ccccn1]

MS(ES⁺) m/z 349.1 (M+H)⁺

186: 4-(4-{[2,4-bis(trifluoromethyl)phenoxy]methyl}-3-methoxyphenyl)-2H,6H, 7H-pyrazolo[3,4-b]pyridin-6-one

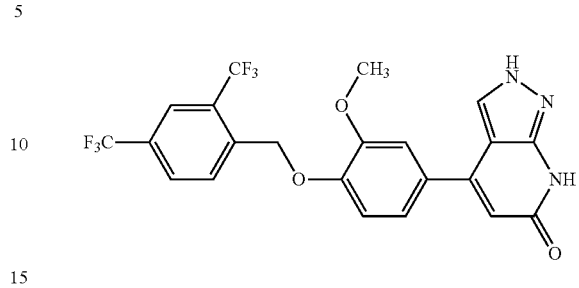

MS(ES⁺) m/z 484.1 (M+H)⁺

187: methyl 4-(4-{[2,4-bis(trifluoromethyl)phenoxy]methyl}-3-methoxyphenyl)-6-oxo-2H,4H,5H,6H,7H-pyrazolo[3,4-b]pyridine-5-carboxylate

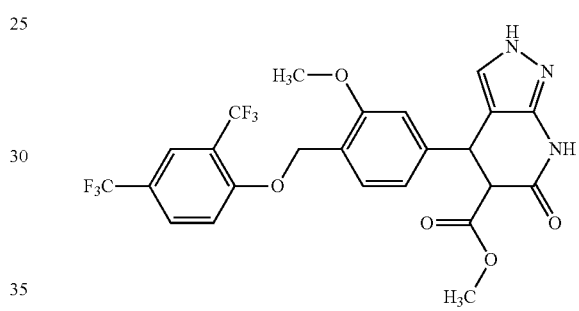

i) Following a procedure analogous to that described for Example 96, steps i) to iii), using appropriate starting materials, 4-{[2,4-bis(trifluoromethyl)phenoxy]methyl}-3-methoxybenzaldehyde was obtained.

ii) The in the previous step obtained product (50 mg), Meldrum's acid (19 mg) and 3-aminopyrazole (11 mg) were dissolved in MeOH. The reaction mixture was stirred at room temperature for 5 hours and the solvent was evaporated by a flow of nitrogen. This resulted in 4-[4-[[2,4-bis(trifluoromethyl)phenoxy]methyl]-3-methoxy-phenyl]-6-oxo-2,4,5,7-tetrahydropyrazolo[3,4-b]pyridine-5-carboxylic acid (69 mg) as a yellow oil.

iii) DIAD (33 µL) was added dropwise to a cooled (0° C.) solution of PPh₃ (44 mg) in anhydrous THF (1.5 mL) under a nitrogen atmosphere. After stirring for 30 minutes MeOH (53 µL) was added followed by the dropwise addition of the in the previous step obtained product (69 mg) dissolved in anhydrous THF (1 mL). The reaction was warmed to room temperature and stirred for 1 hour. Water was added and the aqueous layer was extracted with EtOAc three times. The combined organic layers were washed with brine, dried over MgSO₄ and concentrated. The crude product was purified on silica column, using a gradient of 0 to 5% MeOH in DCM, followed by reversed phase flash chromatography, using a gradient of ACN/H₂O 20/80 to 90/10 as the eluent, to obtain methyl 4-(4-{[2,4-bis(trifluoromethyl)phenoxy]methyl}-3-methoxyphenyl)-6-oxo-2H,4H,5H,6H, 7H-pyrazolo[3,4-b]pyridine-5-carboxylate (18 mg). MS(ES⁺) m/z 544.4 (M+H)⁺

188: 4-(4-{[2,4-bis(trifluoromethyl)phenoxy]methyl}-3-methoxyphenyl)-N,N-dimethyl-6-oxo-2H,4H,5H,6H, 7H-pyrazolo[3,4-b]pyridine-5-carboxamide

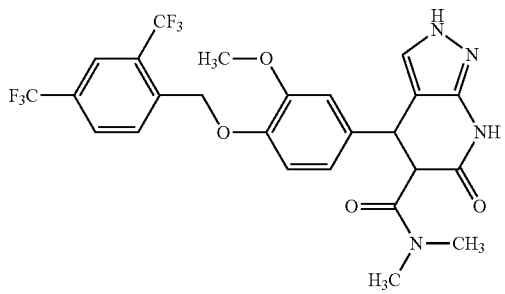 [SMILES: COc1cc(C2c3c[nH]nc3NC(=O)C2C(=O)N(C)C)ccc1OCc1ccc(C(F)(F)F)cc1C(F)(F)F]

i) The product obtained in example 187, step ii) (16 mg), DMAP (4.8 mg) and dimethylamine HCl (2.7 mg) were dissolved in DCM (1 mL) under a nitrogen atmosphere. EDC (8.1 mg) was added and the reaction was stirred 1 hour at room temperature. Water was added and the aqueous layer was extracted with DCM three times. The combined organic layers were washed with brine, dried over a phase separation filter and concentrated. The product was purified by reversed phase preparative HPLC, using a gradient of ACN/H$_2$O 10/90 to 100/0, to yield 4-(4-{[2,4-bis(trifluoromethyl)phenoxy]methyl}-3-methoxyphenyl)-N,N-dimethyl-6-oxo-2H, 4H,5H,6H, 7H-pyrazolo[3,4-b]pyridine-5-carboxamide (6 mg). MS(ES$^+$) m/z 557.5 (M+H)$^+$

189: 4-(3-methoxy-4-{[4-methyl-2-(trifluoromethyl)phenoxy]methyl}phenyl)-2H,4H,5H,6H, 7H-pyrazolo[3,4-b]pyridin-6-one

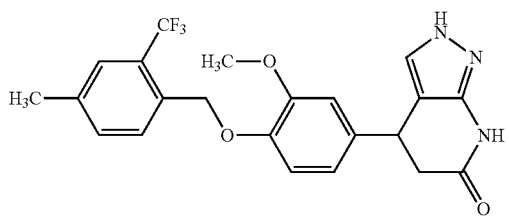 [SMILES: COc1cc([C@H]2CC(=O)Nc3n[nH]cc32)ccc1OCc1ccc(C(F)(F)F)cc1C(F)(F)F]

i) Analogous to the procedure described in Example 144, step ii), 2-[4-[[4-bromo-2-(trifluoromethyl)phenoxy]methyl]-3-methoxy-phenyl]-1,3-dioxolane was obtained, starting from the in Example 96, step iii) obtained product.

ii) Trimethylboroxine (0.38 mL) and Pd(II)Cl$_2$(PPh$_3$)$_2$ (30 mg) were added to a degassed suspension of the in the previous step obtained product (190 mg) and K$_3$PO$_4$ (280 mg) in 1,4-dioxane (1 mL). The reaction was heated to 100° C. for 1 hour in the microwave. The reaction was diluted with EtOAc and washed with water, aq. 2N HCl, aq. 2N NaOH, water and brine. The organic phase was filtered over Celite, dried over MgSO$_4$ and concentrated in vacuo to afford 3-methoxy-4-[[4-methyl-2-(trifluoromethyl)phenoxy]methyl]phenyl]-1,3-dioxolane (164 mg).

iii) Analogous to the procedure described in Example 144, step iv), the in the previous step obtained compound (164 mg) was converted to 3-methoxy-4-[[4-methyl-2-(trifluoromethyl)phenoxy]methyl]benzaldehyde (74 mg).

iv) Analogous to the procedure described in Example 1, step ii), the in the previous step obtained compound (73 mg) was converted to 4-(3-methoxy-4-{[4-methyl-2-(trifluoromethyl)phenoxy]methyl}phenyl)-2H,4H,5H,6H, 7H-pyrazolo [3,4-b]pyridin-6-one (37 mg). MS(ES$^+$) m/z 432.4 (M+H)$^+$

190: 4-(4-{[2,4-bis(trifluoromethyl)phenoxy]methyl}-3-methoxyphenyl)-1H,2H,3H,4H, 6H-pyrrolo[3,4-b]pyridin-2-one

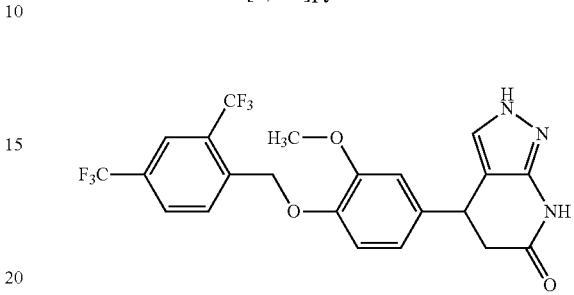

i) Following a procedure analogous to that described for Example 96, steps i) to iii), using appropriate starting materials, 4-{[2,4-bis(trifluoromethyl)phenoxy]methyl}-3-methoxybenzaldehyde was obtained.

ii) Ethoxycarbonylmethyl)triphenylphosphonium bromide (2.27 g) was added to a suspension of tBuOK (654 mg) in Et$_2$O (20 mL). The resulting mixture stirred at 50° C. for 30 minutes and then cooled to room temperature. The in the previous step obtained compound (1.01 g) was dissolved in Et$_2$O (15 mL) and added to the reaction mixture. The reaction was stirred overnight, then quenched with water and the aqueous layer was extracted with Et$_2$O three times. The combined organic layers were dried over MgSO$_4$ and concentrated under reduced pressure. The crude product was purified on silica column, using a gradient of 0 to 20% EtOAc in heptane, to obtain ethyl (E)-3-[4-[[2,4-bis(trifluoromethyl)phenoxy]methyl]-3-methoxy-phenyl]prop-2-enoate (932 mg).

iii) Vinylmagnesium bromide (1.0 M in THF, 6.25 mL) was added dropwise to a suspension of phenylsulfanylcopper (362 mg) in anhydrous THF (10 mL) at −40° C. under a nitrogen atmosphere. The reaction was allowed to reach −25° C. and again cooled down to −40° C. The in the previous step obtained compound (930 mg) in anhydrous THF (10 mL) was added dropwise and the reaction was stirred for 15 minutes at −40° C. The reaction was quenched by pouring the mixture into sat. aq. NH$_4$Cl. The obtained solids were filtered off and the filtrate was extracted with EtOAc twice. The combined organic layers were dried over MgSO$_4$ and concentrated under reduced pressure. The crude product was purified on silica column, using a gradient of 0 to 30% EtOAc in heptane, to obtain ethyl ethyl 3-[4-[[2,4-bis(trifluoromethyl)phenoxy]methyl]-3-methoxy-phenyl]pent-4-enoate (300 mg).

iv) The in the previous step obtained product (300 mg), TEMPO (40 mg) and tBuONO (167 uL) were dissolved in 1,4-dioxane (5 mL), heated to 80° C. and stirred for 2 days. Water was added to the reaction and the aqueous layer was extracted with DCM three times. The combined organic layers were dried over MgSO$_4$ and concentrated under reduced pressure. The crude product was purified on silica column, using a gradient of 0 to 30% EtOAc in heptane, to obtain ethyl (E)-3-[4-[[2,4-bis(trifluoromethyl)phenoxy]methyl]-3-methoxy-phenyl]-5-nitro-pent-4-enoate (190 mg).

v) TOSMIC (72 mg) was added to a solution of tBuOK (83 mg) in anhydrous THF (1 mL) at −78° C. and stirred for 10 minutes. The compound obtained from the previous step (190 mg) was dissolved in anhydrous THF (4 mL) and added dropwise to the reaction mixture. After 10 minutes stirring at −78° C. the reaction was poured into sat. aq. NH₄Cl and the aqueous layer was extracted with EtOAc three times. The combined organic layers were dried over MgSO₄ and concentrated under reduced pressure. The crude product was purified on silica column, using a gradient of 0 to 50% EtOAc in heptane, to obtain ethyl 3-[4-[[2,4-bis(trifluoromethyl)phenoxy]methyl]-3-methoxy-phenyl]-3-(4-nitro-1H-pyrrol-3-yl)propanoate (70 mg).

vi) To a solution of the in the previous step obtained compound (50 mg) in AcOH (1.5 mL) was added zinc dust (59 mg). The reaction was heated to 50° C. and stirred for 30 minutes. The reaction mixture was filtered over celite and the filter cake was rinsed with EtOAc. The filtrate was washed with sat. aq. NaHCO₃ and water and then dried over MgSO₄ and concentrated under reduced pressure. The crude product was purified on silica column, using a gradient of 0 to 4% MeOH in DCM, followed by reversed phase flash chromatography, using a gradient of 40 to 90% ACN in H₂O (containing 0.1% TFA), to obtain 4-(4-{[2,4-bis(trifluoromethyl)phenoxy]methyl}-3-methoxyphenyl)-1H,2H,3H,4H,6H-pyrrolo[3,4-b]pyridin-2-one (11 mg).

MS(ES⁺) m/z 485.4 (M+H)⁺

191: (4R)-4-(4-{[2,4-bis(trifluoromethyl)phenoxy]methyl}-3-methoxyphenyl)-2H,4H,5H,6H,7H-pyrazolo[3,4-b]pyridin-6-one [(+)-4-(4-{[2,4-bis(trifluoromethyl)phenoxy]methyl}-3-methoxyphenyl)-2H,4H,5H,6H, 7H-pyrazolo[3,4-b]pyridin-6-one]

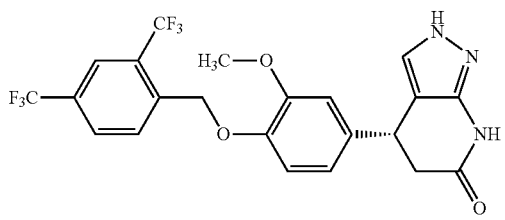

192: (4S)-4-(4-{[2,4-bis(trifluoromethyl)phenoxy]methyl}-3-methoxyphenyl)-2H,4H,5H,6H,7H-pyrazolo[3,4-b]pyridin-6-one[(−)-4-(4-{[2,4-bis(trifluoromethyl)phenoxy]methyl}-3-methoxyphenyl)-2H, 4H,5H,6H, 7H-pyrazolo[3,4-b]pyridin-6-one]

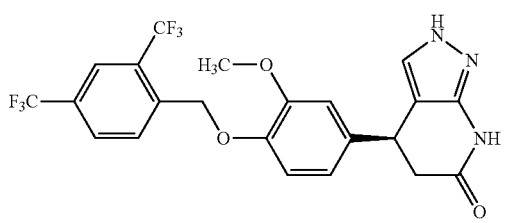 [SMILES: COc1cc([C@@H]2CC(=O)Nc3n[nH]cc32)ccc1OCc1ccc(C(F)(F)F)cc1C(F)(F)F]

The single enantiomers of Example 100 can be obtained by chiral separation. 20 mg of racemic Example 100 was dissolved in 1 mL IPA. The solution was injected on the chiral preparative HPLC using an AD column and an isocratic gradient of 5% EtOH, 12% IPA and 83% heptane, to obtain 7 mg of the (+) enantiomer (Example 191) and 7 mg of the (−) enantiomer (Example 192).

The absolute configuration of the compounds of Examples 193 to 220 is not known. These compounds are characterized by their optical rotation, using a polarimeter.

Following a procedure analogous to that described for Examples 191 and 192, using appropriate starting materials and HPLC method, the following compounds have been prepared.

193: (+)-4-(4-{[4-chloro-2-(trifluoromethyl)phenoxy]methyl}-3-methoxyphenyl)-2H,4H,5H,6H,7H-pyrazolo[3,4-b]pyridin-6-one 194: (−)-4-(4-{[4-chloro-2-(trifluoromethyl)phenoxy]methyl}-3-methoxyphenyl)-2H,4H,5H,6H,7H-pyrazolo[3,4-b]pyridin-6-one 195: (+)-4-(4-{[4-(difluoromethyl)-2-(trifluoromethyl)phenoxy]methyl}-3-methoxyphenyl)-2H,4H,5H,6H,7H-pyrazolo[3,4-b]pyridin-6-one 196: (−)-4-(4-{[4-(difluoromethyl)-2-(trifluoromethyl)phenoxy]methyl}-3-methoxyphenyl)-2H,4H,5H,6H,7H-pyrazolo[3,4-b]pyridin-6-one 197: (+)-4-(3-methoxy-4-{[4-methoxy-2-(trifluoromethyl)phenyl]methoxy}phenyl)-2H,4H,5H,6H,7H-pyrazolo[3,4-b]pyridin-6-one 198: (−)-4-(3-methoxy-4-{[4-methoxy-2-(trifluoromethyl)phenyl]methoxy}phenyl)-2H,4H,5H,6H,7H-pyrazolo[3,4-b]pyridin-6-one 199: (+)-4-(4-{[4-acetyl-2-(trifluoromethyl)phenyl]methoxy}-3-methoxyphenyl)-2H,4H,5H,6H,7H-pyrazolo[3,4-b]pyridin-6-one 200: (−)-4-(4-{[4-acetyl-2-(trifluoromethyl)phenyl]methoxy}-3-methoxyphenyl)-2H,4H,5H,6H,7H-pyrazolo[3,4-b]pyridin-6-one 201: (+)-7-(3-methoxy-4-{[4-methoxy-2-(trifluoromethyl)phenyl]methoxy}phenyl)-3H,4H,5H,6H,7H-[1,2,3]triazolo[4,5-b]pyridin-5-one 202: (−)-7-(3-methoxy-4-{[4-methoxy-2-(trifluoromethyl)phenyl]methoxy}phenyl)-3H,4H,5H,6H,7H-[1,2,3]triazolo[4,5-b]pyridin-5-one 203: (+)-4-(4-{[4-amino-2-(trifluoromethyl)phenyl]methoxy}-3-methoxyphenyl)-2H,4H,5H,6H,7H-pyrazolo[3,4-b]pyridin-6-one 204: (−)-4-(4-{[4-amino-2-(trifluoromethyl)phenyl]methoxy}-3-methoxyphenyl)-2H,4H,5H,6H,7H-pyrazolo[3,4-b]pyridin-6-one 205: (+)-7-(4-{[4-amino-2-(trifluoromethyl)phenyl]methoxy}-3-methoxyphenyl)-2H,4H,5H,6H,7H-[1,2,3]triazolo[4,5-b]pyridin-5-one 206: (−)-7-(4-{[4-amino-2-(trifluoromethyl)phenyl]methoxy}-3-methoxyphenyl)-2H,4H,5H,6H,7H-[1,2,3]triazolo[4,5-b]pyridin-5-one 207: (+)-4-(4-{[4-ethyl-2-(trifluoromethyl)phenyl]methoxy}-3-methoxyphenyl)-2H,4H,5H,6H,7H-pyrazolo[3,4-b]pyridin-6-one 208: (−)-4-(4-{[4-ethyl-2-(trifluoromethyl)phenyl]methoxy}-3-methoxyphenyl)-2H,4H,5H,6H,7H-pyrazolo[3,4-b]pyridin-6-one 209: (+)-4-(4-{[4-hydroxy-2-(trifluoromethyl)phenyl]methoxy}-3-methoxyphenyl)-2H,4H,5H,6H,7H-pyrazolo[3,4-b]pyridin-6-one 210: (−)-4-(4-{[4-hydroxy-2-(trifluoromethyl)phenyl]methoxy}-3-methoxyphenyl)-2H,4H,5H,6H,7H-pyrazolo[3,4-b]pyridin-6-one 211: (+)-4-(4-{[4-(2-hydroxyethyl)-2-(trifluoromethyl)phenyl]methoxy}-3-methoxyphenyl)-2H,4H,5H,6H,7H-pyrazolo[3,4-b]pyridin-6-one 212: (−)-4-(4-{[4-(2-hydroxyethyl)-2-(trifluoromethyl)phenyl]methoxy}-3-methoxyphenyl)-2H,4H,5H,6H,7H-pyrazolo[3,4-b]pyridin-6-one 213: (+)-4-(3-methoxy-4-{[4-methyl-2-(trifluoromethyl)phenoxy]methyl}phenyl)-2H,4H,5H,6H,7H-pyrazolo[3,4-b]pyridin-6-one 214: (−)-4-(3-methoxy-4-{[4-methyl-2-(trifluoromethyl)phenoxy]methyl}phenyl)-2H,4H,5H,6H,7H-pyrazolo[3,4-b]pyridin-6-one 215: (+)-4-(4-{[2-(difluoromethyl)-4-(trifluoromethyl)phenoxy]methyl}-3-methoxyphenyl)-2H,4H,5H,6H,7H-pyrazolo[3,4-b]pyridin-6-one 216: (−)-4-(4-{[2-(difluoromethyl)-4-(trifluoromethyl)phenoxy]methyl}-3-methoxyphenyl)-2H,4H,5H,6H,7H-pyrazolo[3,4-b]pyridin-6-one 217: (+)-4-(4-{[2,4-bis(difluoromethyl)phenoxy]methyl}-3-methoxyphenyl)-2H,4H,5H,6H,7H-pyrazolo[3,4-b]pyridin-6-one 218: (−)-4-(4-{[2,4-bis(difluoromethyl)phenoxy]methyl}-3-methoxyphenyl)-2H,4H,5H,6H,7H-pyrazolo[3,4-b]pyridin-6-one 219: (+)-4-{4-[(2,4-dimethylphenoxy)methyl]-3-methoxyphenyl}-2H,4H,5H,6H,7H-pyrazolo[3,4-b]pyridin-6-one 220: (−)-4-{4-[(2,4-dimethylphenoxy)methyl]-3-methoxyphenyl}-2H,4H,5H,6H,7H-pyrazolo[3,4-b]pyridin-6-one Example 221

ERRα AlphaScreen Assay

This assay was based on the knowledge that nuclear receptors interact with cofactors in a ligand dependent matter. The sites of interaction have been mapped to LXXLL motifs that are present in the co-activator sequences. Short peptide sequences that contain the LXXLL motif mimic the behavior of full length co-activators.

The ERRα AlphaScreen Assay described here relies on the interaction of the co-activator peptide with purified bacterial-expressed ERRα ligand binding domain (ERRα-LBD); upon ligand binding the ERRα protein can undergo a conformational change resulting in a loss of co-activator binding.

Compounds of the present invention were tested for their ability to disrupt binding of ERRα-LBD protein to co-activator peptide using AlphaScreen® Technology (Perkin Elmer). ERRα-LBD protein was expressed in *E. coli* as a 6×His Small Ubiquitin-like Modifier (SUMO) fusion. Bacterial expressed 6His-SUMO-ERRα-LBD protein was purified using affinity chromatography. All experiments were performed at room temperature in 384-well white non-binding plates (Greiner) using 50 mM Tris-HCl pH 7.5, 100 mM NaCl, 0,1% Pluronic F-127, 0.05% BSA and 5 mM TCEP as the buffer. Final DMSO concentration was 1% in the assay. Compounds were assayed in triplicate and: incubated with 0.81 nM ERRα-LBD protein and 10 μg/mL streptavidin donor beads and 10 μg/mL Ni-chelate acceptor beads for 1 hour at room temperature; followed by a 2-hour incubation with 15 nM biotin-PGC1α-3 peptide (QRRPC-SELLKYLTTNDDPP) corresponding to amino acids 202 to 220.

The AlphaScreen signal was measured using an Envision Xcite plate reader (Perkin Elmer). Data was normalized, and curve fitting analysis was performed in GraphPad Prism 7 using a four-parameter dose-response fit.

As multiple $IC_{50}$ values were annotated for the same compound-protein pair, a mean $pIC_{50}$ for each compound was determined. All exemplified compounds of Formula I (Examples 1-220) were found to have mean $pIC_{50}$ values above or equal to 5.

Examples 11, 18, 21, 22, 25, 28, 29, 30, 31, 37, 39, 46, 47, 48, 49, 50, 51, 58, 60, 63, 66, 67, 76, 77, 78, 79, 80, 82, 86, 88, 94, 95, 110, 113, 114, 118, 120, 121, 125, 126, 127, 130, 131, 132, 137, 140, 147, 148, 150, 151, 160, 161, 162, 165, 167, 168, 172, 183, 184, 187, 188, 191, 199, 215, 217 and 219 were found to have mean $pIC_{50}$ values above or equal to 6 but below 7.

Examples 2, 4, 9, 14, 17, 20, 26, 34, 35, 43, 44, 45, 59, 64, 65, 69, 70, 71, 72, 73, 74, 75, 85, 87, 92, 93, 103, 104, 105, 106, 107, 108, 109, 111, 112, 116, 117, 128, 139, 152, 153, 156, 159, 163, 164, 171, 181, 182, 190, 193, 195, 201, 203, 206, 209, 211, 213 and 216 were found to have mean $pIC_{50}$ values above or equal to 7 but below 8.

Examples 1, 8, 15, 19, 23, 24, 32, 33, 36, 40, 41, 42, 62, 68, 89, 90, 91, 96, 97, 98, 99, 100, 101, 102, 115, 119, 135, 136, 138, 141, 142, 143, 144, 145, 146, 149, 154, 155, 157, 166, 169, 170, 173, 174, 175, 176, 177, 178, 179, 180, 186, 189, 192, 194, 196, 197, 198, 200, 202, 204, 205, 207, 208, 210, 212, 214, 218 and 220 were found to have mean $pIC_{50}$ values above or equal to 8.

Example 222

Full Length ERRα Reporter Gene Assay

Examples inhibitors 1, 4, 5, 8, 9, 13, 14, 15, 17, 18, 19, 20, 23, 24, 26, 31, 32, 33, 34, 35, 36, 37, 38, 39, 40, 41, 42, 43, 44, 45, 46, 47, 48, 49, 51, 54, 57, 59, 62, 64, 65, 66, 67, 68, 69, 70, 71, 72, 73, 74, 75, 76, 77, 78, 79, 80, 82, 84, 85, 86, 87, 88, 89, 90, 91, 93, 94, 95, 96, 97, 98, 99, 100, 101, 102, 103, 104, 105, 106, 107, 108, 109, 110, 111, 112, 115, 116, 117, 119, 128, 130, 132, 135, 136, 138, 139, 140, 141, 142, 143, 144, 145, 146, 147, 149, 150, 152, 153, 155, 156, 157, 159, 160, 161, 163, 164, 165, 166, 167, 168, 169, 170, 171, 174, 175, 176, 177, 178, 179, 180, 181, 182, 183, 184, 186, 188, 189, 190, 191, 192, 193, 194, 195, 196, 197, 198, 199, 200, 202, 203, 204, 205, 206, 207, 208, 209, 210, 211, 212, 213, 214, 215, 216, 217, 218, 219 and 220 were tested for their ability to inhibit ERRα activity in a full length ERRα reporter gene assay.

A method was established to quantitatively screen the potency of compounds with inverse agonistic activity on the nuclear receptor ERRα of the human species. The assay allows intra-cellular screening of ERRα inverse agonists in SK-BR-3 cells using an over-expression construct coding full length ERRα and a reporter construct containing an ERRα Response Element (RE) and a luciferase gene for read out. The activity is expressed in log IC50 values and can be used to determine SAR of compound families or to de-select compounds.

In this assay, reporter cells are obtained by transient co-transfection of two constructs in SK-BR-3 cells using standard transfection techniques. The first construct contains a response element of the nuclear receptor ERRα (Plasmid pLP2175, Reporter construct ERRα-RE/luc2P, cloned variant of ERRα_v2_synthRE, Switchgear Genomics, Catalog Number S900089). This sequence drives the transcription of the luciferase reporter gene in response to binding of an ERRα protein encoded by the second construct (Plasmid pLP2124: full length ERRα expression construct using pcDNA3.1/Hygro(+) as background, Invitrogen Catalog Number V87020). The over-expressed full length ERRα is constitutively active, hence luciferase expression is reduced by inverse agonists of the nuclear receptor ERRα.

The day after transfection, cells were plated into 96 well plates, test compound was added and the plates were incubated overnight. Subsequently, the firefly luciferase activity was quantified using luciferase detection reagent and luminescence readout.

Detailed Assay Description

Transfection is performed on pre-seeded SK-BR-3 cells in a T175 flask. One transfected T175 flask is sufficient for seeding 3 to 4 MW96 μlates the next day, depending on the confluency of the transfected cells.

Two different media are used in this protocol for cell treatment: 1) Culture medium, i.e. McCoy's 5a with phenol red (BioWhittaker Supplier Number 12-688F), 10% FBS and 1× Penstrep.; and, 2) Assay medium, i.e. McCoy's 5a Medium phenol red free (HyClone Product Code SH30270.01) with 2% Charcoal Stripped FBS and 1× Penstrep. Compound dilutions are prepared in assay medium.

Cells are seeded at least 2 days in advance to allow the cells to adhere well to flask before transfection. Cells should be 50-80% confluent at the day of transfection.

SKBR3 cells were transfected with the transcriptional reporter construct pLP2175 and the ERRα expression construct pLP2124 (as described above).

68 μL of Lipofectamine LTX transfection reagent (Invitrogen Catalog Number 15338-100) was added dropwise to 8.9 ml Opti-MEM I Reduced Serum Medium (Gibco Catalog Number 51985-026) and incubated at room temperature for 5 to 20 minutes. 8.9 ml of this reagent mixture was added to 22 μg pLP2175+22 μg pLP2124 (ratio 1:1 and total volume 10 ml), and incubated at room temperature for 25 minutes.

10 minutes before adding the transfection mix to SKBR3 cells in a T175 flask, the culture medium was refreshed with 20 mL culture medium. Subsequently, the 10 mL DNA-Opti-MEM-Lipofectamine mixture was gently added to the cells, followed by overnight (16-24 hours) incubation at 37° C. and 5% $CO_2$.

To harvest SKBR3 cells from a T175 flask, first the medium was removed. Subsequently, cells were washed with Phosphate Buffered Saline (PBS) (Lonza), after which the PBS was removed. To dissociate the cells, 2 ml of TrypLE Express (Invitrogen) was added to the flask, followed by incubation at 37° C. for 5 minutes. The flask was tapped until cells were detached from the bottom. Cells were collected in 8 mL of culture medium (McCoy's 5α, 10% FBS, penstrep), to achieve a single cell suspension. After cell count, cells were spun down for 5 minutes at 300 g. Next cell pellets were re-suspended to 25000 cells/80 μl assay medium (McCoy's 5a phenol red free, 2% charcoal stripped FBS, penstrep).

For compound screening, the cells were harvested (as described above). 80 μL of cell suspension (25,000 cells) was plated per well into a white, flat bottom, tissue culture treated, 96 well screening plates (Greiner).

Test compounds were diluted, starting from a 10 mM dimethylsulfoxide (DMSO) stock solution, in 3 dilution steps. The first dilution step was a 12 points serial dilution of 4-fold in DMSO. These dilutions were further diluted 10 times in phenol red free assay medium containing 2% charcoal stripped FBS and penstrep. The last step was another 20-fold dilution in assay medium to obtain a 5× concentrated dilution with a DMSO concentration of 0.5%. As a last step the compound dilutions were diluted 5× in the cell plate.

The DMSO dilution series consisted of 12 concentrations, with a final concentration in the cell plate ranging from 10 μM to 2.4 fM.

The plates were incubated overnight (16-24 hours) at 37° C. and 5% $CO_2$.

For the luciferase readout, the luciferase reagent (BriteLite Plus, Perkin Elmer) was brought to room temperature. To each test well of the screening plates, 100 μL of 2.5-fold diluted BriteLite Plus reagent was added, followed by incubation at room temperature for 5 minutes. The luciferase luminescence signal was measured using a Wallac Victor Microplate Reader (Perkin Elmer).

The half maximum inhibitory concentration (IC50) values for the test compounds were calculated from the luciferase signal using GraphPad Prism software (GraphPad Software). For completeness, multiple $IC_{50}$ values were annotated for the same compound-cell line pair and a mean $pIC_{50}$ for each compound was determined.

From the exemplified compounds of Formula I, Examples 1, 8, 9, 15, 19, 24, 32, 33, 36, 40, 62, 68, 89, 91, 93, 96, 97, 98, 99, 100, 101, 102, 106, 107, 115, 119, 140, 142, 143, 144, 145, 146, 147,149, 150, 155, 157, 159, 166, 169, 170, 174, 175, 176, 177, 178, 179, 186, 189, 192, 194, 196, 198, 200, 202, 207, 208, 211, 212 and 214 were found to have mean pIC50 values above or equal to 6.5.

Example 223

B16F10 Melanoma Syngeneic Mouse Model

Examples inhibitors 100, 191, 192, 194 and 196 were tested for their ability to inhibit tumor growth in a B16F10 melanoma syngeneic mouse model.

Cell line and tumor model: B16F10 melanoma cell line derived allograft model in C57BL/6 mice.

Mouse B16F10 melanoma cells were sourced from American Type Culture Collection (ATCC), USA. Cells were grown in DMEM (Invitrogen, Catalogue No. 31600-034) supplemented with 10% FBS (Invitrogen, Catalogue No. 10438-026), and 1% penicillin streptomycin (Thermo Fisher Scientific, Catalogue No. 15140-122). To establish allografts, the cells were harvested by trypsinization when they reach around 70 to 80% confluence and 0.1 million B16F10 cells were suspended in 50 μl of serum free medium and mixed at 1:1 ratio with matrigel before implanting subcutaneously into the dorsal right flank of mice using a 1 mL BD syringe attached to a 24-gauge needle.

B16F10 tumor grafts were measured after 5 days of cell inoculation once they became palpable. When the average tumor volume reached around 58 $mm^3$, animals were dosed after randomization into different treatment groups keeping tumor volume and number of animals in such a way so that the average tumor volume of each group remained same across the groups. Dosing was performed on a per kilogram weight basis, by mouth (per os, p.o.) once a day (quaque die, q.d).

Tumor dimensions—length (l) and breadth (b)—were measured by caliper on the day of animal randomization based on tumor volume (Day 1) and thrice weekly thereafter until study termination. Tumor volumes were calculated using the formula $b^2*l*0.52$ where l=length, b=breadth (Dusan Djokovic et al., BMC Cancer, 2010, 10:641). Tumor growth inhibition was calculated after normalizing the tumor volume on a given day to that on Day 1.

Test items administration was started when tumor volume reached an average of 58 $mm^3$.

Administration of test items was carried out until Day 14 and measurement of tumor volume was carried out until Day 13 for computing percent tumor growth inhibition (TGI). The results of the study are listed in Table 1 herein below.

TABLE 1

| Example | Dose Milligrams per kilogram weight (mpk) [p.o., q.d] | Tumor Volume (mm$^3$) Day 13 | Tumor Growth Inhibition (%) |
|---|---|---|---|
| Vehicle Control | | 1801 ± 241 | — |
| 100 | 30 | 814 ± 117 | 57 |
| 191 | 30 | 552 ± 91 | 72 |
| 192 | 30 | 518 ± 62 | 74 |
| 194 | 30 | 870 ± 152 | 53 |
| 196 | 30 | 755 ± 135 | 60 |

In view of the foregoing description and examples, it will be apparent to those skilled in the art that equivalent modifications thereof can be made without departing from the scope of the claims.

What is claimed is:

1. A compound selected from the group consisting of:
4-(4-{[4-bromo-2-(trifluoromethyl)phenoxy]methyl}-3-methoxyphenyl)-2H,4H,5H,6H, 7H-pyrazolo[3,4-b]pyridin-6-one;
4-(4-{[4-(2-hydroxyethyl)-2-(trifluoromethyl)phenoxy]methyl}-3-methoxyphenyl)-2H,4H,5H,6H, 7H-pyrazolo[3,4-b]pyridin-6-one;
4-(3-methoxy-4-{[4-methoxy-2-(trifluoromethyl)phenoxy]methyl}phenyl)-2H,4H,5H,6H, 7H-pyrazolo[3,4-b]pyridin-6-one;
4-(4-{[4-chloro-2-(trifluoromethyl)phenoxy]methyl}-3-methoxyphenyl)-2H,4H,5H,6H, 7H-pyrazolo[3,4-b]pyridin-6-one;
4-(4-{[2,4-bis(trifluoromethyl)phenoxy]methyl}-3-methoxyphenyl)-2H,4H,5H,6H,7H-pyrazolo[3,4-b]pyridin-6-one;
4-(3-methoxy-4-{[2-(pentafluoro-λ$^6$-sulfanyl)phenoxy]methyl}phenyl)-2H,4H,5H,6H, 7H-pyrazolo[3,4-b]pyridin-6-one;
4-(3-methoxy-4-{[2-(trifluoromethyl)phenoxy]methyl}phenyl)-2H,4H,5H,6H, 7H-pyrazolo[3,4-b]pyridin-6-one;
4-(4-{[4-acetyl-2-(trifluoromethyl)phenoxy]methyl}-3-methoxyphenyl)-2H,4H,5H,6H, 7H-pyrazolo[3,4-b]pyridin-6-one;
4-(4-{[4-fluoro-2-(trifluoromethyl)phenoxy]methyl}-3-methoxyphenyl)-2H,4H,5H,6H,7H-pyrazolo[3,4-b]pyridin-6-one;
4-(4-{[4-bromo-2-(trifluoromethyl)phenoxy]methyl}-3-(trifluoromethoxy)phenyl)-2H,4H,5H,6H, 7H-pyrazolo[3,4-b]pyridin-6-one;
4-(4-{[2-(pentafluoro-λ$^6$-sulfanyl)phenoxy]methyl}-3-(trifluoromethoxy)phenyl)-2H,4H,5H,6H, 7H-pyrazolo[3,4-b]pyridin-6-one;
4-[3-(trifluoromethoxy)-4-{[2-(trifluoromethyl)phenoxy]methyl}phenyl]-2H,4H,5H,6H,7H-pyrazolo[3,4-b]pyridin-6-one;
4-(4-{[2,4-bis(trifluoromethyl)phenoxy]methyl}-3-(trifluoromethoxy)phenyl)-2H,4H,5H,6H,7H-pyrazolo[3,4-b]pyridin-6-one;
4-(4-{[4-fluoro-2-(trifluoromethyl)phenoxy]methyl}-3-(trifluoromethoxy)phenyl)-2H,4H,5H,6H, 7H-pyrazolo[3,4-b]pyridin-6-one;
4-{4-[(2,4-dimethylphenoxy)methyl]-3-methoxyphenyl}-2H,4H,5H,6H,7H-pyrazolo[3,4-b]pyridin-6-one;
4-(3-methoxy-4-{[2-methyl-4-(trifluoromethyl)phenoxy]methyl}phenyl)-2H,4H,5H,6H, 7H-pyrazolo[3,4-b]pyridin-6-one;
4-{4-[(3,5-dimethylphenoxy)methyl]-3-methoxyphenyl}-2H,4H,5H,6H,7H-pyrazolo[3,4-b]pyridin-6-one;
4-(3-methoxy-4-{[3-methyl-5-(trifluoromethyl)phenoxy]methyl}phenyl)-2H,4H,5H,6H,7H-pyrazolo[3,4-b]pyridin-6-one;
4-(4-{[4-(difluoromethyl)-2-(trifluoromethyl)phenoxy]methyl}-3-methoxyphenyl)-2H,4H,5H,6H, 7H-pyrazolo[3,4-b]pyridin-6-one;
4-(4-{[2,4-bis(difluoromethyl)phenoxy]methyl}-3-methoxyphenyl)-2H,4H,5H,6H,7H-pyrazolo[3,4-b]pyridin-6-one;
4-(4-{[2-(difluoromethyl)-4-(trifluoromethyl)phenoxy]methyl}-3-methoxyphenyl)-2H,4H,5H,6H, 7H-pyrazolo[3,4-b]pyridin-6-one;
4-(4-{[3-(difluoromethyl)-5-(trifluoromethyl)phenoxy]methyl}-3-methoxyphenyl)-2H,4H,5H,6H, 7H-pyrazolo[3,4-b]pyridin-6-one;
4-(4-{[2,4-bis(trifluoromethyl)phenoxy]methyl}-3-methoxyphenyl)-2H,6H,7H-pyrazolo[3,4-b]pyridin-6-one;
methyl 4-(4-{[2,4-bis(trifluoromethyl)phenoxy]methyl}-3-methoxyphenyl)-6-oxo-2H,4H,5H,6H, 7H-pyrazolo[3,4-b]pyridine-5-carboxylate;
4-(4-{[2,4-bis(trifluoromethyl)phenoxy]methyl}-3-methoxyphenyl)-N,N-dimethyl-6-oxo-2H,4H,5H,6H, 7H-pyrazolo[3,4-b]pyridine-5-carboxamide;
4-(3-methoxy-4-{[4-methyl-2-(trifluoromethyl)phenoxy]methyl}phenyl)-2H,4H,5H,6H, 7H-pyrazolo[3,4-b]pyridin-6-one;
4-(4-{[2,4-bis(trifluoromethyl)phenoxy]methyl}-3-methoxyphenyl)-1H, 2H,3H,4H,6H-pyrrolo[3,4-b]pyridin-2-one;
(+)-4-(4-{[2,4-bis(trifluoromethyl)phenoxy]methyl}-3-methoxyphenyl)-2H,4H,5H,6H, 7H-pyrazolo[3,4-b]pyridin-6-one;
(−)-4-(4-{[2,4-bis(trifluoromethyl)phenoxy]methyl}-3-methoxyphenyl)-2H,4H,5H,6H,7H-pyrazolo[3,4-b]pyridin-6-one;
(+)-4-(4-{[4-chloro-2-(trifluoromethyl)phenoxy]methyl}-3-methoxyphenyl)-2H,4H,5H,6H, 7H-pyrazolo[3,4-b]pyridin-6-one;
(−)-4-(4-{[4-chloro-2-(trifluoromethyl)phenoxy]methyl}-3-methoxyphenyl)-2H,4H,5H,6H, 7H-pyrazolo[3,4-b]pyridin-6-one;
(+)-4-(4-{[4-(difluoromethyl)-2-(trifluoromethyl)phenoxy]methyl}-3-methoxyphenyl)-2H,4H,5H,6H, 7H-pyrazolo[3,4-b]pyridin-6-one;
(−)-4-(4-{[4-(difluoromethyl)-2-(trifluoromethyl)phenoxy]methyl}-3-methoxyphenyl)-2H,4H,5H,6H, 7H-pyrazolo[3,4-b]pyridin-6-one;
(+)-4-(3-methoxy-4-{[4-methyl-2-(trifluoromethyl)phenoxy]methyl}phenyl)-2H,4H,5H,6H, 7H-pyrazolo[3,4-b]pyridin-6-one;
(−)-4-(3-methoxy-4-{[4-methyl-2-(trifluoromethyl)phenoxy]methyl}phenyl)-2H,4H,5H,6H,7H-pyrazolo[3,4-b]pyridin-6-one;

(+)-4-(4-{[2-(difluoromethyl)-4-(trifluoromethyl)phenoxy]methyl}-3-methoxyphenyl)-2H,4H,5H,6H,7H-pyrazolo[3,4-b]pyridin-6-one;

(−)-4-(4-{[2-(difluoromethyl)-4-(trifluoromethyl)phenoxy]methyl}-3-methoxyphenyl)-2H,4H,5H,6H,7H-pyrazolo[3,4-b]pyridin-6-one;

(+)-4-(4-{[2,4-bis(difluoromethyl)phenoxy]methyl}-3-methoxyphenyl)-2H,4H,5H,6H,7H-pyrazolo[3,4-b]pyridin-6-one;

(−)-4-(4-{[2,4-bis(difluoromethyl)phenoxy]methyl}-3-methoxyphenyl)-2H,4H,5H,6H, 7H-pyrazolo[3,4-b]pyridin-6-one;

(+)-4-{4-[(2,4-dimethylphenoxy)methyl]-3-methoxyphenyl}-2H,4H,5H,6H, 7H-pyrazolo[3,4-b]pyridin-6-one; and, (−)-4-{4-[(2,4-dimethylphenoxy)methyl]-3-methoxyphenyl}-2H,4H,5H,6H, 7H-pyrazolo[3,4-b]pyridin-6-one; or a pharmaceutically acceptable salt of each of these compounds.

2. A compound which is (4R)-4-(4-{[2,4-bis(trifluoromethyl)phenoxy]methyl}-3-methoxyphenyl)-2H,4H,5H,6H, 7H-pyrazolo[3,4-b]pyridin-6-one

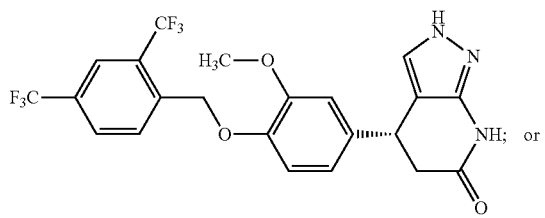 [SMILES: COc1cc([C@H]2CC(=O)Nc3n[nH]cc32)ccc1OCc1ccc(C(F)(F)F)cc1C(F)(F)F]

(4S)-4-(4-{[2,4-bis(trifluoromethyl)phenoxy]methyl}-3-methoxyphenyl)-2H,4H,5H,6H, 7H-pyrazolo[3,4-b]pyridin-6-one

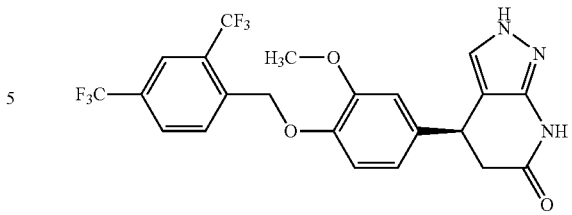

or a pharmaceutically acceptable salt of each of these compounds.

3. A medicament comprising one of the compounds according to claim 1 or the pharmaceutically acceptable salt thereof.

4. A therapeutic method comprising a step of administering one of the compounds according to claim 1 or the pharmaceutically acceptable salt thereof to a subject.

5. A pharmaceutical composition which comprises one of the compounds according to claim 1 or the pharmaceutically acceptable salt thereof and one or more pharmaceutically acceptable excipients.

6. The pharmaceutical composition according to claim 5, which further comprises at least one additional therapeutically active agent.

7. A medicament comprising one of the compounds according to claim 2 or the pharmaceutically acceptable salt thereof.

8. A therapeutic method comprising a step of administering one of the compounds according to claim 2 or the pharmaceutically acceptable salt thereof to a subject.

9. A pharmaceutical composition which comprises one of the compounds according to claim 2 or the pharmaceutically acceptable salt thereof and one or more pharmaceutically acceptable excipients.

10. The pharmaceutical composition according to claim 9, which further comprises at least one additional therapeutically active agent.

* * * * *